United States Patent [19]
Candor

[11] Patent Number: 5,403,455
[45] Date of Patent: * Apr. 4, 1995

[54] APPARATUS AND METHOD FOR REMOVING LIQUID FROM LIQUID BEARING MATERIAL

[76] Inventor: James T. Candor, 5440 Cynthia La., Dayton, Ohio 45429

[*] Notice: The portion of the term of this patent subsequent to Dec. 4, 2007 has been disclaimed.

[21] Appl. No.: 220,284

[22] Filed: Mar. 30, 1994

Related U.S. Application Data

[60] Continuation-in-part of Ser. No. 113,043, Aug. 27, 1993, Pat. No. 5,362,371, which is a continuation-in-part of Ser. No. 31,575, Mar. 15, 1993, Pat. No. 5,344,533, which is a continuation-in-part of Ser. No. 842,898, Feb. 27, 1992, Pat. No. 5,259,940, which is a continuation-in-part of Ser. No. 731,791, Jul. 17, 1991, Pat. No. 5,160,593, which is a continuation-in-part of Ser. No. 695,603, May 3, 1991, abandoned, which is a continuation-in-part of Ser. No. 575,416, Aug. 29, 1990, Pat. No. 5,114,553, and Ser. No. 502,506, Mar. 30, 1990, Pat. No. 5,019,230, which is a continuation-in-part of Ser. No. 454,718, Dec. 21, 1989, Pat. No. 4,975,166, said Ser. No. 575,416, is a division of Ser. No. 454,718, Dec. 21, 1989, which is a continuation-in-part of Ser. No. 386,579, Jul. 27, 1989, abandoned, which is a continuation-in-part of Ser. No. 284,197, Dec. 14, 1988, Pat. No. 4,877,503, which is a continuation-in-part of Ser. No. 213,709, Jun. 30, 1988, abandoned, which is a continuation-in-part of Ser. No. 189,974, May 4, 1988, abandoned, which is a continuation-in-part of Ser. No. 62,201, Jun. 15, 1987, Pat. No. 4,780,188, which is a continuation-in-part of Ser. No. 32,746, Mar. 31, 1987, Pat. No. 4,767,514.

[51] Int. Cl.6 .............................................. B01D 57/02
[52] U.S. Cl. ........................... 204/180.1; 204/300 R
[58] Field of Search .................. 204/182.1, 182.3, 180.1, 204/300 R

[56] References Cited

U.S. PATENT DOCUMENTS

| | | | |
|---|---|---|---|
| 2,740,756 | 4/1956 | Thomas | 204/180 |
| 3,705,847 | 12/1972 | Stiles | 204/181 |
| 3,931,682 | 1/1976 | Candor | 34/1 |
| 4,236,317 | 12/1980 | Candor | 34/1 |
| 4,341,617 | 7/1982 | King | 204/302 |
| 4,561,953 | 12/1985 | Muralidhara et al. | 204/182.3 |
| 4,747,920 | 5/1988 | Muralidhara et al. | 204/182.3 |

(List continued on next page.)

FOREIGN PATENT DOCUMENTS 61-259716  11/1986  Japan.
WO91/03309  3/1991  WIPO.

OTHER PUBLICATIONS

Chapter 14, pp. 335–374 of the book, *Advances In Solid Liquid Separation* (Nov. 12, 1986).
Pp. 504–519 of the book, *Solid/Liquid Separation: Waste*
(List continued on next page.)

Primary Examiner—John Niebling
Assistant Examiner—Brendan Mee
Attorney, Agent, or Firm—Candor, Candor & Tassone

[57] ABSTRACT

An apparatus and method for moving at least some of the liquid in liquid bearing soil or ground are provided, the method comprising the steps of disposing a first electrode unit and a second electrode unit in the ground so as to have at least portions thereof disposed beneath the top surface of the ground and so as to have a section of the ground disposed between the portions of the electrode units, creating an electrostatic field between the portions of the electrode units to tend to move at least some of the liquid in the section of the ground toward one of the portions of the electrode units, and imposing a vibratory field arrangement on the section of the ground to enhance the movement of the liquid in the section of the ground toward the one of the portions of the electrode units, the step of imposing the vibratory field arrangement comprising the step of simultaneously imposing a plurality of different vibratory field actions on the section of the ground so that a plurality of different intensities and/or frequencies of the vibratory field arrangement act on the section of the ground in series between the portions of the electrode units as at least some of the liquid thereof is being moved between the portions of the electrode units.

19 Claims, 12 Drawing Sheets

U.S. PATENT DOCUMENTS

| | | | |
|---|---|---|---|
| 4,802,964 | 2/1989 | Muralidhara et al. | 204/180.1 |
| 4,919,807 | 4/1990 | Morton et al. | 210/388 |
| 5,043,048 | 8/1991 | Muralidhara | 204/186 |
| 5,049,248 | 9/1991 | Muralidhara et al. | 204/180.1 |
| 5,064,515 | 11/1991 | Muralidhara | 204/151 |
| 5,098,538 | 3/1992 | Kim et al. | 204/182.2 |
| 5,114,553 | 5/1992 | Candor | 204/182.1 |
| 5,114,560 | 5/1992 | Senapati et al. | 204/299 R |
| 5,160,593 | 11/1992 | Candor | 204/180.1 |

OTHER PUBLICATIONS

*Management and Productivity Enhancement* (Dec. 1989).

"Electrodes give dewatering a boost" in the No. 2, 1990 issue of *Water Quality International.*

"Electroosmotic Dewatering of Clays, I Influence of Voltage" by N. C. Lockhart, Colloids and Solids, vol. 6, pp. 229–238, Elsevier Sci. Pub. Co. Sep., 1982.

"Effect of a Corona Discharge Field On Evaporation of Liquids From Capillaries" by Karpovich et al, J. Enc. Phys., Dec. 1981, 1333.

"Study of Electric Field–Induced Effects on Water Vapor Adsorption in Porous Adsorbents" by Someshwar et al, Ind. Eng. Chem. Fundam., 1985, 24, 215–220.

"Effect of an Electric Field on the Kinetics of Water Sorption by a Capillary–Porous Material" by Panchenko et al, J.Eng. Phys., 1972, 22, 554.

"Influence of Inhomogeneous Electric and Magnetic Fields on Internal Mass Transfer In Capillary–Porous Bodies" by Panasyuk et al, J. Eng. Phys., 1978, 35, 827.

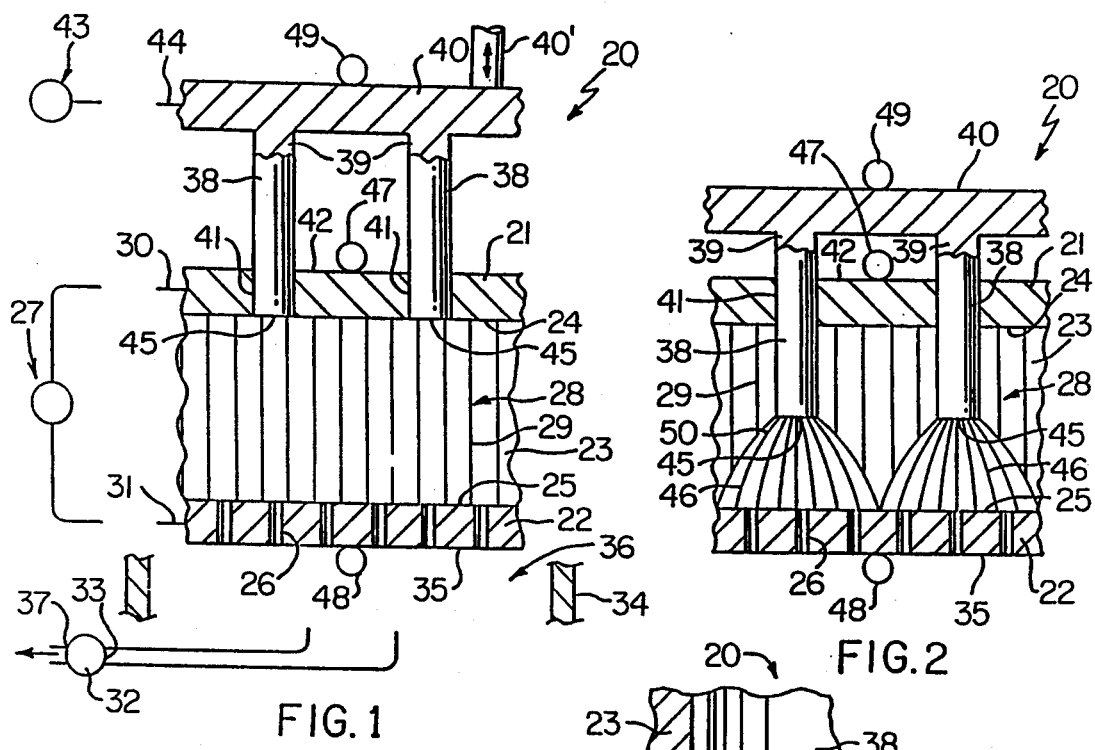
FIG. 1
FIG. 2
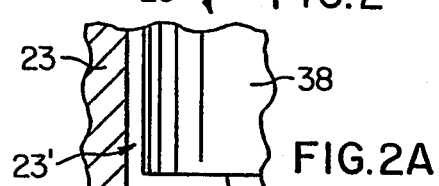
FIG. 2A
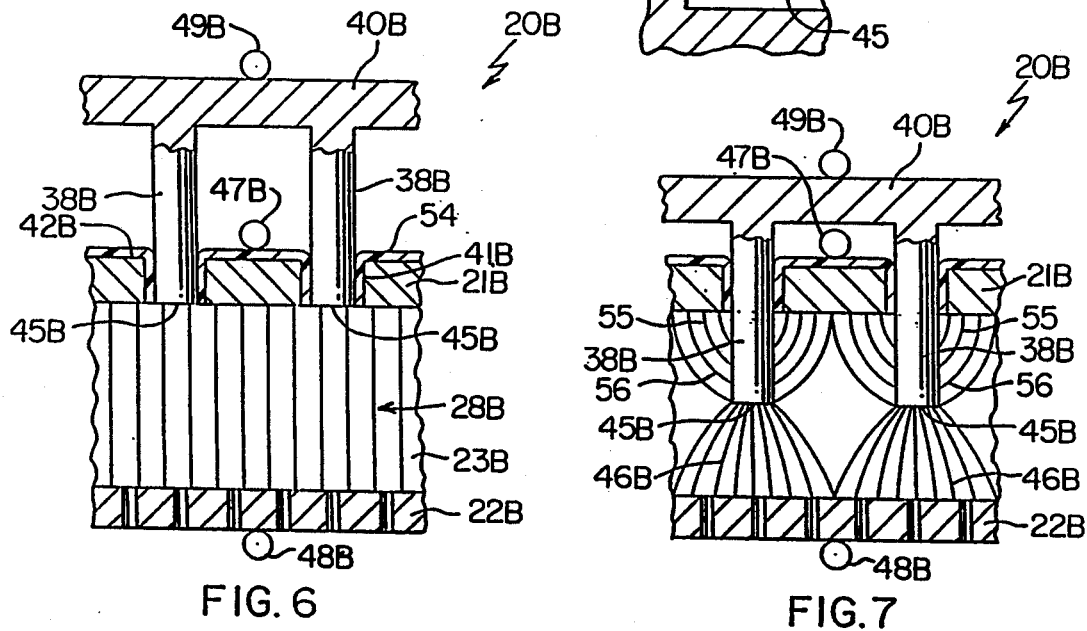
FIG. 6
FIG. 7

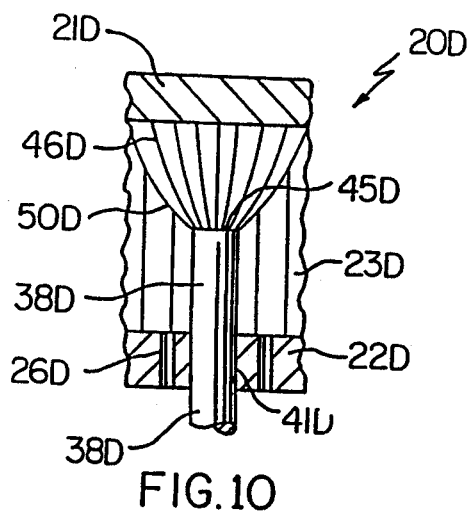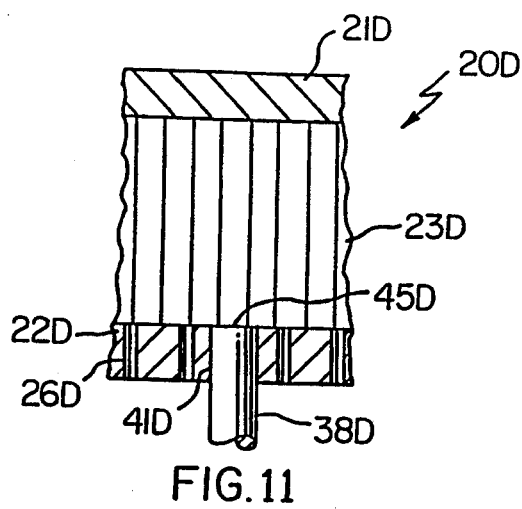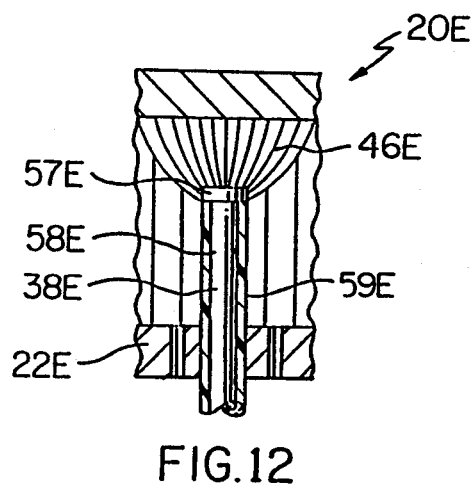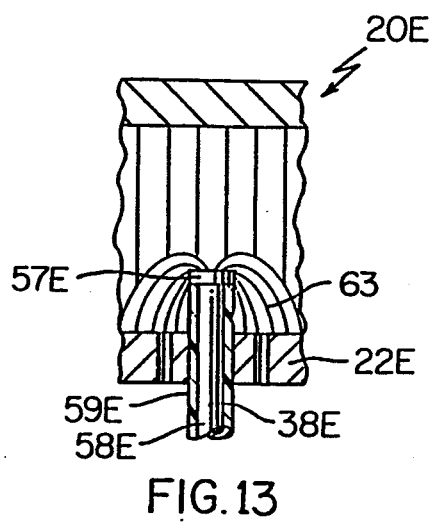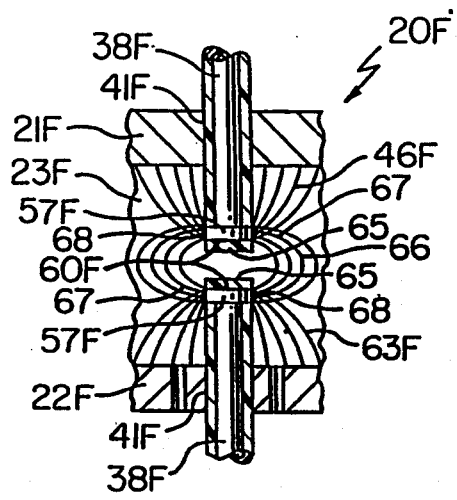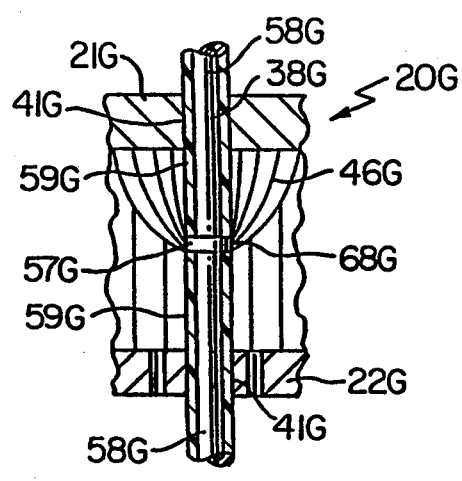

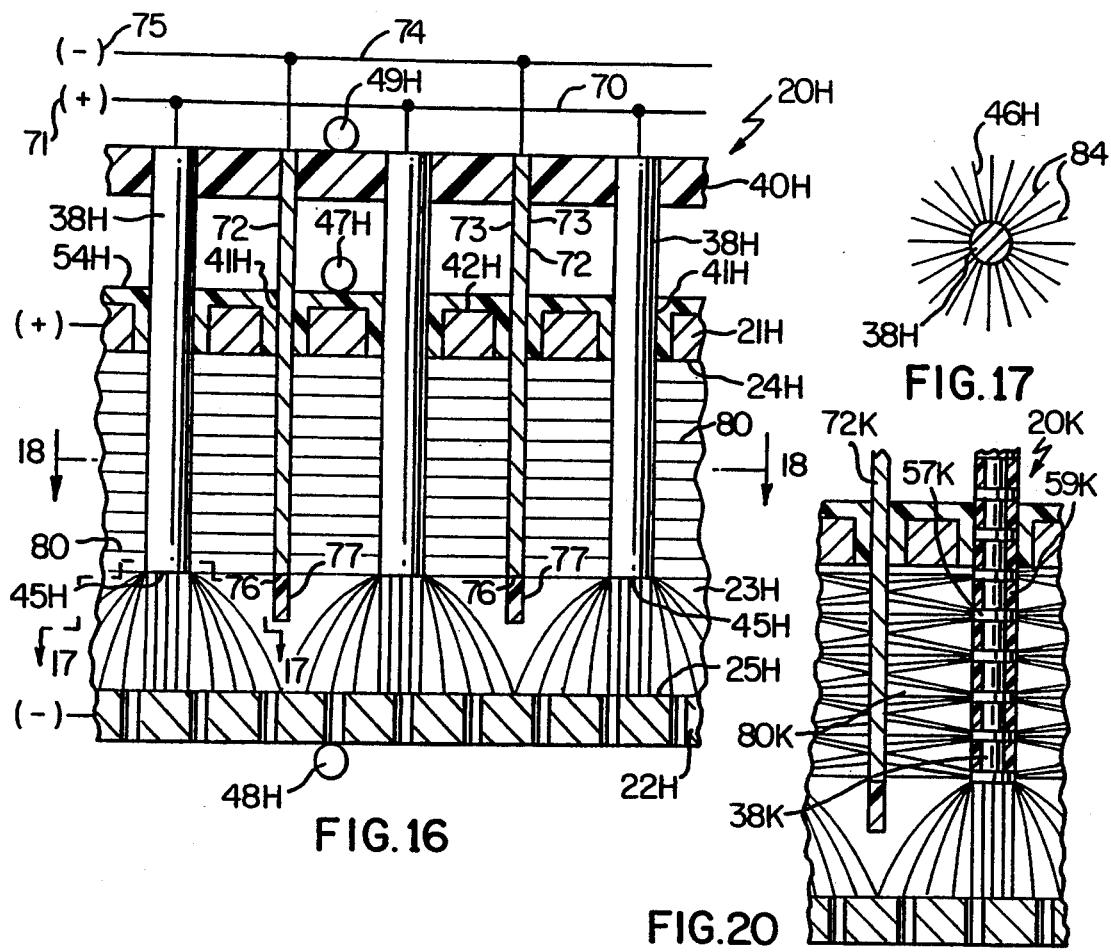
FIG.16
FIG.17
FIG.20
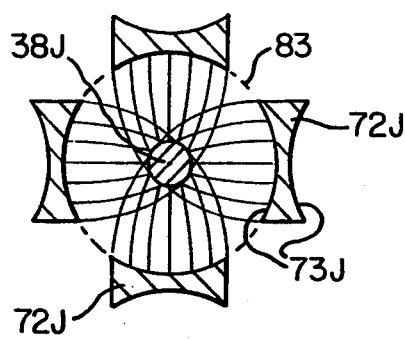
FIG.19
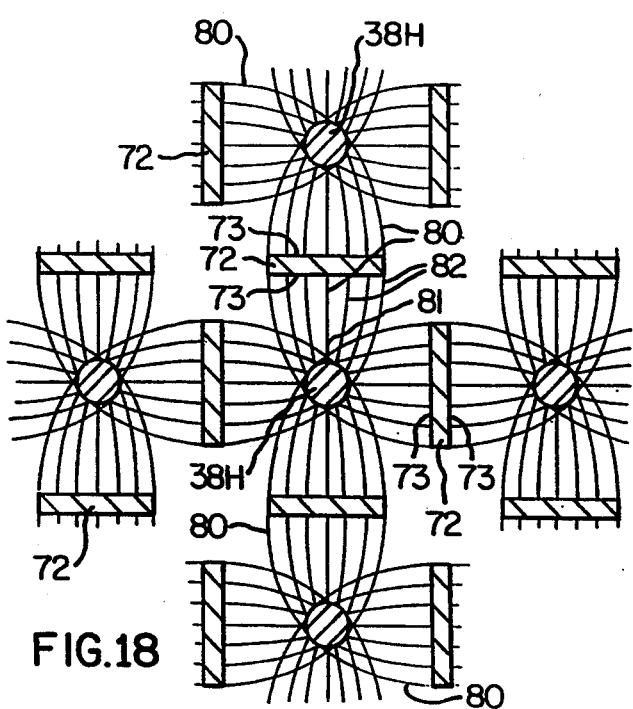
FIG.18

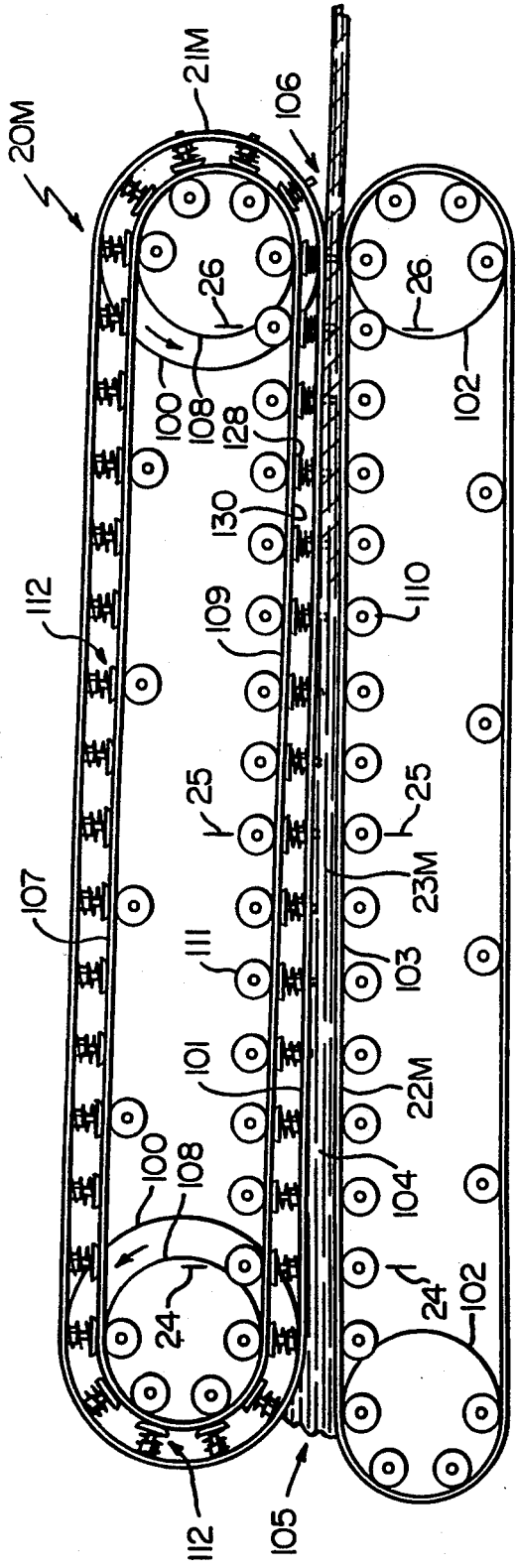
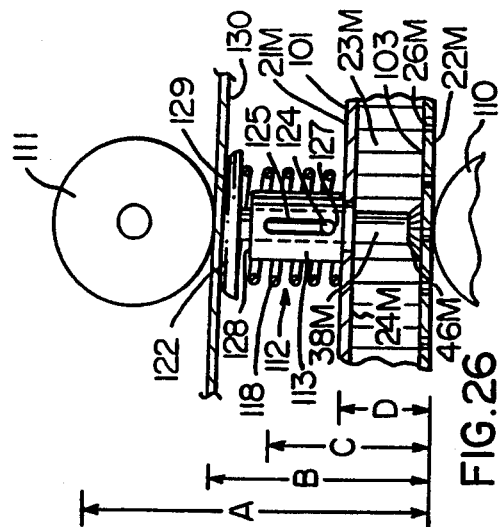
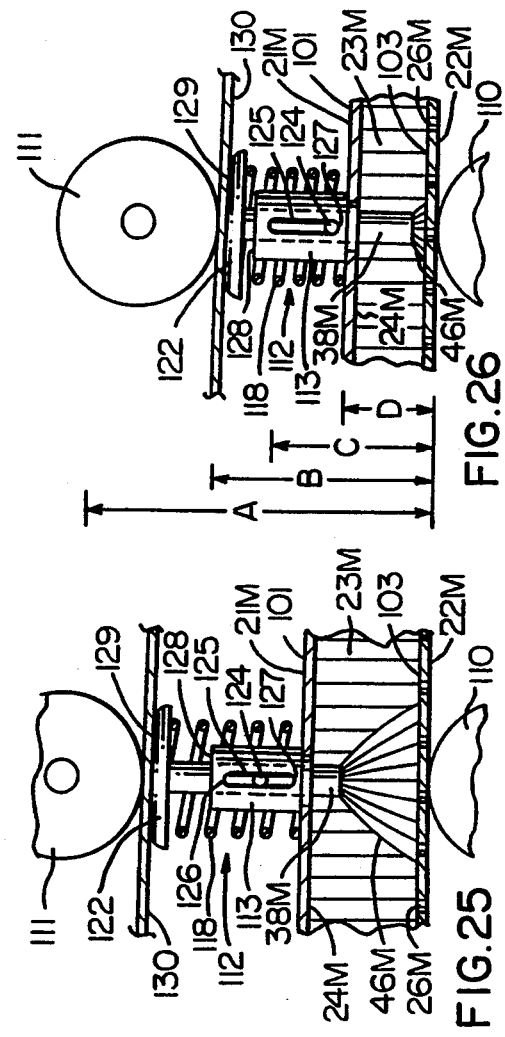
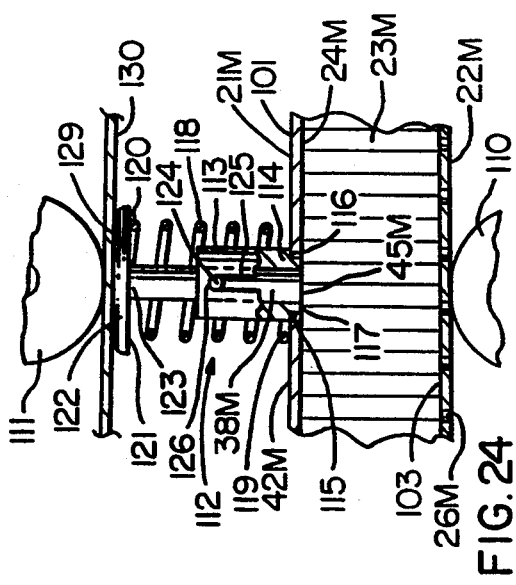
FIG. 23
FIG. 24
FIG. 25
FIG. 26

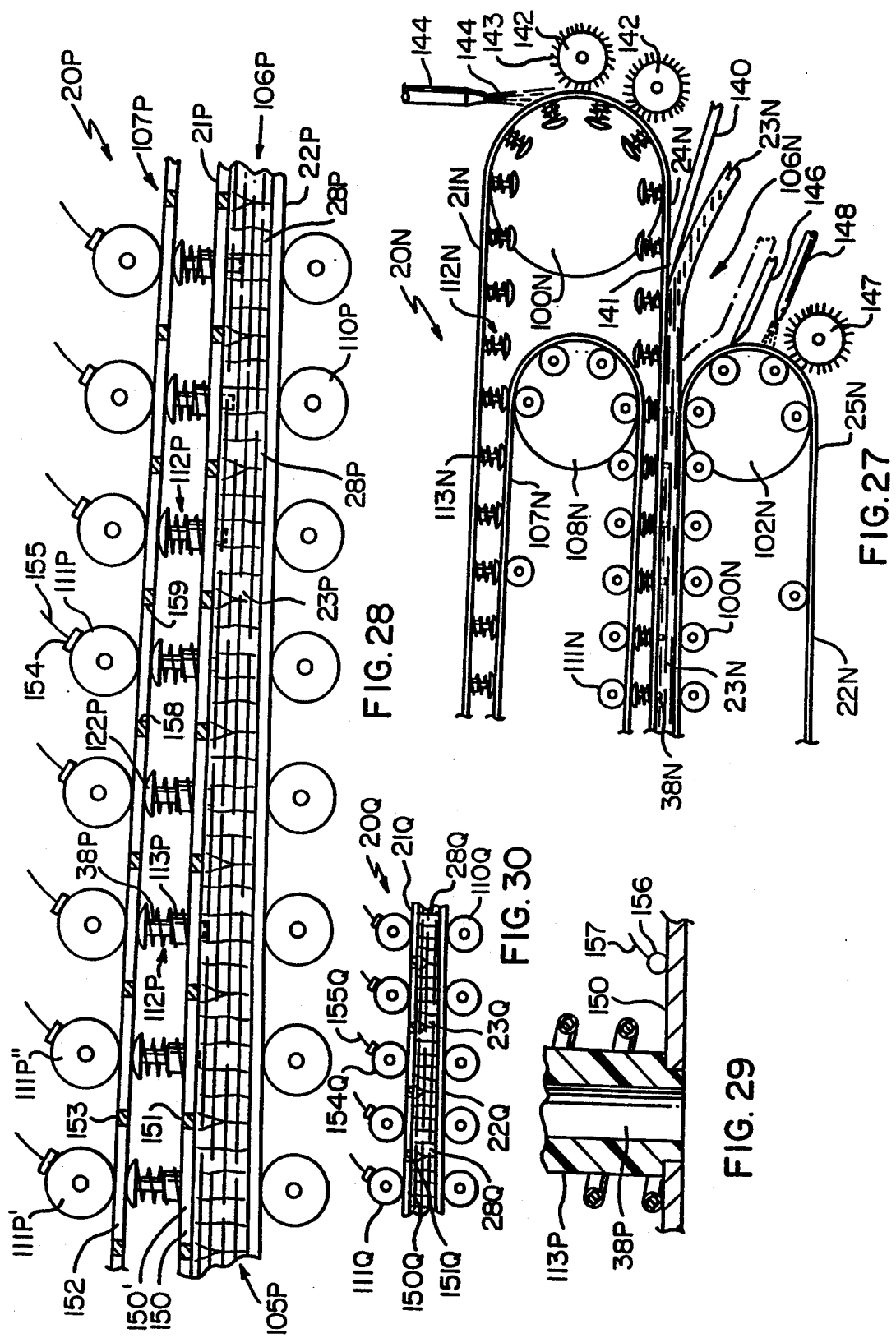

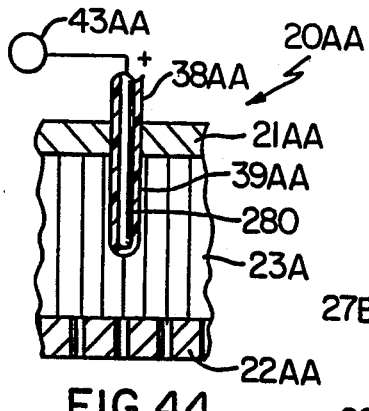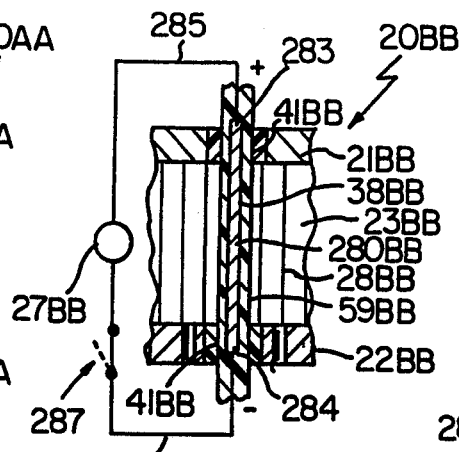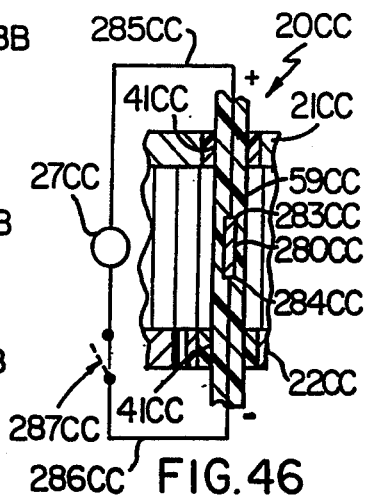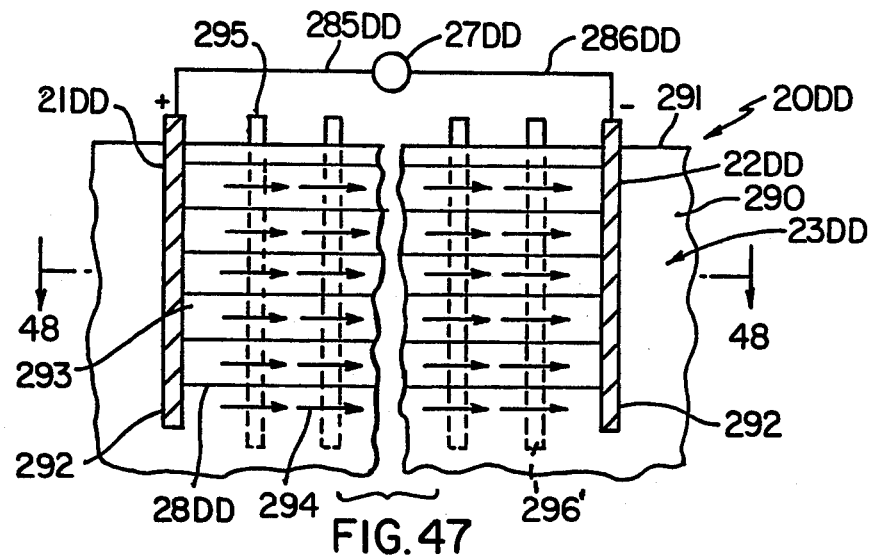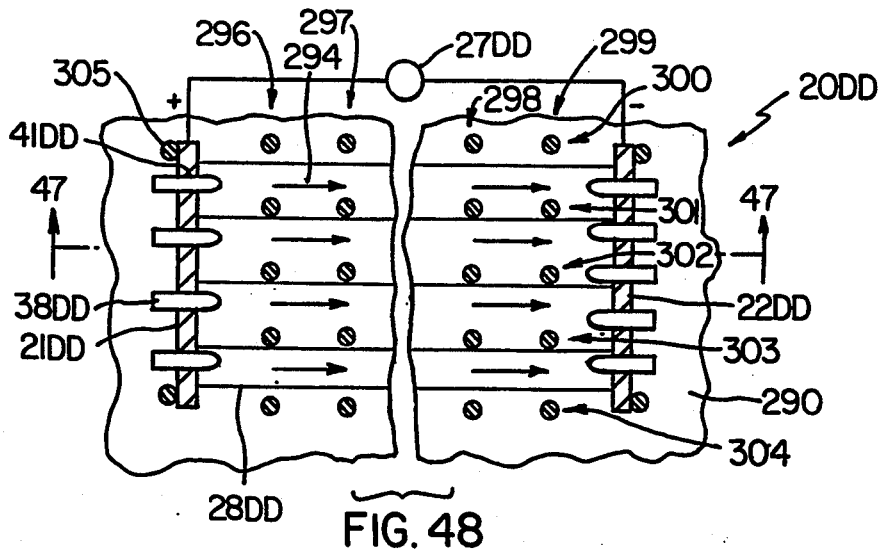

APPARATUS AND METHOD FOR REMOVING LIQUID FROM LIQUID BEARING MATERIAL

CROSS REFERENCE TO RELATED APPLICATIONS

This application is a Continuation-in-Part (CIP) patent application of its parent patent application Ser. No. 113,043, filed Aug. 27, 1993, now U.S. Pat. No. 5,362,371, which, in turn, is a CIP patent application of its parent patent application Ser. No. 031,575, filed Mar. 15, 1993, now U.S. Pat. No. 5,344,533, which, in turn, is a CIP patent application of its parent patent application Ser. No. 842,898, filed Feb. 27, 1992, now U.S. Pat. No. 5,259,940, which, in turn, is a CIP patent application of its parent patent application Ser. No. 731,791, filed Jul. 17, 1991, now U.S. Pat. No. 5,160,593, which, in turn, is a CIP patent application of its parent patent application Ser. No. 695,603, filed May 3, 1991, now abandoned, which, in turn, is a CIP patent application of its respective parent patent application Ser. Nos. 575,416, filed Aug. 29, 1990, now U.S. Pat. No. 5,114,553, and 502,506, filed Mar. 30, 1990, now U.S. Pat. No. 5,019,230, said patent application Ser. No. 575,416, is a divisional application of application Ser. No. 454,718, filed Dec. 21, 1989, now U.S. Pat. No. 4,975,166 and said patent application Ser. No. 502,506, is a CIP application of said application Ser. No. 454,718, filed Dec. 21, 1989, now U.S. Pat. No. 4,975,166, which, in turn, is a CIP patent application of its parent patent application Ser. No. 386,579, filed Jul. 27, 1989, now abandoned in favor of its Continuation patent application Ser. No. 464,982, filed Jan. 16, 1990, now U.S. Pat. No. 5,021,136, said Ser. No. 386,579 being, in turn, a CIP patent application of its parent patent application Ser. No. 284,197, filed Dec. 14, 1988, now U.S. Pat. No. 4,877,503, which, in turn, is a CIP patent application of its parent patent application Ser. No. 213,709, filed Jun. 30, 1988, now abandoned, which, in turn, is a CIP patent application of its parent patent application Ser. No. 189,974, filed May 4, 1988, now abandoned, which, in turn, is a CIP patent application of its parent patent application Ser. No. 062,201, filed Jun. 15, 1987, now U.S. Pat. No. 4,780,188, which, in turn, is a CIP patent application of its parent patent application Ser. No. 032,746, filed Mar. 31, 1987, now U.S. Pat. No. 4,767,514.

BACKGROUND OF THE INVENTION

1. Field of the Invention

This invention relates to a new apparatus for removing liquid from liquid bearing material and to a new method for removing liquid from liquid bearing material.

2. Prior Art Statement

It is known to provide an apparatus for removing liquid from liquid bearing material and comprising a pair of electrode means having portions thereof disposed adjacent each other and defining an inlet means to the adjacent portions and an outlet means from the adjacent portions, means for feeding the liquid bearing material into the inlet means, means for moving said liquid bearing material from the inlet means to the outlet means so that sections of the material serially move from the inlet means to the outlet means while being disposed between the adjacent portions, means for vibrating the liquid bearing material between the adjacent portions of the electrode means as the material is moving from the inlet means to the outlet means whereby a vibratory field arrangement is applied to the material, and means for creating a voltage between the pair of electrode means so as to create an electrostatic field arrangement between the adjacent portions of the pair of electrode means for acting through the material that is disposed therebetween to remove liquid from that said material. For example, see the Candor U.S. Pat. Nos. 3,931,682 and 4,236,317; the Muralidhara et al U.S. Pat. Nos. 4,561,953, 4,747,920, 4,802,964 and 5,049,248; Chapter 14, pages 335-374, of the book, *Advances in Solid-Liquid Separation*, edited by H. S. Muralidhara and published in November, 1986; the chapter entitled "Scale-Up of Electroacoustic Dewatering of Sewage Sludges", pages 504-519 of the book, *Solid/Liquid Separation: Waste Management and Productivity Enhancement*, edited by H. S. Muralidhara and published in December, 1989; and the PCT patent application of Battelle Memorial Institute, No. WO 91/03309 that was published Mar. 21, 1991 (see corresponding U.S. Pat. No. 5,114,560).

It is also known from the aforementioned Candor U.S. Pat. No. 3,931,682, to sonically or ultrasonically vibrate the entire drum or roller that comprises one of the electrode means.

It is also known to attach a plurality of sonic or ultrasonic transducer elements to a single plate or sheet to vibrate the same for dewatering purposes. For example, see the Morton et al. U.S. Pat. No. 4,919,807, and the aforementioned PCT patent application of Battelle Memorial Institute, No. WO 91/03309 that was published Mar. 21, 1991.

It is also known to provide an apparatus for removing liquid from liquid bearing material and comprising a pair of electrode means having portions thereof disposed adjacent each other, means for disposing the liquid bearing material between the adjacent portions, means for compressing the liquid bearing material between the electrode means to remove liquid from the material, and means for creating a voltage between the electrode means for acting through the material that is disposed therebetween to enhance the removal of the liquid from the material that is disposed therebetween. For example, see the aforementioned Candor U.S. Pat. No. 3,931,682; the aforementioned Candor U.S. Pat. No. 4,236,317; the Stiles U.S. Pat. No. 3,705,847; the Thomas U.S. Pat. No. 2,740,756; the aforementioned Muralidhara et al U.S. Pat. No. 4,802,964, and the article "Electrodes give dewatering a boost" in the No. 2, 1990, issue of *Water Quality International*.

It is also known to have an electrode means of an electrodewatering apparatus formed from a plurality of conductive segments arranged in a serial manner and being electrically insulated from each other. For example, see the Japanese patent application, No. 61-259716, that was laid open by the Japanese Patent Office on Nov. 11, 1986.

It is also known to step the voltage acting through a liquid bearing material in a batch process where the liquid bearing material is stationary between a pair of electrode means. For example, see the aritcle entitled "Electroosmotic Dewatering of Clays, I. Influence of Voltage" by N. C. Lockhart, published in 1983 in *Colloids and Surfaces*, Vol. 6, pages 229-238.

It is also known to provide an apparatus for removing liquid from liquid bearing material and comprising a pair of spaced electrodes for being disposed on opposite sides of the material, means for creating an electrostatic field between the electrodes for acting through the material to remove liquid from the material, and a projection extending from one of the electrodes to assist in removing liquid from the liquid bearing material, the electrodes comprising a pair of movable endless belts having adjacent runs thereof adapted to move in the same direction with the material therebetween so as to move in the same direction therewith. For example, see the aforementioned Candor U.S. Pat. No. 4,236,317.

It is also known to have the projection of an arrangement project through an opening means passing through one of the electrodes. For example, see the King U.S. Pat. No. 4,341,617.

While the aforementioned Candor U.S. Pat. No. 4,236,317, also describes that the projection and the electrodes can be sonically or ultrasonically vibrated while the projection is projecting into and/or through the liquid bearing material that is disposed between the electrodes for further enhancing the electrostatic action in removing liquid from the liquid bearing material, also see the aforementioned Candor U.S. Pat. No. 3,931,682; the aforementioned Muralidhara et al Pat. Nos. 4,561,953; 4,747,920; 4,802,964 and 5,049,248, the aforementioned Chapter 14, pages 335-374, of the book *Advances in Solid-Liquid Separation* edited by H. S. Muralidhara; the aforementioned chapter entitled "Scale-Up of Electroacoustic Dewatering of Sewage Sludges", pages 504-519 of the book, *Solid/Liquid Separation: Waste Management and Productivity Enhancement*, edited by H. S. Muralidhara; and the aforementioned PCT patent application of Battelle Memorial Institute, No. WO 91/03309, that was published Mar. 21, 1991, for other examples of apparatus that utilize sonic or ultrasonic vibrations in combination with an electrostatic field to remove liquid from liquid bearing material.

It is also known to provide different frequencies and/or intensities of vibrations along the length of a vibratory tray to impart vibratory action to a slurry flowing along the top of the tray. For example, see the aforementioned Morton et al U.S. Pat. No. 4,919,807.

It is also known that liquid in capillaries or porous material tends to physically move in the direction of increasing field inhomogeneity to the capillary or pore mouth when an inhomogeneous electrostatic or electric field or nonuniform electrostatic or electric field is directed across that capillary or porous body. For example, see the article "Effect of a Corona Discharge Field On Evaporation of Liquid From Capillaries" by Karpovich et al, J. Eng. Phys., 1981, 41, 1333. In addition, see the article "Study of Electric Field-Induced Effects on Water Vapor Adsorption in Porous Adsorbents" by Someshwar et al, Ind. Eng. Chem. Fundam., 1985, 24, 215-220; the article "Effect of an Electric Field on the Kinetics of Water Sorption by a Capillary-Porous Material" by Panchenko et al, J. Eng. Phys., 1972, 22, 554, and the article "Influence of Inhomogeneous Electric and Magnetic Fields on Internal Mass Transfer In Capillary-Porous Bodies" by Panasyuk et al, J. Eng. Phys., 1978, 35, 827.

It is also known to provide a crossflow filter apparatus for continuously removing liquid from a liquid bearing material comprising a housing means, a filter disposed within the housing means to form a crossflow chamber in the housing means on one side of the filter and a filtrate chamber in the housing means on the other side of the filter, an electrode means disposed in one of the chambers for creating an electrostatic field arrangement that enhances the flow of liquid from the liquid bearing material in the crossflow chamber through the filter into the filtrate chamber, means for supplying the liquid bearing material into one end of the crossflow chamber, means at the other end of the crossflow chamber for removing the liquid bearing material therefrom that has been depleted of some of the liquid thereof, and means for removing filtrate from the filtrate chamber. For example, see the Muralidhara U.S. Pat. Nos. 5,043,048 and 5,064,515.

It is also known to provide an apparatus and a method for moving at least some of the liquid in liquid bearing soil or ground having a top surface means, the method comprising the steps of disposing first electrode means and second electrode means in the ground so as to have at least portions thereof disposed beneath the top surface means and so as to have a section of the ground disposed between the portions of the electrode means, creating an electrostatic field between the portions of the electrode means to tend to move at least some of the liquid in the section of the ground toward one of the portions of the electrode means, and imposing a vibratory field arrangement on the section of the ground to enhance the movement of the liquid in the section of the ground toward the one of the portions of the electrode means. For example, see the Kim U.S. Pat. No. 5,098,538.

SUMMARY OF THE INVENTION

One feature of this invention is to provide a new apparatus and method for removing liquid from liquid bearing material by providing different intensities of vibrational energy to different sections of the liquid bearing material that is disposed between adjacent portions of the electrode means of an electrodewatering apparatus in a unique manner to assist in removing liquid from the liquid bearing material.

In particular, it is believed according to the teachings of this invention that as the liquid in liquid bearing material is being removed by the combined action of an electrostatic field means and a vibratory field means that pass through the material, the amount of liquid remaining in the material requires a higher intensity of the vibratory field means to further remove the remaining liquid because the capillary holding force on the remaining liquid is harder to overcome at a lesser vibratory intensity that was sufficient to initially enhance the liquid removal from the liquid bearing material.

Therefore, it is further believed according to the teachings of this invention that unique means can be provided to permit such varying intensity of the vibratory field means to be utilized with an electrodewatering apparatus.

For example, one embodiment of this invention provides an apparatus for removing liquid from liquid bearing material and comprising a pair of electrode means having portions thereof disposed adjacent each other and defining an inlet means to the adjacent portions and an outlet means from the adjacent portions, means for feeding the liquid bearing material from the inlet means to the outlet means so that sections of the material serially move from the inlet means to the outlet means while being disposed between the adjacent portions, means for vibrating the liquid bearing material between the adjacent portions of the electrode means as the material is moving from the inlet means to the outlet means whereby a vibratory field arrangement is applied to the material, and means for creating a voltage between the pair of electrode means so as to create an electrostatic field arrangement between the adjacent portions of the pair of electrode means for acting through the material that is disposed therebetween to remove liquid from the material, the means for vibrating the liquid bearing material having means for simultaneously providing different vibratory field actions to different sections of the material that are serially disposed between the inlet means and the outlet means so that different intensities of the vibratory field arrangement serially act on each section of the material as each section of the material moves from the inlet means to the outlet means, the means for vibrating the liquid bearing material comprising at least one of the electrode means.

It is another feature of this invention to provide a new apparatus and method for removing liquid from liquid bearing material by providing different voltages between different parts of adjacent portions of the electrodes of an electrodewatering apparatus in a unique manner to assist in removing liquid from the liquid bearing material.

In particular, it is believed according to the teachings of this invention that as the liquid in liquid bearing material is being removed by the action of an electrostatic field that passes through the material, the amount of liquid remaining in the material requires a higher voltage between the electrodes that create the electrostatic field therebetween to further remove the same because the capillary holding force on the remaining liquid is harder to overcome at a lesser voltage that is sufficient to remove the liquid when the material is initially being dewatered. For example, see the aforementioned article "Electroosmotic Dewatering of Clays, I. Influence of Voltage" by N. S. Lockhart, published in 1983 in *Colloids and Surfaces*, Vol. 6, pages 229–238, whereby this article is being incorporated into this disclosure by this reference thereto.

Therefore, it is further believed according to the teachings of this invention that unique means can be provided to permit such varying voltage to be utilized with an electrodewatering apparatus.

For example, one embodiment of this invention provides an apparatus for removing liquid from liquid bearing material and comprising a pair of electrode means having portions thereof disposed adjacent each other, means for disposing the liquid bearing material between the adjacent portions, means for compressing the liquid bearing material between the electrode means to remove liquid from the material, and means for creating a voltage between the electrode means so as to create an electrostatic field arrangement between the adjacent portions of the electrode means for acting through the material that is disposed therebetween to enhance the removal of the liquid from the material that is disposed therebetween, the apparatus having means for providing different voltages respectively between a plurality of different pairs of adjacent parts of the electrode means so that the intensities of the resulting electrostatic fields that respectively act through the parts of the material that are respectively disposed between the different pairs of adjacent parts of the electrode means are different.

It is also a feature of this invention to combine the varying voltage feature of this invention with the varying vibratory field intensity feature of this invention to further enhance the electrodewatering of a liquid bearing material.

It is also a feature of this invention to utilize one or more of the previously described features of this invention in a crossflow filter apparatus and method.

For example, one embodiment of this invention comprises a crossflow filter apparatus for continuously removing liquid from a liquid bearing material comprising a housing means, a filter disposed within the housing means to form a crossflow chamber in the housing means on one side of the filter and a filtrate chamber in the housing means on the other side of the filter, an electrode means disposed in one of the chambers for creating an electrostatic field arrangement that enhances the flow of liquid from the liquid bearing material in the crossflow chamber through the filter into the filtrate chamber, means for supplying the liquid bearing material into one end of the crossflow chamber, means at the other end of the crossflow chamber for removing the liquid bearing material therefrom that has been depleted of some of the liquid thereof, and means for removing filtrate from the filtrate chamber, the electrode means having means for providing a plurality of electrostatic fields that have different intensitites that serially act on each section of the liquid bearing material as each section of the liquid bearing material moves from the one end of the crossflow chamber to the other end of said crossflow chamber.

It is also a feature of this invention to utilize one or more of the previously described features of this invention for moving at least some of the liquid in liquid bearing soil or ground.

For example, one embodiment of this invention comprises a method for moving at least some of the liquid in liquid bearing soil or ground having a top surface means and comprising the steps of disposing first electrode means and second electrode means in the ground so as to have at least portions thereof disposed beneath the top surface means and so as to have a section of the ground disposed between the portions of the electrode means, creating an electrostatic field between the portions of the electrode means to tend to move at least some of the liquid in the section of the ground toward one of the portions of the electrode means, and imposing a vibratory field arrangement on the section of the ground to enhance the movement of the liquid in the section of the ground toward the one of the portions of the electrode means, the step of imposing the vibratory field arrangement on the section of the ground comprising the step of simultaneously imposing a plurality of different vibratory field actions on the section of the ground so that a plurality of different intensities and/or frequencies of the vibratory field arrangement act on the section of the ground in series between the portions of the electrode means as at least some of the liquid thereof is being moved between the portions of the electrode means.

Accordingly, it is an object of this invention to provide a new apparatus for removing liquid from liquid bearing material and having one or more of the novel features of this invention as set forth above or hereinafter shown or described.

Another object of this invention is to provide a new method for removing liquid from liquid bearing material, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 1 is a fragmentary cross-sectional view that schematically illustrates the apparatus and method of this invention for removing liquid from liquid bearing material.

FIG. 2 is a view similar to FIG. 1 and illustrates the apparatus of FIG. 1 in another operating position thereof.

FIG. 6 is a view similar to FIG. 1 and illustrates another apparatus and method of this invention.

FIG. 7 is a view similar to FIG. 6 and illustrates the apparatus of FIG. 6 in another operating position thereof.

FIG. 10 is a view similar to FIG. 1 and illustrates another apparatus and method of this invention.

FIG. 11 is a view similar to FIG. 10 and illustrates the apparatus of FIG. 10 in another operating position thereof.

FIG. 12 is a view similar to FIG. 1 and illustrates another apparatus and method of this invention.

FIG. 13 is a view similar to FIG. 12 and illustrates the apparatus of FIG. 12 in another operating position thereof.

FIG. 14 is a view similar to FIG. 1 and illustrates another apparatus and method of this invention.

FIG. 15 is a view similar to FIG. 1 and illustrates another method and apparatus of this invention.

FIG. 16 is a view similar to FIG. 1 and illustrates another method and apparatus of this invention.

FIG. 17 is a fragmentary cross-sectional view taken on line 17—17 of FIG. 16 to illustrate the field lines of the nonuniform field being created by a particular projection of the method and apparatus of FIG. 16.

FIG. 18 is a fragmentary cross-sectional view taken on line 18—18 of FIG. 16.

FIG. 19 is a view similar to FIG. 18 and illustrates another embodiment of the method and apparatus of this invention.

FIG. 20 is a view similar to FIG. 18 and illustrates another method and apparatus of this invention.

FIG. 23 is a schematic side view similar to FIG. 1 and illustrates another apparatus and method of this invention.

FIG. 24 is an enlarged fragmentary view of the apparatus and method illustrated in FIG. 23 and is taken in the general area of the lines 24—24 thereof.

FIG. 25 is a view similar to FIG. 24 and is taken in the general area of the lines 25—25 of FIG. 23.

FIG. 26 is a view similar to FIG. 24 and is taken in the general area of the lines 26—26 of FIG. 23.

FIG. 27 is a fragmentary view similar to FIG. 23 and illustrates another apparatus and method of this invention.

FIG. 28 is an enlarged fragmentary view similar to FIG. 23 and illustrates another apparatus and method of this invention.

FIG. 29 is an enlarged fragmentary view of part of the structure of FIG. 28 and illustrates another apparatus and method of this invention.

FIG. 30 is a reduced fragmentary view similar to FIG. 28 and illustrates another apparatus and method of this invention.

FIG. 44 is a view similar to FIG. 1 and illustrates another apparatus and method of this invention.

FIG. 45 is a view similar to FIG. 1 and illustrates another apparatus and method of this invention.

FIG. 46 is a view similar to FIG. 1 and illustrates another apparatus and method of this invention.

FIG. 47 is a fragmentary cross-sectional view of a ground or soil area or site and illustrates another apparatus and method of this invention, FIG. 47 being taken in the direction of the arrows 47—47 of FIG. 48.

FIG. 48 is a fragmentary cross-sectional view taken in the direction of the arrows 48—48 of FIG. 47.

DESCRIPTION OF THE PREFERRED EMBODIMENTS

Figure 3:
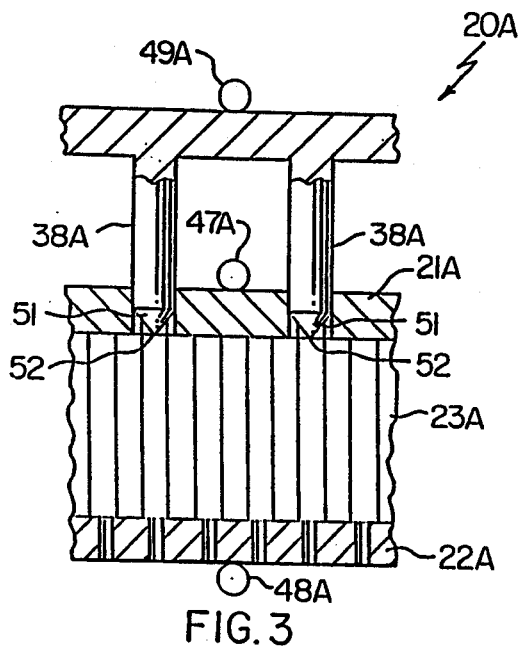
FIG. 3 is a view similar to FIG. 1 and illustrates another apparatus and method of this invention.

While the various features of this invention are hereinafter described and illustrated as being particularly adapted to provide an apparatus and method for dewatering certain types of liquid bearing material it is to be understood that the various features of this invention can be utilized singly or in various combinations thereof to remove liquid from other types of liquid bearing material or to merely reduce the liquid content of a liquid bearing material with the resulting dewatered product still being considered as being relatively liquid or to merely move at least some of the liquid in liquid bearing material.

In addition, it is to be understood that the liquid bearing material can comprise soil or ground that either has the liquid thereof initially forming a part thereof or being added thereto to be subsequently moved through an area of the soil or ground so as to purge or remove another liquid and/or particles originally contained therein, the other liquid and/or particles being desirable products or contaminates as the case may be.

Also, while the various features of this invention are hereinafter described and illustrated as being particularly adapted to provide an apparatus and method for removing at least some of the liquid of a liquid bearing material, it is to be understood that the various features of this invention can be utilized singly or in various combinations thereof to merely move at least some of the liquid of the liquid bearing material relative thereto.

Therefore, this invention is not to be limited to only the embodiments illustrated in the drawings, because the drawings are merely utilized to illustrate some of the wide variety of uses of this invention.

Referring now to FIGS. 1 and 2, the method and apparatus of this invention is generally indicated by the reference numeral 20 and comprises a pair of spaced apart electrodes 21 and 22 disposed on opposite sides of a liquid bearing material 23, such as a slurry of a liquid and particles, fibers, etc., the electrodes 21 and 22 being formed of any suitable electrically conductive material and respectively having facing sides 24 and 25 for being disposed in engagement with the material 23 in any of the manners set forth in the aforementioned nine U.S. patents, Chapter 14 of the book *Advances in Solid-Liquid Separation* and the article "Electrodes give dewatering a boost" in the No. 2, 1990 issue of *Water Quality International* whereby the Candor U.S. Pat. Nos. 4,236,317 and 3,931,682; the Muralidhara et al U.S. Pat. Nos. 4,561,953, 4,747,920, 4,802,964 and 5,049,248; the Thomas U.S. Pat. No. 2,740,756; the Stiles U.S. Pat. No. 3,705,847; the King U.S. Pat. No. 4,341,617, Chapter 14 of the book *Advances in Solid-Liquid Separation* edited by H. S. Muralidhara and the article "Electrodes give dewatering a boost" in the No. 2, 1990 issue of *Water Quality International* are being incorporated into this disclosure by this reference thereto not only for the teachings of the apparatus and methods thereof but also for the teachings of some of the types of liquid bearing materials that can be utilized in the apparatus and method 20 of this invention.

Also see the Diaz U.S. Pat. No. 4,861,496; the European patent application to Yamaguchi et al, No. 0,286,714 (see the 1993 corresponding U.S. Pat. No. 5,192,413) and pages 504–519 of the newly published book of Battelle Press and entitled *Solid/Liquid Separation: Waste Management and Productivity Enhancement* edited by J. S. Muralidhara whereby these three items are also being incorporated into this disclosure by this reference thereto.

Thus, it can be seen that the electrodes 21 and 22 can comprise part of a stationary apparatus wherein the only movement of the electrodes 21 and 22 is that the electrode 21 can move toward the electrode 22 in either a mere floating manner or under a pressure force as the liquid in the liquid bearing material 23 is being removed therefrom in a manner hereinafter set forth or that the electrodes 21 and 22 can comprise movable endless means, such as belt means, drums or rolls or combinations thereof, for continuously dewatering the material 23 disposed therebetween together with the movable means 21 being movable toward the movable means 22 as the liquid in the liquid bearing material 23 is being removed therefrom in either a mere floating manner or under a pressure force as will be apparent hereinafter.

In any event, the lower electrode 22 has a plurality of passages 26 passing completely therethrough and normally being of a size that will permit liquid of the liquid bearing material 23 to pass therethrough without any substantial amount of the solid particles of the material 23 passing through the passages 26 in a manner well known in the art of dewatering material, such as suspensions, slurries or sludges of particles and liquids, etc. Of course, a suitable filter means, such as non-conductive or conductive filter cloths can cover the side 25 of the electrode 22 and/or cover the side 24 of the electrode 21 as set forth in certain of the references previously incorporated by reference into this application as well as in certain of the references hereinafter referred to and/or also incorporated into this application by the reference thereto.

The apparatus 20 comprises means 27 for creating an electrostatic field or electric field 28 between the electrodes 21 and 22 for acting through the material 23 to remove liquid from the material 23 by the well-known phenomena of electrophoresis and electro-osmosis, the electrostatic field 28 being generally uniform and theoretically having a plurality of field lines 29 that are disposed in spaced parallel relation and extend at right angles between the facing surfaces 24 and 25 of the electrodes 21 and 22 as illustrated in FIG. 1.

The means 27 creates such electrostatic field 28 by at least charging one of the electrodes 21 and 22 with either a negative or a positive potential while either oppositely charging the other of the electrodes 21 and 22 or grounding such other electrode 21 or 22, the means 27 being adapted to maintain the desired amount of potential differential between the electrodes 21 and 22 from just a few volts to many kilovolts such as desired, even though there may be an electrical current flow created between the electrodes 21 and 22.

However, in the embodiment illustrated in FIG. 1, the means 27 is adapted to charge the electrode 21 with one potential through a lead 30 that is disposed in electrical contact with the electrode 21 and to oppositely charge the electrode 22 through a lead 31 that is electrically interconnected to the electrode 22 as illustrated.

It is generally well known that if the electrode 21 is positively charged and the electrode 22 is negatively charged with the particles of the liquid bearing material 23 being negatively charged, the resulting electrostatic field 28 causes the particles of the liquid bearing material 23 to migrate toward the electrode 21 by the phenomena of electrophoresis and the liquid of the liquid bearing material 23 to be forced through the passages 26 of the lower electrode 22 by the phenomena of electroosmosis.

In order to assist in the removal of the liquid from the liquid bearing material 23 as the electrostatic field 28 is being applied through the material 23 by the electrodes 21 and 22, a pressure differential is created across the electrode 22 by a suction device 32 having its inlet 33 disposed in fluid communication with a chamber defining means 34 that is disposed in substantially sealing relation with the lower surface 35 of the electrode 22 and defines a chamber 36 therewith which is in fluid communication with the inlet 33 of the suction device 32 so that the suction device 32 tends to draw the liquid through the passages 26 in the lower electrode 22 in a manner well known for an evacuating apparatus, the suction device 32 having an outlet 37 for dispensing the removed liquid from the suction device 32 in a manner well known in the art.

In addition to such suction device 32 or in lieu thereof, the pressure differential can be provided by compressing the electrodes 21 and 22 toward each other during the dewatering operation, such as forcing the upper electrode 21 toward the lower electrode 22 by a suitable ram means (not shown but similar to the ram means 40' of FIG. 1).

The apparatus 20 of this invention includes a plurality of needle-like projections 38 formed of any suitable conductive material and being adapted to project into the material 23 between the electrodes 21 and 22, such as illustrated in FIG. 2, to assist in the dewatering or in the liquid removal of the liquid of the liquid bearing material 23 for the reasons fully set forth in the aforementioned Candor U.S. Pat. No. 4,236,317.

If desired, the projections 38 can each have an end 39 that is secured to a plate 40 so that as the plate 40 moves upwardly or downwardly in the drawings, the projections 38 will move in unison therewith, the plate 40 being illustrated in FIGS. 1 and 2 as being integral and one-piece with the projections 38 and thereby being formed of the same metallic material as the projections 38. However, it is to be understood that plate 40 could be formed of any other suitable material and could actually be formed of electrically insulating material as will be apparent hereinafter.

The upper electrode 21 is provided with a plurality of openings 41 passing completely through the outer surface 42 and the inner surface 24 thereof and respectively receive the projections 38 therein so that the projections 38 can pass through the openings 41 to be received into the space between the electrodes 21 and 22 depending upon the position of the plate 40 relative to the electrode 21.

The projections 38 are adapted to have a desired electrical potential imposed thereon by any suitable means and the means 27 previously described can be utilized for such purpose. However, a separate means can be utilized for charging the projections 38 and such separate means is generally indicated by the reference numeral 43 in the drawings and is adapted to charge the plate 40 and, thus, the projections 38 through a suitable lead 44 that is electrically interconnected to the plate 40 in any suitable manner.

The projections 38 each has a diameter that substantially fills the diameter of its respective opening 41 of the electrode 21 and has a substantially flat end surface 45 that is adapted to be disposed substantially flush with the inside surface 24 of the electrode 21 in the manner illustrated in FIG. 1 so that not only does the liquid bearing material 23 become completely blocked from entering the openings 41 in the electrode 21, but also when the projections 38 are charged with a potential that is the same potential that the upper electrode 21 is being charged with by the means 27, the resulting electrostatic field 28 between the electrodes 21 and 22 is initially substantially uniform as illustrated in FIG. 1 by the uniformly spaced apart parallel field lines 29. However, as the projections 38 are being progressively moved into the material 23 as the plate 40 is being progressively moved toward the electrode plate 21 in the manner illustrated in FIG. 2, such as by suitable ram means or the like 40', FIG. 1, the end surfaces 45 of the projections 38 create substantially nonuniform electrostatic fields or electric fields 46 with the lower electrode 22 in the manner illustrated in FIG. 2 while the electrode 21 is still tending to maintain the substantially uniform field 28 with the lower electrode 22 whereby the fields 28 and 46 are respectively imposed on the material 23 for a purpose hereinafter described.

While the ram means 40' is only shown in FIG. 1, it is to be understood that such ram means 40' or other moving means is operatively interconnected to the movable projections in all of the other embodiments of this invention in a like manner, such ram means being of any suitable type and being operated by any suitable force applying means as is well known in the press art or the like. For example, see the Moeglich U.S. Pat. No. 4,244,804; the Weaver U.S. Pat. No. 4,380,251, and the Weaver U.S. Pat. No. 4,458,710, for such moving means or ram means whereby these three patents are being incorporated into this disclosure by this reference thereto.

If desired, the electrode 21, the electrode 22 and the projections 38 can be sonically or ultrasonically vibrated in any suitable manner during the dewatering operation of the apparatus 20 of this invention, such sonic or ultrasonic vibration imparting means being respectively illustrated by devices 47, 48 and 49 and being of any suitable type, such as being of the sonic and ultrasonic vibrating types set forth in the aforementioned five U.S. Pat. Nos. 4,236,317; 3,931,682; 4,561,953; 4,747,920 and 4,802,964 and two books. However, it is to be understood that only the projections 38 need be vibrated, only the upper electrode 21 needs to be vibrated, only the lower electrode 22 needs to be vibrated or any desired combination thereof needs to be vibrated as desired.

For example, the vibrator devices 47, 48 and 49 can each be of the type set forth in the Rines U.S. Pat. No. 2,744,860; the Bodine U.S. Pat. No. 3,472,295; the Shoh U.S. Pat. No. 4,016,436; the Morton et al U.S. Pat. No. 4,741,839; the aforementioned Morton et al U.S. Pat. No. 4,919,807; and the Beard et al U.S. Pat. No. 4,729,175, as it is believed that the devices thereof can be respectively disposed against the plates 21, 22 and 40 and not only cause the plates 21, 22 and 40 to vibrate therewith, but also to cause the projections 38 and the material 23 to be vibrated thereby whereby these six patents are being incorporated into this disclosure by this reference thereto. Also, see the aforementioned Muralidhara et al U.S. Pat. No. 4,802,964, for such a vibrator device.

Therefore, it can be seen that the method and apparatus 20 of this invention can be formed of relatively simple parts to operate in a manner now to be described.

With the projections 38 disposed in the up position illustrated in FIG. 1 wherein the lower surfaces 45 thereof are disposed substantially flush with the lower surface 24 of the upper electrode 21, the moisture bearing material 23 is disposed between the electrodes 21 and 22 so as to be in electrical contact with the lower surface 24 of the upper electrode 21 and in electrical contact with the upper surface 25 of the lower electrode 22. The means 27 and 43 are operated in such a manner that the upper electrode 21 and projections 38 are provided with a positive charge of the same value while the lower electrode 22 is provided with an equal and opposite negative charge so that a substantially uniform electrostatic field 28 is formed between the lower electrode 22 and the upper electrode 21 and ends 45 of the projections 38 as illustrated in the drawings to act through the moisture bearing material 23 and thereby to begin the dewatering of the material 23 by causing the liquid to flow through the passages 26 by the phenomenon of electro-osmosis while the particles of the material 23 tend to migrate or move toward the upper electrode 21 by the phenomenon of electrophoresis. Of course, if the particles of the material 23 are already in a preset condition thereof so that the same will not move toward the electrode 21, such as would be the case as if the material 23 was a closely packed sludge cake, a mat of fibrous material, etc., the liquid of the material 23, nevertheless, will tend to move toward the lower electrode 22 and pass out of the passages 26 thereof by the phenomenon of electro-osmosis and the suction being created by the suction device 32 and acting in the chamber 36 to tend to evacuate the chamber 36 will assist such electrostatic field 28 in removing the liquid from the liquid bearing material 23. In addition, by sonically or ultrasonically vibrating the material 23 between the electrodes 21 and 22 by any one or all of the means 47, 48 and 49, such vibrating action coupled with the electrostatic field action 28 will further tend to remove liquid from the material 23 as fully set forth in the aforementioned three U.S. patents to Muralidhara et al, the two U.S. patents to Candor and the book and, therefore, the theories for such liquid removal need not be further discussed. Also, to further enhance the liquid removal operation, the electrode plate 21 can be forced toward the electrode plate 22 to compress the liquid bearing material 23 therebetween.

However, at any desired time during such dewatering operation of the apparatus 20 on the material 23, the plate 40 can be moved downwardly toward the electrode 21 so as to cause the projections 38 to begin to project into the material 23 below the surface 24 of the upper electrode 21 whereby the ends 45 of the projections 38 begin to form the nonuniform electrostatic fields 46 with the lower electrode 22 and it is believed that the nonuniform fields 46 create a greater dewatering effect on the material 23 than is provided by a uniform electrostatic field.

In particular, it is believed that because the nonuniform fields 46 have the field lines 50 thereof disposed more closely adjacent each other the closer the same are to the ends 45 of the projections 38 as illustrated in FIG. 2, such more intense portions of the electrostatic fields 46 more closely pack the particles of the liquid material 23 together than if the fields 46 had been uniform adjacent the surfaces 45 of the projections 38 to thereby cause a greater dewatering from those particles being more closely compacted not only by the squeezing action between the particles of the material 23, but also by the electro-osmotic effect of the more intense positions of the nonuniform fields 46.

In addition, because some of the particles in the liquid bearing material 23 may not be charged or be chargeable, the more intense portions 50 of the nonuniform fields 46 pack such particles together by the theory of dielectrophoresis. For example, see the Jordan et al U.S. Pat. No. 4,164,460, which is being incorporated into this disclosure by this reference thereto.

Thus, it is believed that as the projections 38 have their ends 45 thereof moved downwardly and further away from the lower surface 24 of the upper electrode 21, such nonuniform fields 46 act on the material 23 in the above manner with the fields 46 becoming more nonuniform as the ends 45 of the projections 38 approach the upper surface 25 of the lower electrode 22. In fact, the length of the projections 38 could be such that the projections 38 will actually eventually engage against the surface 25 of the lower electrode 22 except that under such conditions there would be a direct shorting between the projections 38 and the lower electrode 22 whereby it may be desired to stop the movement of the projections 38 into the material 23 before the ends 45 of the projections 38 cause arcing or shorting to the lower electrode 22.

Therefore, it can be seen that initially the apparatus 20 provides a uniform electrostatic or electric field 28 between the electrodes 21 and 22 and then subsequently provides a combination of the uniform field 28 and the nonuniform electrostatic or electric fields 46 in a manner believed to more greatly dewater the material 23 either at a faster rate and/or with a greater amount of liquid removal than if the projections 38 were not being utilized and only the uniform field 28 was being provided between the electrodes 21 and 22 regardless of whether or not the vibration, pressure and/or suction means are being utilized in combination therewith or not.

After the material 23 has been dewatered a desired amount by the apparatus 20, the material 23 can be readily removed therefrom by merely raising the plate 40 relative to the electrode 21 to remove the projections 38 from the space between the electrodes 21 and 22, such raising of the plate 40 causing the upper electrode 21 to strip any material that would tend to stick to the projections 38 off of the projections 38 as the same are removed to the position illustrated in FIG. 1 so that the material 23 can be removed from the apparatus 20 in any suitable manner, such as by removing the electrode 21 and plate 40 if the apparatus 20 is a batch apparatus or by having the material 23 removed out from between the electrodes 21 and 22 at the end of the belt travel thereof as in the case of the aforementioned Candor U.S. Pat. No. 4,236,317.

Of course, the projections 38 can be utilized for dewatering by also moving the projections 38 back upwardly from their down positions to the up position of FIG. 1 or could be moved many times upwardly and downwardly within the material 23 to cause a dewatering of the material 23. In fact, the projections 38 can begin the dewatering operation thereof when the same are fully disposed downwardly in the material 23 so that the dewatering action takes place as the projections 38 are merely being moved upwardly from their fully down position to their fully up position. Likewise, the projections 38 can begin the dewatering process in any position thereof whether the same are projected into the material a certain amount, the full amount or not into the material 23 at all as the case may be and then the projections 38 may be operated in any manner and degree of projection and rates of movement thereof during the dewatering process in order to provide for an optimum dewatering action therewith.

In addition, it may be found that it is desirable to change the value of the potential differential between the projections 38 and the lower electrode 22 during the various positions of the projections 38 relative to the electrode 22 so as to vary the intensity of the nonuniform fields 46 during the dewatering operation.

For example, the voltage between the projections 38 and the lower electrode 22 can be increased as the projections 38 project further down into the material 23. Of course, it may be found that it is desirable to decrease the voltage between the projections 38 at the lower electrode 22 the closer the projections 38 are moved toward the lower electrode 22. Also, such changing voltage can also be provided at the same time between the upper electrode 21 and the lower electrode 22 as desired. And it is also to be understood that the voltage between the electrodes 21 and 22, as well as between the projections 38 at the lower electrode 22, could be pulsed for the reasons fully set forth in the aforementioned Thomas U.S. Pat. No. 2,740,756, and the Muralidhara et al U.S. Pat. No. 4,802,964.

Therefore, it is to be understood that in all of the embodiments of this invention, the voltage being provided between two members thereof for acting in the liquid bearing material between those two members can be steady, varying, pulsed or oscillated, or be any combination thereof in series, if desired.

Also, it is believed that it might be desirable to apply the sonic or ultrasonic energy to the liquid bearing material between the electrode or the two members while the voltage therebetween is being changed or is remaining steady, and it is believed that it might be desirable to also have that sonic or ultrasonic energy be varying in an increasing manner or in a decreasing manner, be pulsed, etc., whereby it is to be understood that in all of the embodiments of this invention the sonic or ultrasonic energy can be varied at the same time the voltage is being varied, etc.

Also, it is to be understood that the ends 45 of the projections 38 can be shaped in any suitable manner so as to enhance not only the projecting action thereof into the material 23, but also to enhance the shape of the nonuniform fields 46 being created thereby.

Figure 4:
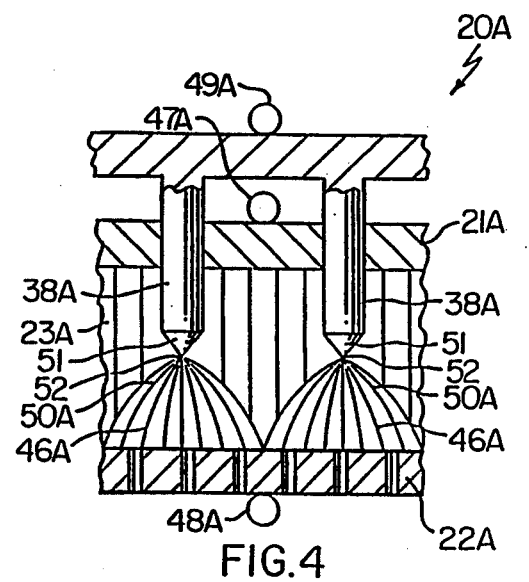
FIG. 4 is a view similar to FIG. 3 and illustrates the apparatus of FIG. 3 in another operating position thereof.
Figure 5:
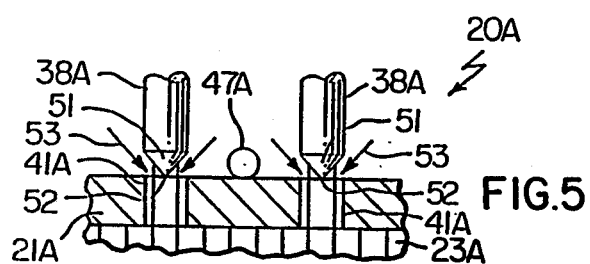
FIG. 5 a fragmentary view similar to FIG. 3 and illustrates the apparatus thereof in still another operating position thereof.

For example, another method and apparatus of this invention is generally indicated by the reference numeral 20A in FIGS. 3-5 and parts thereof similar to the parts of the method and apparatus 20 previously described are indicated by like reference numerals followed by the reference letter "A".

In regard to the method and apparatus 20A illustrated in FIGS. 3-5 and the other embodiments of this invention as illustrated in FIGS. 6-15, it is to be understood that such methods and apparatus can have the suction means 32 and chamber defining means 34 utilized therewith as well as the charging means 27 and 43 previously described as the same are merely not illustrated in FIGS. 3-20 (as well as in FIG. 2) in order to simplify the drawings and not for the purpose of indicating that such means are not being utilized therewith. In fact, the embodiments illustrated in FIGS. 8-15 merely illustrate one projection and it is to be understood that a plurality of like projections would be utilized therewith. However, it is to be understood that each embodiment of this invention need only have one movable projection rather than a plurality thereof, if desired. Also, the embodiments illustrated in FIGS. 8-15 do not provide the vibrating means 47, 48 and 49 as provided in FIGS. 1-5 and it is to be understood that such vibration means would be utilized with the embodiments illustrated in FIGS. 8-15, if desired.

As illustrated in FIGS. 3-5, it can be seen that the apparatus and method 20A is substantially the same as the method and apparatus 20 previously described except that the projection means 38A respectively have substantially pointed end surface means 51 that are substantially conical and have sharp pointed apexes 52 whereby such pointed end surfaces 51 create the nonuniform electrostatic fields 46A previously described with the lower electrode means 22A but with the more intense portions 50A of the fields 46A being more intense than the intense portions 50 of the nonuniform fields 46 previously described because of the pointed arrangement 51, 52 of the projection means 38A. Thus, it is believed that a greater amount of dewatering will be created by the more intense portions 50A of the nonuniform fields 46A than by the intensive portions 50 of the nonuniform fields 46 previously described.

Therefore, since the operation of the method and apparatus 20A is substantially the same as the operation of the method and apparatus 20 previously described, a further description of the operation of the method and apparatus 20A is not necessary.

While the methods and apparatus 20 and 20A previously described each has the means 32 for creating a pressure differential across the lower electrode 22 or 22A, it is to be understood that a pressure differential could be created also across the upper electrode 21 or 21A together with or without the means 32 for creating a pressure differential across the lower electrode 22 or 22A.

For example, reference is now made to FIG. 5 wherein it can be seen that the projections 38A of the apparatus 20A have been moved upwardly so as to provide means for directing air or any desired fluid under pressure as indicated by the arrows 53, into the openings 41A in the upper electrode 21A so as to create a pressure differential across the upper electrode 21A and thereby act on the liquid bearing material 23A to tend to force liquid from the material 23A out through the lower electrode 22A as previously set forth, such upper electrode pressure differential creating means and lower electrode pressure differential creating means also being provided in the aforementioned Candor U.S. Pat. No. 3,931,682.

While the needle-like projections 38 and 38A have been illustrated and described as being, in effect, in electrical contact with their respective upper electrodes 21 and 21A whereby separate means for charging the projections 38 and 38A need not be provided because merely charging the electrode plates 21 and 21A will cause the projections 38 and 38A to be charged therefrom without requiring the extra charging means 43 previously described, it is to be understood that the needle-like projections of this invention can be insulated from the upper electrode that receives the same respectively through opening means of such upper electrode so that the projections can be charged with a different potential than the potential being imposed upon the electrode carrying such projections.

For example, reference is now made to FIGS. 6 and 7 wherein another apparatus and method of this invention is generally indicated by the reference numeral 20B and parts thereof similar to the parts of the method and apparatus 20 and 20A previously described are indicated by like reference numerals followed by the reference letter "B".

As illustrated in FIGS. 6 and 7, the apparatus and method 20B is substantially the same as the method and apparatus 20 previously described except that the upper electrode 21B carries electrically insulating means 54 that not only lines the opening means 41B thereof so as to prevent the projections 38B from making electrical contact with the upper electrode 21B, but also the insulating means 54 covers the upper surface 42B of the electrode 21B so that should the plate 40B for the needle-like projections 38B be charged with a charge different than the potential charge of the upper electrode 21B, a resulting field therebetween will be muted and thereby not adversely affect the operation of the apparatus 20B as hereinafter set forth.

The initial operation of the apparatus and method 20B of FIGS. 6 and 7 is substantially the same as the method and apparatus 20 of FIGS. 1 and 2 wherein the upper electrode 21B and plate 40B are charged with the same potential, such as positive, while the lower electrode 22B is charged with the opposite potential, such as negative, to create the uniform field 28B therebetween for acting on the material 23B disposed between the electrodes 21B and 22B.

Thereafter, the upper plate 40B is moved toward the upper electrode 21B so as to cause the projections 38B to now have the ends 45B thereof received within the material 23B and at a certain point in the depth of projection of the projections 38B into the material 23B, the potential to the upper electrode 21B can be changed to ground or to a negative potential that is opposite to the potential of the projections 38B such as by being charged with the same potential as the lower electrode 22B so that the projections 38B not only form the nonuniform fields 46B with the lower electrode 22B for the purpose previously described but also the projections 38B create upper nonuniform fields 55 with the upper electrode 21B to operate on the material 21B between the upper electrode 21B and the ends 45B of the projections 38B in such a manner that the more intense portions 56 of the upper nonuniform fields 55 tend to move the particles of the liquid bearing material 23B with a greater intensity toward the lower ends 45B of the projections 38B than if the fields had merely been uniform.

If desired, during the operation of the apparatus and method 20B, the charging of the upper electrode 21B can be changed from being charged with the same potential as the projections 38B back to being grounded or being charged with an opposite potential to the projections 38B and then again back to the same potential as the projections 38B during the time the projections 38B are being utilized intermediate the electrodes 21B and 22B to dewater the material 23B therebetween.

Other means of this invention for electrically insulating the projections from the electrode through which the projections are being moved is to insulate the projections themselves from the electrode receiving the same.

Figure 8:
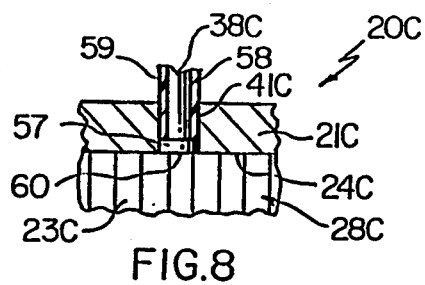
FIG. 8 is a fragmentary view similar to FIG. 1 and illustrates another apparatus and method of this invention.
Figure 9:
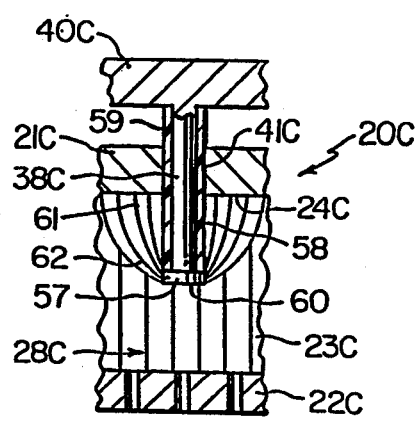
FIG. 9 is a view similar to FIG. 8 and illustrates the apparatus of FIG. 8 in another operating position thereof.

For example, reference is now being made to FIGS. 8 and 9 wherein another apparatus and method of this invention is generally indicated by the reference numeral 20C and parts thereof similar to the parts of the methods and apparatus 20-20B previously described are indicated by like reference numerals followed by the reference letter "C".

As illustrated in FIGS. 8 and 9, it can be seen that the projections 38C are each formed in a manner similar to a nail wherein the same has an enlarged disk-like head or end 57 and a substantially smaller diameter shaft-like portion or body 58 that is interconnected to the plate 40C, each head 57 having a diameter that is substantially the same as the diameter of its respective opening 41C that is formed through the upper electrode plate 21C as illustrated in FIG. 8. The shaft or body portion 38 of each projection 38C is covered with electrically insulating material 59 so that the projections 38C can readily move in their respective openings 41C from the position illustrated in FIG. 8 to the position illustrated in FIG. 9 while completely blocking any fluid flow through the openings 41C in the same manner as the projections 38 previously described.

In this manner, when the projections 38C are in the position illustrated in FIG. 8, it can be seen that the heads 57 of the projections 38C have their lower flat surfaces 60 disposed substantially flush with the lower flat surface 24A of the upper electrode 21C so that the upper electrode 21C can be charged with the same charge as the projections 38C to produce the uniform electrostatic field 28C previously described.

However, as the projections 38C are being moved into the material 23C in the manner illustrated in FIG. 9, by maintaining the charge on the projections 38C with the same potential as the electrode 21C, the projections 38C will form the nonuniform fields 46 with the lower electrode 22C as previously described.

However, by charging the projections 38C with the same potential as the lower electrode 22C and opposite to the upper electrode 21B, the enlarged heads 57 of the projections 38C will respectively form upper nonuniform fields 61 with the upper electrode 21C in such a manner that the more intense portions 62 of the nonuniform fields 61 will be adjacent the heads 57 of the projections 38C and tend to move the water toward the heads 57 with a greater intensity than the uniform field 28C as the projections 38C are completely insulated from the upper electrode 21C once the heads 57 have cleared the openings 41C in the electrode 21C.

Therefore, the charging of the projections 38C in the upper electrode 21C after the heads 57 of the projections 38C have been moved into the material 23C beyond the lower surface 24C of the upper electrode 21C permits any combination of charging between the projections 38C and the upper electrode 21C as desired.

While the various needle-like projections of this invention have been previously described as projecting through openings in the upper electrode of the various arrangements, it is to be understood that the projections of this invention can project through opening means in the lower electrode if desired.

For example, reference is now made to FIGS. 10 and 11 wherein another apparatus and method of this invention is generally indicated by the reference numeral 20D and parts thereof similar to the parts of the apparatus and methods 20-20C previously described are indicated by like reference numerals followed by the reference letter "D".

As illustrated in FIGS. 10 and 11, the lower electrode 22D is provided with a plurality of openings 41D in addition to the passages 26D thereof for having the projections 38D respectively received therein so that the projections 38D can be charged with the same charge as the lower electrode 22D to form the nonuniform fields 46D with the upper electrode 21D so that the more intense portion 50D of each nonuniform field 46D is adjacent the end 45D of the respective projection 38D.

In fact, it may be found that it is best to start with the projections 38D fully projected into the material 23D at the start of the dewatering operation and subsequently pull the projections 38D down to the final position illustrated in FIG. 11. But, of course, the projections 38D could start in the position of FIG. 11 if desired or in any other position as previously described.

While the projections that project through the openings in the lower electrode of the arrangement of this invention can be insulated from such lower electrode in the same manner as illustrated in FIGS. 6 and 7, the projections are illustrated in FIGS. 12 and 13 as being insulated from the lower electrode in the same manner as the upper projections in FIGS. 8 and 9.

In particular, another method and apparatus of this invention is generally indicated by the reference numeral 20E in FIGS. 12 and 13 and parts thereof similar to the parts of the apparatus and methods 20-20D of this invention are indicated by like reference numerals followed by the reference "E".

As illustrated in FIGS. 12 and 13, the projections 38E have the enlarged heads 57E and have the body portions 58E thereof covered with insulation 59E so as to permit the electrodes 38E to be charged with a charge different than the charge on the lower electrode 22E, if desired.

For example, it can be seen in FIG. 13 that when the projection 38E is charged with a charge different than the charge on the lower electrode 22E and the projection 38E has the head 57E disposed within the material 23E between the electrodes 21E and 22E, a lower nonuniform electrostatic field 63 is formed between the head 57E and the lower electrode 22E with the nonuniform field 63 having its more intense portion 64 being disposed adjacent the head 57E as previously described.

Therefore, it can be seen that when the head 57E of a projection 38E is closer to the upper electrode 21E as illustrated in FIG. 12, the projection 38E can be provided with a charge that is opposite to the charge of the upper electrode 21E to create the upper nonuniform field 46E in the same manner as the upper nonuniform field 46D previously described. However, as the projection 38E has its end 57E moved closer to the lower electrode 22E, the charge on the projection 38E can be changed to be opposite to the charge on the lower electrode 22E to form the lower nonuniform electrostatic field 63 as illustrated in FIG. 13.

While the various apparatus and methods of this invention previously described have the plurality of needle-like projection means either being disposed through the upper electrode or through the lower electrode, it is to be understood that the needle-like projections of this invention can have one set thereof projecting through the upper electrode and another set thereof projecting through the lower electrode, the two sets of needle-like projections either being in an aligned relation or being staggered relative to each other in any desired pattern.

For example, another apparatus and method of this invention is generally indicated by the reference numeral 20F in FIG. 14 and parts thereof similar to the parts of the apparatus and methods 20-20E previously described are indicated by like reference numerals followed by the reference letter "F".

As illustrated in FIG. 14, the apparatus and method 20F has a plurality of needle-like electrodes 38F previously described and extending through cooperating opening means 41F in the upper electrode 21F. Similarly, a plurality of electrode means 38F extend through opening means 41F in the lower electrode 22F with the lower projections 38F being formed in a manner similar to the upper projections 38F.

In addition, each projection 38F has insulating means 65 disposed on the outer end surface 60F of the enlarged head 57F thereof.

While the projection means 38F of the apparatus and method 20F of this invention have the upper set and the lower set thereof disposed in axially aligned relation, it is to be understood that the same could be staggered relative to each other so that the lower set of projections 38F could extend all the way from the bottom electrode 22F to the upper electrode 21F and the upper projections 38F could extend all the way from the upper electrode 21F to the bottom electrode 22F as desired.

However, in the embodiment illustrated in FIG. 14 wherein the upper and lower projections 38F are disposed in axially aligned relation, it can be seen that when the projections 38F are respectively disposed within the liquid bearing material 23F between the electrodes 21F and 22F, the upper projections 38F can be charged with a potential that is opposite to the potential on the lower projections 38F so as to form a nonuniform field 66 between the enlarged heads 57F of the axially aligned projections 38F as illustrated in FIG. 14 wherein it can be seen that each nonuniform field 66 has the opposed intense portions 67 thereof respectively disposed adjacent the peripheral edges 68 of the respective enlarged heads 57F that are not covered by insulation means, such nonuniform field 66 acting on the liquid bearing material 23F between the electrodes 21F and 22F to tend to cause the liquid to move from the upper projection 38F to the lower projection 38F and the particles in the liquid bearing material 23F to move from the lower projection 38F to the upper projection 38F.

In addition, the upper projection 38F can be charged with a potential different than the potential charge on the upper electrode 21F to form the upper nonuniform field 46F for the purpose previously described. Likewise, the lower projection 38F can be charged with a potential that is different than the potential on the lower electrode 22F to form the lower nonuniform field 63F. For example, the upper electrode 21F can have a positive charge thereon while the upper projection 38F has a negative charge thereon. The lower electrode 22F can have a negative charge thereon and the lower projection 38F can have a positive charge thereon.

It is to be understood that during the operation of the apparatus and method 20F the upper and lower projections 38F can have the ends 65 thereof disposed flush with the facing surfaces 24F and 25F of the electrodes 21F and 22F so that the substantially uniform electrostatic field is created between the electrodes 21F and 22F and thereafter the projections 38F can be moved inwardly to any desired degree into the material 23F as desired. For example, the two projections 38F illustrated can actually have the insulation means 65 thereof touching each other so that the projections 38F will move in unison with the intermediate electrostatic field 65 actually beginning just below the upper electrode 21F and then be caused to move downwardly to almost the bottom electrode 22F as desired. Also, it is to be understood that the spacing between the ends 65 of the projections 38F of the upper and lower projections 38F can be varied from a close spacing therebetween to a wide space therebetween so as to cause the various fields 46F, 66 and 63F to operate in any desired manner on the material 23F.

While the method and apparatus 20F previously described has a plurality of upper projections 38F and a plurality of lower projections 38F, it is to be understood that the method and apparatus of this invention can have projections that always extend between both the upper and lower electrodes of the apparatus, if desired.

For example, another apparatus and method of this invention is generally indicated by the reference numeral 20G in FIG. 15 and parts thereof similar to the parts of the apparatus and methods 20-20F previously described are indicated by like reference numerals followed by the reference letter "G".

As illustrated in FIG. 15, a plurality of projections 38G are provided (only one such projection 38G being illustrated in FIG. 15) that respectively pass through aligned openings 41G in the upper electrode 21G and lower electrode 22G, each projection 38G comprising a body portion 58G and an enlarged disk-like intermediate portion 57G that has only its outer peripheral edge 67G exposed as the remainder of the body portion 58G on opposite sides of the head 57G is covered by the insulating material 59G as previously described.

In this manner, each projection 38G can be provided with a charge that is opposite to the charge on the upper electrode 21G so as to form the upper nonuniform field 56G therewith with such nonuniform field 56G being caused to move from the upper electrode 21G down toward the bottom electrode 22G as the intermediate portion 57G of the projection 38G is moved downwardly. Of course, as the projection 38G is moved downwardly, the projection 38G can have the charge thereon changed so as to be opposite to the charge on the lower electrode 22G and thereby cause a field similar to the field 63 of FIG. 13 to now occur between the outer peripheral surface 68G of the enlarged head 57G and the lower electrode 22G as desired.

Therefore, it can be seen that in all of the various embodiments of the apparatus and method of this invention so far described, the projections are utilized to create nonuniform fields that will act on the liquid bearing material that is disposed between the normal or conventional electrodes so as to enhance the amount of dewatering and/or cake solidification as the case may be.

It is also to be understood that during the operation of the various apparatus and methods of this invention, the charging of the various electrodes and projections can be arranged so that the same will oscillate between the charging thereof so that the resulting electrostatic fields will oscillate and thereby cause a dielectric heating of the liquid bearing material to a certain degree and then the oscillation of the fields can be terminated and the fields then being used to perform their dewatering function in the manner previously described, the heating of the liquid bearing material facilitating the dewatering thereof because of the lowering of the viscosity of the liquid through the heating thereof.

In fact, it may be found that the sonic or ultrasonic vibrating of the liquid bearing material through the nonuniform fields created by the projections of this invention will result in a dielectric heating of the liquid bearing material through just the action of the particles and liquid moving across the angled field lines created by the projections in much the same manner as fully set forth in the Candor U.S. Pat. No. 4,404,765, whereby this patent is also being incorporated into this disclosure by this reference thereto.

It is to be understood that the projections of this invention can be uniformly arranged on their respective carrying plate or could be arranged in any desired pattern thereon. Also, the projections could have any desired lengths and diameters relative to each other or could be uniform relative to each other as desired.

In fact, while the projections of this invention have been described as "needle-like", it is to be understood that such term could apply to projections that are similar in size and shape to sewing needles or smaller or could apply to large knitting needles or larger as desired.

Also, it may be found that the vibration of the projections of this invention and/or the vibration of the liquid bearing material relative to the projections will not only enhance the dewatering operation as previously described, but also such vibration action may prevent the particles of the liquid bearing material from adhering to the projections and/or electrodes so as to enhance subsequent removal of the dewatered material from the apparatus of this invention.

For example, see FIG. 2A wherein it is believed that the vibration of the material 23 and/or projections 38 actually causes the cake material 23 to form in a spaced relation as indicated by the material free area 23' around the sides and ends 45 of the projections 38.

Also, while the projections of this invention have been illustrated and described as having a substantially circular transverse cross-sectional configuration, it is to be understood that the projections of this invention can have any desired transverse cross-sectional configuration and, in fact, can have a serrated, knife-like or rectangular configuration with the longitudinal axis of the projection extending parallel to the electrode carrying the same rather than transverse thereto as previously described. For example, see FIGS. 16-18 of the Candor U.S. Pat. No. 3,633,282, whereby this patent is being incorporated into this disclosure by this reference thereto.

In all of the arrangements of this invention previously described and hereinafter described, it is to be understood that the voltage between the upper and lower electrodes can be maintained substantially uniform throughout the entire dewatering operation or may vary throughout the entire dewatering operation, as well as be unidirectional pulsed or oscillated. For example, the voltage between the two main electrodes can initially be any amount, such as 50 volts, and then as more and more liquid is removed, the voltage can be increased so that by the time the dewatering operation is ended, the voltage between the two main electrodes can be several thousand volts or more as desired. This is because the current flow, if any, between the main electrodes decreases as the liquid is being removed. Likewise, such uniform or varying voltage can be provided between the projections of this invention and their cooperating main electrode or electrodes.

It may be found that when dewatering with the main pair of electrodes, the removal of the liquid of the liquid bearing material by the uniform electrostatic field eventually produces a cake therefrom that prevents further dewatering thereof because the liquid remaining in the cake no longer is in electrical contact with at least one of the main electrodes. However, it is believed that by inserting the projections of this invention into such cake, further dewatering thereof will take place not only through the previously described nonuniform field action created thereby, but also by the fact that such charged electrodes will now be placed into electrical contact with the remaining liquid in the cake to provide an electrical current path therethrough which will occur between such projections and at least one of the electrodes that provide a potential differential therebetween as it may be found that it is best to always have some electrical current flow through the liquid bearing material to produce a liquid removing action therefrom.

In contrast, it may be found that it is desirable to completely electrically insulate the projections of this invention from the liquid bearing material as well as to electrically insulate the main electrodes therefrom either by having the contacting surfaces of the main electrodes covered with electrically insulating material or having the same spaced from the liquid bearing material as fully illustrated and described in the aforementioned Candor U.S. Pat. No. 4,236,317.

Therefore, it can be seen that the terms "electrostatic field" and "electric field" as used in this application are synonomous and are intended to describe a uniform or nonuniform field that is steady, varying, unidirectional pulsed or oscillated and that is created through the liquid bearing material disposed between two members that have a potential differential imposed thereon in a manner to be a steady voltage, a varying voltage, a unidirection pulsed voltage or an oscillating voltage whether those members are in electrical contact with the liquid bearing material or electrically insulated therefrom. Thus, it is believed that a higher voltage between such members must be utilized to remove liquid from the liquid bearing material when no electrical current is flowing between such members and through the liquid bearing material. However, it is realized that different liquid bearing materials have different conductivities and that some liquid bearing materials have substantially no conductivity whereby the voltage utilized for dewatering a particular liquid bearing material will be different than the voltage utilized for dewatering another type of liquid bearing material and that the voltage utilized will be different if the members are electrically insulated from a particular liquid bearing material than the voltage utilized if the members are in electrical contact with that particular liquid bearing material.

While it has been previously theorized that the various nonuniform fields of this invention tend to more solidly move the particles of the liquid bearing material closer together to enhance the dewatering operation, it may be found that, in lieu thereof or in addition thereto, a more beneficial effect of the nonuniform fields of this invention is to actually cause a migration of the liquid in the resulting cake toward the projection means of this invention as it is believed that liquid in capillaries or porous material tends to physically move in the direction of increasing field inhomogeneity to the capillary or pore mouth when an inhomogeneous electrostatic or electric field or nonuniform electrostatic or electric field is directed across that capillary or porous body. For example, see the article "Effect of a Corona Discharge Field On Evaporation of Liquid From Capillaries" by Karpovich et al, J. Eng. Phys., 1981, 41, 1333. In addition, see the article "Study of Electric Field-Induced Effects On Water Vapor Adsorption in Porous Adsorbents" by Someshwar et al, Ind. Eng. Chem. Fundam., 1985, 24, 215–220; the article "Effect Of An Electric Field On The Kinetics of Water Sorption By A Capillary-Porous Material" by Panchenko et al, J. Eng. Phys., 1972, 22, 554, and the article "Influence of Inhomogeneous Electric and Magnetic Fields on Internal Mass Transfer In Capillary-Porous Bodies" by Panasyuk et al, J. Eng. Phys., 1978, 35, 827, whereby these four articles are being incorporated into this disclosure by this reference thereto.

Therefore, it may be found that when utilizing the basic upper and lower electrodes 21 and 22 to provide a uniform field therebetween for initially dewatering the slurry 23 disposed therebetween by the aforementioned electro-phoretic and electro-osmotic operation, the resulting cake that forms against the underside 24 of the upper electrode 21 may be so dewatered that the upper electrode 21 no longer makes electrical contact with the remaining liquid in the material 23 disposed between the electrodes 21 and 22 even after the remaining material has been vibrated in the manner previously described.

It is believed that by moving the projections 38, FIGS. 1 and 2, of this invention into the cake 23 below the surface 24 of the upper electrode 21, not only will the projections 38 be moved through the dewatered part of the cake adjacent the surface 24 of the upper electrode 21 so as to be placed into electrical contact with the liquid in the material 21 as previously set forth, but also it may be found that the nonuniform fields being created by the projections 38 with the lower electrode 22, as represented by the reference numeral 46 in FIG. 2, each has the field lines 50 thereof radiating toward the respective projection 38 so that such radiating lines 50 actually cause a migration of the liquid in the pores of the material 23 toward the projections 38 for the reasons set forth in the previously mentioned four articles so that when the migrating liquid reaches the projections 38 then the same provides electrical continuity between the projections 38 and the lower electrode 22 to further the dewatering operation by the aforementioned electro-osmotic operation previously set forth. In order to enhance the migration of the liquid by the nonuniform fields 46 converging toward the projections 38, the vibration of the material 23 in any of the manners previously set forth may reduce the surface tension in the capillaries or pores of the material 23 so as to further enhance the movement of the liquid in the pores or capillaries toward the projections 38 for the dewatering function of this invention as well as may form cracks or fissures in the cake material 23 to enhance the migration toward the projections 38.

Therefore, the operation of the method and apparatus of this invention illustrated in FIGS. 1 and 2 may occur as follows.

After the electrodes 21 and 22 have been utilized to form the uniform field therebetween to initially dewater the material 23 as previously set forth, in combination with or without the vibratory action, and the cake forming against the under surface 24 of the electrode 21 has now been dewatered so sufficiently that electrical continuity is no longer provided by the liquid in the material 23 between the upper and lower electrodes 21 and 22, the projections 38 are initially moved downwardly so as to have the ends 45 thereof project below the surface 24 of the upper electrode 21 whereby it is believed that the same will now be placed in electrical contact with the liquid in the material 23 that is still below the electrode 21 so as to further dewater the material 23 between those projections 38 and the lower electrode 22. However, even at this point of the initial insertion of the projections 38, eventually the liquid adjacent the projections 38 will have been dewatered away from the same so that it is desired to have the water flow to the projections 38. This may be accomplished by the aforementioned nonuniform fields 46 acting on the cake material around the projections 38 to tend to cause migration of the liquid in the pores or capillaries of the cake toward the projections 38, and through the vibration of the cake material 23, the movement of the liquid will be enhanced toward the projections 38. However, it may be found that it is necessary to increase the voltage between the projections 38 and the lower electrode 22 at this time in order to assure the migration of the liquid by the nonuniform fields 46 toward the projections 38 as it is believed that the greater the voltage across the electrode 22 to the projections 38, the greater the strength or intensity of the nonuniform fields 46 in dewatering the material 23. Once the liquid reaches the projections 38 so as to provide electrical continuity between the projections 38 and the lower electrode 22 for the aforementioned electro-osmotic operation, then the voltage between the projections 38 and the lower electrode 22 may be decreased until it is desired to again try to migrate liquid toward the projections 38 either in the last inserted position thereof or after the same have been further progressively moved into the cake material 23 between the electrodes 21 and 22. Obviously, if vibration action is taking place when the projections 38 are being moved into the cake material 23, the vibrating action will reduce the force necessary to push the projections 38 into the cake 23.

Thus, it can be seen that the projections 38 may not only cause the particles of the cake material 23 to become more closely packed by the nonuniform fields 46 as previously described, but also the nonuniform fields 46 may then cause the liquid within the pores and capillaries of the dewatered cake to migrate toward the projections 38 through the converging field lines 50 thereof as previously set forth.

This nonuniform field effect for moving the liquid that remains in the dewatered cake toward the projections of this invention is highlighted by the arrangement illustrated in FIGS. 6 and 7 of applicant's drawings wherein the upper nonuniform fields 55 being created between the upper electrode 21B and the projections 38B by having the upper electrode 21B charged oppositely to the projections 38B obviously have the field lines 56 thereof converging toward the projections 38B to provide nonuniform fields converging toward the projections 38B throughout the entire length thereof below the lower surface of the upper electrode 21B so that when the liquid reaches the projections 38B by the nonuniform field effect, the liquid will flow to the ends 45B of the projections 38B to be directed toward the lower electrode 21B by the lower fields 46B creating the electro-osmotic effect therebetween as previously set forth. And it can be seen that during the entire time the projections 38B are being moved downwardly into the material 23B, the upper nonuniform fields 55 are trying to direct liquid to the entire length of the respective projections 38B.

It is believed that if the material 23B and/or projections 38B are being vibrated during such time that the projections 38B are projecting into the material 38B, the liquid being drawn to the projections 38B by the respective nonuniform fields 55 will be received in the spaces created by the vibrating projections 38B and the cake of material 23B adjacent thereto, such as the space 23' of FIG. 2A previously described, and thereby flow to the ends of the projections 38B by gravity, etc., so as to provide an electrical path from the ends of the projections 38B through the liquid in the material 23B between the ends of the projections 38B and the lower electrode 22B. In fact, it might be found that the vibrating movement of the projections 38B and/or material 23B causes the projections 38B to, in effect, respectively and rapidly move back and forth in the spaces between the cake of material 23B and actually pump the liquid drawn into such spaces toward the ends of the projections 38B.

Therefore, it can be seen in all of the embodiments of this invention that because the nonuniform fields have the more intense portions thereof converge toward the projections that cooperate in forming those nonuniform fields, such nonuniform fields can be utilized for the purpose of causing the liquid remaining in the pores and capillaries of the material being dewatered by the apparatus and method of this invention to migrate toward those projections by the nonuniform field effect being enhanced by the vibration of the material which reduces the surface tension or capillary holding effect of the capillaries on that liquid so that the liquid is more readily drawn toward the projections by the nonuniform field effect previously set forth.

In fact, it may be found that it is desired to enhance the nonuniform field effect acting across the partially dewatered cake to cause the remaining moisture therein to migrate toward the projections of this invention.

One apparatus and method of this invention for further enhancing the nonuniform field effect is generally indicated by the reference numeral 20H in FIGS. 16–18 and parts of the method and apparatus 20H of this invention that are similar to the parts of the methods and apparatus previously set forth are indicated by like reference numerals followed by the reference letter "H".

As indicated in FIG. 16, the method and apparatus 20H of this invention includes the upper electrode means 21H and lower electrode means 22H with the material 23H being disposed therebetween in the manner previously set forth to be dewatered by the electrodes 21H and 22H being oppositely charged by any suitable means, such as by the electrode 21H having a positive charge imposed thereon and the lower electrode 22H having a negative charged imposed thereon.

The method and apparatus 20H of this invention includes a plurality of conductive cylindrical projections 38H being carried in spaced apart relation by a plate means 40H that is formed of electrically insulating material so that the projections 38H are completely electrically separated from each other by the plate means 40H but are electrically interconnected together by a lead means 70 to a charging means 71 which is adapted to charge the projections 38H with any desired potential, such as the positive potential illustrated.

In addition, the upper plate 40H carries a plurality of flat conductive projections or plates 72 which have opposed flat sides 73 respectively facing the projections 38H in the pattern illustrated in FIG. 18 so that it can be seen that each projection 38H has four sides 73 of four plates 72 facing the same, the upper electrode 21H having the opening means 41H formed therethrough in the same pattern and in the same configuration as the projections 38H and plates 72 so that the plates 72 and projections 38H can be moved through the openings 41H in unison by the plate 40H. The openings 41H and the upper surface 42H of the upper electrode 21H are lined with suitable electrically insulating means 54H in the same manner as the electrode 21B previously described.

The plates 72 are carried by the upper insulating plate 40H in such a manner that the same are adapted to be all electrically interconnected to a lead means 74 that is adapted to be charged by a suitable charging means 75 with any suitable charge, such as the negative charge as illustrated in FIG. 16.

While the plates 72 and projections 38H are so arranged on the insulating plate 40H so that the lower ends or surfaces 45H of the projections 38H are at the same level as the lower ends 76 of the plates 72, it is to be understood that the ends 45H of the projections 38H could be above or below the surfaces 76 of the plates 72, if desired.

In addition, it can be seen that the ends 76 of the plates 72 carry electrically insulating extensions 77 thereon so that the extensions 77 are adapted to abut against the upper surface 25H of the lower electrode 22H should the plate 40H be moved downwardly relative to the lower electrode 22H to a position wherein the extensions 77 abut the surface 25H so that it can be seen that the projections 38H in such a situation will still have the lower surfaces 45H thereof spaced above the surface 25H of the lower electrode 22H so as to prevent direct shorting therebetween. In addition, the extensions 77 could be of a length that spaces the bottoms 76 of the plates 72 from the surface 25H of the electrode 22H when the extensions 77 are against the surface 25H a distance that is greater than the distance that the sides 73 of the plates 72 are spaced from their cooperating projections 38H for a purpose hereinafter set forth.

While the method and apparatus 20H illustrated in FIG. 16 is not shown to have the evacuating means 32 previously described, it is to be understood that the same can have such evacuation means 32 as illustrated in FIG. 1 utilized therewith and that the plates 40H, 21H and 22H can be vibrated by the respective means 49H, 47H and 48H as prevously described, if desired.

The operation of the method and apparatus 20H of this invention will now be described.

When the material 23H is initially introduced between the upper and lower electrodes 21H and 22H, the plate 40H can be in a raised condition so that the ends 45H of the projections 38H are substantially flush with the lower surface 24H of the upper electrode 21H so that only a uniform field will be created between the electrodes 21H and 22H during the initial dewatering operation on the material 23H as previously set forth.

However, after the formation of a cake against the surface 24H so that the retained liquid in such cake is no longer in electrical contact with the electrode 21H or even if the same is in electrical contact but the dewatering operation is slowed down, the plate 40H is moved downwardly so that the projections 38H and plates 72 are moved into the material 23H to a desired degree. At this time, the plates 72 and projections 38H are oppositely charged with the projections 38H having an opposite charge to the lower electrode 22H. Since the plates 72 are oppositely charged relative to the projections 38H, nonuniform fields 80 are created with the projections 38H as illustrated in FIG. 18 with each field 80 having its more intense portion 81 of its field lines 82 converging toward the projections 38H and away from the facing sides 73 of the plates 72.

In this manner, it is believed that relatively strong nonuniform electrostatic or electric fields can be created between the plates 72 and projections 38H by creating a relatively large voltage between the plates 72 and the projections 38H while a normal low voltage is maintained between the projections 38H and the lower electrodes 22H so that the liquid remaining in the cake material 23H between the projections 38H and the plates 72 will be caused to migrate toward the projections 38H and run down the projections 38H or be moved toward the ends 45H thereof and be directed toward the lower electrode 22H by the aforementioned electro-osmotic action. Of course, if a vibratory action is also being imposed at this time, the migration of the liquid toward the projections 38H as well as the dewatering operation between the projections 38H and the bottom electrode plate 22H will be enhanced as previously set forth.

Thus, as the projections 38H and plates 72 are projected further downwardly into the material 23H, a greater surface area of the plates 72 and projections 38H have the nonuniform fields acting therebetween for dewatering purposes and, or course, the vibration of the material 23H will enhance the migration of that retained liquid toward the projections 38H for the reasons previously set forth. Accordingly, it can be seen that the cake material 23H adjacent the upper electrode 21H continuously has the nonuniform fields 80 acting thereon the entire time the projections 38H and 72 are being moved toward the lower electrode 22H so that it is believed that the drier part of the cake material 23H will be subjected to the nonuniform field effect for a longer period of time than the more wet portions thereof.

Eventually, the plates 72 can have the insulating extensions 77 thereof abut against the surface 25H of the lower electrode 22H so as to prevent further insertion of the projections 38H into the material 23H. Since the length of the extensions 77 can be longer than the distance of a side 73 of a plate 72 relative to its associated projection 38H, no field effect will be created between the plates 72 and the bottom electrode 22H. However, by using a different length for the extensions 77, this could be different.

Therefore, it can be seen that the voltage between the side 73 of each plate 72 and its associated projection means 38H can be several thousand volts whereas the voltage between that projection 38H and the lower electrode 22H could be only 50 volts, if desired. Of course, it is to be understood that the voltage between the plates 72 and the projections 38H and between the projections 38H and the electrode 22H can be any desired voltage or any desired changing or pulsing voltage as desired.

While the plates 72 have been illustrated as having flat sides 73, it is to be understood that the plates 72 can have the sides 73 thereof of any desired configuration.

For example, reference is now made to FIG. 19 wherein it can be seen that the plates 72J have the sides 73J thereof defined on arcs that would describe a complete circle 83 about a particular projection 38J as illustrated.

Therefore, this invention is not to be limited to any shape of the plates 72 that cooperate with the projections 38H in forming the nonuniform fields 80 for the reasons previously set forth.

In regard to the lower nonuniform fields 46H being formed between the projections 38H and the lower electrode 22H, it can be seen from FIG. 17 that the field lines 84 radiate through the material 23H toward the particular projection 38H to also tend to move the retained liquid in the material 23H toward that projection 38H while the field lines that are between the end 45H of that projection 38H and the upper surface 25H of the lower electrode 22H are merely substantially vertical and, therefore, uniform between the ends 45H and a like circle area on the surface 25H of the lower electrode 22H for the electro-osmotic function previously set forth.

Therefore, it can be seen that while the various projections of this invention take up a relatively small area or volume of the total area or volume between the upper and lower electrodes, the projections reach out through the nonuniform field effect thereof so as to tend to pull from a large area or volume of the retained liquid in the liquid bearing material toward those projections when those projections are being utilized to form nonuniform fields in the various manners previously set forth.

Of course, after a dewatering operation with the apparatus and method 20H of FIG. 16, the plate 40H is moved upwardly so as to remove the projections 38H and plates 72 from between the electrodes 21H and 22H with the electrode 21H stripping any material sticking to the projections 38H and plates 72 as the projections 38H and plates 72 move up through their cooperating openings 41H of the electrode 21H as previously set forth.

It is also to be understood that the operation of the method and apparatus 20H of FIG. 16 can have the projections 38H and plates 72 start in their completely down position or in any other degree of projection into the material 23H rather than wait until after a dewatering operation by the electrodes 21H and 22H. Also, the plates 72 and projections 38H could be extended up through the bottom electrode 22H rather than through the upper electrode 21H or could project separately from opposite electrodes and directions as desired.

Also, it is to be understood that the plates 72 of this invention as previously described could be complete cylinders of electrically conductive material that completely surrounds a projection 38H in a concentric manner therewith, if desired.

Of course, it is to be understood that all of the projections 38H and 72 can be of the same size and shape so as to merely create electrostatic fields therebetween whether such fields are uniform or nonuniform as desired as an important feature of this invention is to create a field between projections that enhances the dewatering effect of at least one of those projections with the regular electrodes of the dewatering apparatus and method.

In addition, it might be found that it is best to start the dewatering operation of the method and apparatus 30H with the projections 38H and plates 72 in their completely down position relative to the lower electrode 22H so that the nonuniform fields 80 between the plates 72 and projections 38H will cause a migration of the particles of the material 23H toward the projections 38H by electrophoresis, as well as by dielectrophoresis, and liquid toward the plates 72 by electro-osmosis. The particles when reaching the projections 38H may then be drawn upwardly toward the upper electrode 21H by the normal electrophoretic action caused by the electrodes 21H and 22H and the liquid when reaching the plates 72 may then be drawn downwardly toward the lower electrode 22H by the normal electro-osmotic action caused by the electrodes 21H and 22H. Thus, after a sufficient cake of the particles of the liquid bearing material 23H has formed against the upper electrode 21H, or before, the projections 38H and plates 72 can be moved upwardly to a desired up position thereof and then be progressively moved downwardly as previously set forth to dewater the cake between the plates 72 and projections 38H in the manner previously described wherein the nonuniform fields 80 cause the remaining liquid in the cake to now move toward the projections 38H as capillaries or pores have now been formed by the particles forming the cake therebetween.

In the operation of the method and apparatus 20H previously described, it may be found that when it is desired to dewater the cake that has formed between the projections 72 and 38H after each movement of the projections 72 and 38H toward the lower electrode 22H takes place, the plates 72 should be first charged with a potential that is the same potential to which the upper electrode 21H had been charged while charging the projections 38H to the same potential to which the lower electrode 22H had been charged to tend to cause the particles of the cake 23H to move toward the plates 72 by electrophoresis for the same reasons that the particles initially tended to move toward the upper electrode 21H and to tend to cause the liquid of the cake 23H between the plates 72 and projections 38H to move toward the projections 38H not only for the same reason that the liquid initially tended to move by electro-osmosis toward the lower electrode 22H, but also because of the aforementioned nonuniform field pulling or pushing effect of the fields 80. Thereafter, the potential on the projections 38H and plates 72 can be reversed so that plates 72 have the same potential as the lower electrode 22H and the projections 38H have the same potential as the upper electrode 21H not only to tend to cause the liquid that had been drawn toward the projections 38H to now migrate toward the lower electrode 22H by electro-osmosis, but also to tend to further dewater the cake 23H between the plates 72 and projections 38H by the nonuniform field effect thereon for the reasons previously set forth. Of course, the vibratory action can be imposed during the entire time or any desired part or parts of the time that the projections 38H and 72 are being used. Also, the electrodes 21H and 22H can be charged during all, some or none of the time that the projections 72 and 38H are being used, as desired.

Referring now to FIGS. 18 and 19, it can be seen that the closer the plates 72 or 72J come to completing a square, the greater the amount of area of the nonuniform fields 80 will cover between such plates 72 and 72J and their respective projections 38H and 38J. Also, it is to be understood that additional projections 38H and 38J could be disposed between the adjacent four corners defined by the plates 72 and 72J to form nonuniform fields therewith (such as disposing a projection 38J where the reference numer 83 is located in FIG. 19 or where the lower left reference numer 80 is located in FIG. 18).

In this manner, substantially the entire area between the plates and projections will have a nonuniform field acting therethrough with the closeness of the plates and projections being governed by the strength of the electrode 21H in having the cooperating openings 41H being relatively close to each other.

Thus, it is believed that the projections 38H will act as a pump means to pump the liquid away from the ends or mouths of the capillaries or pores in the cake material 23H that are adjacent the projections 38H and direct the thus removed liquid toward the lower electrode 22H by electro-osmosis whereby the liquid in the capillaries or pores will continue to be moved toward the projections 38H by the nonuniform fields 80 as previously set forth to be subsequently pumped away therefrom as previously set forth.

Accordingly, it can be seen that it is believed that this invention of FIGS. 16–19 will use two field effects to enhance the dewatering operation of the upper and lower electrodes 21H and 22H, one field effect being between adjacent projections 38H and 72 and the other field effect being between the projections 38H and the lower electrode 22H. Such two field effects can take effect in unison or in series, be continuous or intermittent, etc., as desired. Also, the voltage for creating the two field effects can be the same or different as previously set forth as well as be varied, pulsed or oscillated as previously set forth.

While the nonuniformity of the fields 80 of FIGS. 16, 18 and 19 is in a radial direction relative to the projections 38H and 38J, it is to be understood that a nonuniformity of the fields 80 could also be in a vertical direction in FIG. 16 if the projections 38H are each provided with spaced annular bands or spaced circles of points that project outwardly therefrom in a radial direction, such as illustrated in FIGS. 10 and 11 of the aforementioned King U.S. Pat. No. 4,341,617.

Such an arrangement of this invention is illustrated in FIG. 20 wherein another method and apparatus of this invention is generally indicated by the reference numeral 20K and parts thereof that are similar to parts of the method and apparatus 20–20J previously described are indicated by like reference numerals followed by the reference letter "K".

As illustrated in FIG. 20 the method and apparatus 20K is substantially identical to the method and apparatus 20H of FIGS. 16 and 18 except that each projection 38K has a plurality of radially outwardly extending annular conductive bands 57K separated from each other by annular rings of insulating material 59K as in FIG. 15 so that the resulting electrostatic fields 80K created between each projection 38K and its cooperating plates 72K are in the nonuniform verticle arrangement illustrated in FIG. 20 as well as in the nonuniform horizontal arrangement as illustrated in FIG. 18.

While the various embodiments of this invention as previously set forth each has the projections of this invention being adapted to respectively project through cooperating opening means in one of the electrodes so that those projections will extend from one side thereof into the liquid bearing material to have the liquid thereof acted upon thereby, it is to be understood that each of the projections of this invention could actually be carried by its respective electrode in a manner to project from one side thereof to different positions relative to the material between the electrodes and relative to that one electrode without passing through opening means of that one electrode. For example, each projection could be hinged to that one side of that one electrode and have suitable actuator means to cause that projection to project to different positions thereof relative to the material between the electrodes and relative to that one electrode. Alternately, each electrode could be arranged to be expandable from that one side of that one electrode so as to project to different positions thereof relative to the material between the electrodes and relative to that one electrode.

Figures 21, 22:
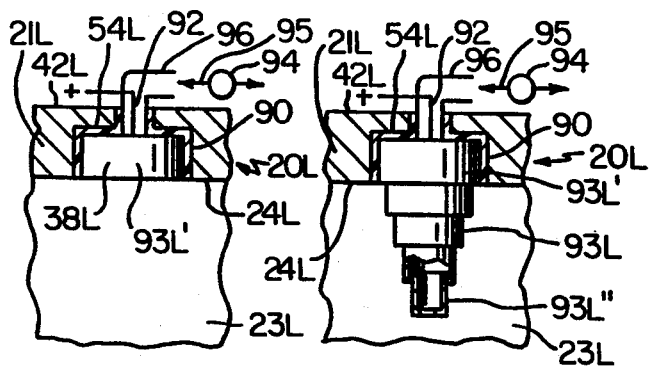
FIG. 21 is a view similar to FIG. 1 and illustrates another method and apparatus of this invention.
FIG. 22 is a view similar to FIG. 21 and illustrates the projection of one of the electrodes in an extended position thereof.

In particular, reference is now made to FIGS. 21 and 22 wherein another method and apparatus of this invention is generally indicated by the reference numeral 20L and parts thereof that are similar to the other methods and apparatus 20A–20K of this invention are indicated by like reference numerals followed by the reference letter "L".

As illustrated in FIGS. 21 and 22, the method and apparatus 20L of this invention includes the upper electrode plate 21L having the side 24L thereof disposed against the liquid bearing material 23L disposed between that upper electrode 21L and the lower electrode (not shown), such as the lower electrode 22 of FIG. 1.

The upper electrode 21L has a stepped opening 90 passing through the upper surface 42L thereof and the lower surface 24L thereof in such a manner to define an annular shoulder 91 intermediate the upper surface 42L and the lower surface 24L as illustrated. The stepped opening 91 is lined with a suitable electrically insulating material, such as the material 54L as illustrated, so as to electrically insulate a conductive projection 38L from the electrode plate 21L, the projection 38L being adapted to be interconnected to a suitable electrical power source to have a charge imposed thereon by a lead means 92 in the manner previously described whereby the projection 38L is adapted to be charged with the same charge, a different charge, etc., than the electrode plate 21L for the reasons previously set forth.

The projections 38L comprise a plurality of tubular sections 93L arranged to telescope together in a manner so as to be all disposed within the larger tubular section 93L' as illustrated in FIG. 21 and thereby be disposed substantially flush with the lower surface 24L of the electrode plate 21L. However, the tubular sections 93L are adapted to be untelescoped from each other so that the smallest tubular section 93L" is adapted to project into the material 23L various distances from the surface 24L of the electrode 21L depending upon the degree of untelescoping of the sections 93L.

For example, the sections 93L are adapted to be untelescoped from each other by having a fluid pressure directed to the interior of the telescoping sections 93L by a suitable pump means 94 having an outlet 95 thereof interconnected to a conduit means 96 that leads to the interior of the sections 93L. When it is desired to untelescope the sections 93L so as to completely collapse the projections 38L into the larger section 93L' thereof as illustrated in FIG. 21, the pump 94 can be reversed so that the same creates a vacuum in the conduit 96 to thereby cause the sections 93L to retract under the oppositely directed pressure differential being created across the same. Alternately, the smallest tubular section 93L" of the projection 38L could be interconnected to the larger section 93L' by a tension spring (not shown) which would retract the tubular sections 93L within the larger section 93L' when the air pressure being directed to the interior of the stack 93L was terminated and vented by the pump 94.

In any event, it can be seen that the method and apparatus 20L of FIGS. 21 and 22 permit the projection 38L to be moved from various positions thereof so as to project beyond the surface 24L of the electrode 21L into the material 23L to different positions relative to that material between the electrodes and relative to that one electrode 21L without first passing through an opening means of that electrode 21L as in the other embodiments of this invention, the projection 38L being used in the manner previously set forth to assist in the liquid removing operation of the apparatus 20L.

Therefore, it is to be understood that one or more of the projections in each of the embodiments of this invention previously set forth could be of the type illustrated in FIGS. 21 and 22 to function in the manner previously set forth.

For example, when viewing the embodiment 20H illustrated in FIG. 16, both projections 38H and 72 thereof could be of the telescoping type 38L so as to be carried by the upper electrode 21H and not project through respective opening means thereof but merely being contained within the electrode 21H itself to be expanded from the side 24H thereof in an untelescoping manner and creating not only the electric field with the electrodes 21H and 22, but also creating the electric field 80 therebetween.

It is to be understood that the projections 38L has cooperating inwardly and outwardly directed annular flanges on adjacent ends of the sections 93L thereof to permit the telescoping relation thereof and to prevent the sections 93L from coming apart when the projection 38L is fully extended, such flange structure being fully illustrated in FIG. 22 and being well known in the telescoping art.

As previously stated, any of the previously described embodiments of the apparatus and method of this invention can comprise a continuous dewatering arrangement wherein the electrodes can comprise movable members having portions thereof disposed adjacent each other so as to receive the liquid bearing material therebetween, such as movable endless belt means for continuously dewatering the liquid bearing material disposed therebetween and wherein either the upper belt means and/or the lower belt means can be provided with projections that would extend therefrom into the material being disposed therebetween to enhance the dewatering thereof in any of the manners previously set forth.

For example, one such apparatus and method of this invention is generally indicated by the reference numeral 20M in FIGS. 23-26 and parts thereof similar to the apparatus and methods 20-20L previously described will be indicated by like reference numerals followed by the reference letter "M".

Referring now to FIGS. 23-26, the apparatus and method 20M of this invention has the metallic electrode 21M formed into a continuous or endless belt means that is adapted to be driven by suitable drive roller means 100 located at the opposed side edges of the belt means 21M and driving the same in its continuous looped path by any suitable interconnecting driving arrangement, such as by having the rollers 100 provided with pinion gears on the outer periphery thereof and meshing with suitable rack-like openings on the respective side edges of the belt means 21M to positively drive the belt means 21M in a continuous manner so that a lower run or portion 101 of the belt means 21M will continuously move from left to right in FIG. 23.

Similarly, the lower metallic electrode 22M is formed as a continuous or endless belt means that is trained around suitable drive roller means 102 located at the opposed side edges thereof and being disposed in driving relation with the belt means 22M so as to continuously move an upper run or portion 103 thereof in substantially a horizontal manner from left to right in FIG. 23 so as to cooperate with the lower run 101 of the upper electrode means 21M to define a chamber 104 therebetween that is adapted to receive the liquid bearing material 23M therein, the material 23M being adapted to flow between the belt runs 101 and 103 at an entrance or inlet end 105 of the apparatus 20M and be discharged at an exit or outlet end 106 of the apparatus 20M as illustrated in FIG. 23.

The apparatus 20M will perform an electrodewatering operation on the material 23M as the same passes from left to right through the apparatus 20M so that the material 20M exiting from the outlet end 106 of the apparatus 20M is in a drier condition than the material 23M that enters the inlet end 105 thereof as will be apparent hereinafter.

Another metallic belt means 107 is provided for the apparatus 20M and the same is disposed in an endless or looped manner inside the looped belt means 21M about drive rollers 108 which are located at the opposed side edges of the belt 107 and are disposed in driving relation therewith so as to drive the belt means 107 in such a manner that the lower run 109 thereof moves in spaced relation to the run 101 of the belt means 21M and from left to right in FIG. 23 as will be apparent hereinafter.

While the drive rollers 100, 102 and 108 are illustrated in FIG. 23 as being only at one side edge of the belts 21M, 22M and 107, it is to be understood that there will be a like set of rollers 100, 102 and 108 at the other side edge thereof.

The apparatus 20M has a plurality of transversely disposed support rollers 110 arranged in the pattern illustrated in FIG. 23 to support the lower belt means 22M in its looped travel as well as to permit the material 23M to be compressed between the runs 101 and 103 of the belts 21M and 22M in a manner well known in the art. Similarly, a plurality of transversely disposed support rollers 111 are provided for the apparatus 20M to support the looped travel of the inner belt means 107 (as well as the outer belt means 21M as will be apparent hereinafter) with the lower support rollers 111 being particularly adapted to accomplish the compressing action on the material 23M between the runs 101 and 103 of the belts 20M and 22M in a manner well known in the art as the drive rollers 100 and 108 as well as the support rollers 111 can be caused to move toward the lower belt means 22M to compensate for the liquid being removed from the material 23M as the material 23M moves from left to right through the apparatus 23 all in a manner well known in the art.

For example, such means is fully set forth in the aforementioned Candor U.S. Pat. No. 4,236,317 and the aforementioned Moeglich U.S. Pat. No. 4,244,804, as well as in the Pepping U.S. Pat. No. 4,101,400, the Fremont et al U.S. Pat. No. 4,671,874 and the Kunkle et al U.S. Pat. No. 4,680,104 whereby these last three U.S. patents are also being incorporated into this disclosure by this reference thereto.

The outer electrode belt means 21M carries a plurality of projection units of this invention that are each generally indicated by the reference numeral 112 and each unit 112 comprises a cylindrical metallic projection 38M and a tubular metallic housing means 113 with the tubular housing means 113 having a stepped end 114 disposed in a cooperating opening 115 formed through the belt means 21M so that the stepped end 114 can be secured therein, such as by welding, and have an annular shoulder 116 abutting against the surface 42M of the belt means 21M as illustrated in FIGS. 24-26 so that a surface 117 of the tubular housing 113 that fully projects through the opening 115 is disposed substantially flush with the surface 24M of the electrode 21M as illustrated in FIG. 24.

The cylindrical projection 38M of each unit 112 has its flat end surface 45M adapted to be disposed flush with the housing end surface 117 and the surface 24M of the electrode 21M when the projection 38M is held in its fully up position as illustrated in FIG. 24 by a suitable compression spring 118 having one end 119 bearing against the surface 42M of the electrode 21M and its other end 120 bearing against a surface 121 of a metallic disc-like member 122 fastened to the other end 123 of the projection 38M as illustrated.

In order to limit the amount of upper movement of the projection 38M of each unit 112 relative to its housing 113, the projection 38M can have a cross pin 124 that extends through a side slot 125 in its respective housing means 113 and having opposed ends 126 and 127 which respectively limit the upper movement of the projection 38M as illustrated in FIG. 24 by the pin 124 reaching the end 126 of the slot 125 and limiting the degree of projection of the projection 38M beyond the surface 24M of the electrode 21M in the manner illustrated in FIG. 26 by the cross pin 124 bottoming out against the end 127 of the slot 125 as illustrated. Of course, it is to be understood that the amount of projection of the projection 38M below the surface 24M of the electrode 21M could be limited by the surface 121 of the disc-like member 122 of the projection 38M bottoming out against the upper surface 128 of the respective housing means 113 before the pin 124 hits the bottom 127 of the slot 125 as the case may be.

In any event, each projection unit 112 has an upper cam surface 129 on the disc-like member 122 which will bear against the outside surface 130 of the inner belt 107 that is not secured thereto so that a differential movement between the belts 107 and 21M can be provided even though the inner belt 107 tends to control the degree of projection of the projections 38M into the material 23M as the particular projection unit 112 moves from left to right in FIG. 23 at the lower run 101 of the electrode belt 21M as will be apparent hereinafter.

The belts 21M and 22M can be oppositely charged as previously described and the projections 38M will be given the same charge as the belt 21M as the housings 113 are conductive. However, the housing 113 could be made of insulating material and the springs 118 could be insulated so that the projections 38M can be given a charge different than the charge on the belt 21M, if desired. For example, see such an arrangement in FIG. 29 which will be hereinafter described.

The belt 21M can carry the projection units 112 in any suitable pattern thereon and in any suitable spacing therebetween with the units 112 being arranged in longitudinal rows and transverse rows or in staggered longitudinal rows and staggered transverse rows as desired. For example, see FIG. 8 of the aforementioned Candor U.S. Pat. No. 4,236,317, wherein projections on an electrode sheet are arranged in both transverse and longitudinal directions to provide a desired pattern thereof.

In any event, it can be seen that the apparatus 20M of this invention can be formed from relatively simple parts to operate in a manner now to be described.

As the belt means 21M and 22M, as well as the inner belt 107, are being driven by their respective drive rollers 100, 102 and 108 so that the runs 101, 103 and 109 move from left to right in FIG. 23, the material 23M being continuously fed into the chamber 104 at the inlet end 105 of the apparatus 20M is moved from left to right to be discharged at the outlet end 106 with the liquid thereof having been removed not only by the electrostatic field 28M created between the electrodes 21M and 22M in the manner previously set forth, but also by the projections 38M each moving from the inlet end 105 to the outlet end 106 and being progressively projected into the material 23M to create the nonuniform fields 46M as illustrated in FIGS. 25 and 26 and as previously set forth, the support rollers 110 and 111 being so controlled in the spacing therebetween in the apparatus 20M that each projection unit 112 has its projection 38M in its fully up position as illustrated in FIG. 24 adjacent the inlet end 105 of the apparatus 20M and then being at its fully inserted position into the material 23M as illustrated in FIG. 26 at the outlet end 106 of the apparatus 20M.

In this manner, it can be seen that the spacing between the support rollers 110 and 111 at the entrance end 105 of the apparatus 20M are arranged to be approximately the distance A from each other as illustrated in FIG. 26 and by the time that particular projection unit 112 is at the position 26—26 of FIG. 23, the support rollers 110 and 111 at the position 26—26 are disposed at the distance B from each other. Likewise, the compression springs 118 of the units 112 thereby tend to provide a compressive force on the material 23M between the runs 101 and 103 as the liquid of the material 23M is being removed therefrom as is evidenced by the runs 101 and 103 at the entrance end 105 of the apparatus 20M being disposed initially at the spacing C of FIG. 26 and ending up with the spacing D at the time the particular projection unit 112 is at the position 26—26 of FIG. 23.

Therefore, it can be seen that by computer controlling the up and down movement of the right-hand end of the upper belt means 21M and 107 of the apparatus 20M, the degree of projection of the projections 38M into the material 23M as the projections 38M progress from left to right through the apparatus 23 can be controlled as well as the degree of compression of the material 23 between the belts 21M and 22M as desired.

In any event, it can be seen that the apparatus 20M will dewater the material 23M through the action of the electrostatic field created between the electrodes 21M and 22M as well as by the electrostatic fields being created by the projections 38M all for the same reasons as set forth with regard to the embodiment 20 of applicant's invention as previously set forth.

Of course, it is to be understood that during the movement of the projection units 112 from left to right in FIG. 23, the material 23M being acted upon by the particular projection unit 112 can be sonically or ultrasonically vibrated to enhance the dewatering operation as previously set forth. For example, the support rollers 111 and/or support rollers 110 could be sonically or untrasonically vibrated to transmit the vibratory energy to the material 23M disposed between the electrode belts 21M and 22M for the reasons previously set forth in regard to the vibrating units 47, 49 and 48 of FIG. 1.

While the runs 101 and 103 of the belts 21M and 22M can be driven at the same speed, the belts 21M and 22M can have the runs 101 and 103 driven at different speeds so that not only will such differential movement cause a turbulence to the material 23M as it moves from left to right in FIG. 23, but also the projections 38M will cause a raking action on the material 23M as the material 23M is passed from left to right through the apparatus.

Also, while the runs 101 and 103 of the belts 21M and 22M are illustrated as being in direct electrical contact with the material 23M so that an electrical current can flow through the material 23, it is to be understood that one or both of the belts 21M and 22M and/or the projections 23M can be insulated from the material 23M, if desired.

Therefore, it can be seen that any of the electrode embodiments of applicant's invention that are generally indicated by the reference numerals 20–20L could be utilized to form a continuous dewatering arrangement such as illustrated in FIGS. 23–26.

For example, as previously stated, the projections 38M can be given a potential or charge different than the potential or charge of the belt 21M by forming the housings 113 of electrically insulating material and electrically insulating the springs 118 as illustrated in FIG. 29. Thus, the belt 107 can be given the desired different potential or charge to the projections 38M in the run 101 of the belt 21M as the heads 122 thereof are in good electrical contact with the run 109 of the belt 107 under the compressive force of the springs 118 whereby the apparatus 20M will dewater in the same manner as the apparatus 20B as previously described.

Another apparatus and method of this invention is generally indicated by the reference numeral 20N and parts thereof similar to the apparatus and methods 20–20M previously described are indicated by like reference numerals followed by the reference letter "N".

As illustrated in FIG. 27, the apparatus and method 20N is substantially the same as the apparatus and method 20M previously described except that in the apparatus 20N, the drive roll means 100N for the upper electrode means or endless belt 21N is disposed further to the right a sufficient distance from the drive roller means 108N for the inner belt means 107N so that the projections 38N will be fully retracted into their respective housing means 113N before the respective projection units 112N reach the roller means 100N so that a suitable scraper 140 can have its end 141 effectively clean the surface 24N of the electrode belt means 21N to remove any of the material 23N that remains against the same after the material 23N moves beyond the outlet means 106N as illustrated in FIG. 27. In addition, suitable rotatable cleaning brush means 142 can be disposed adjacent the belt means 21N while the same is on the drive roller means 100N to have the bristle-like portions 143 thereof readily scrape any material from the surface 24N of the electrode belt means 21N as the same moves past the rotating rollers 142. Also, a suitable nozzle means 144 can be provided to direct a cleaning fluid 145 onto the surface 24N of the electrode belt means 21N to assist in the action of the brush means 142 thereon to clean the same from any residual material 23N that might remain thereon beyond the cleaning action of the scraper 140.

Similarly, the outer surface means 25N of the lower electrode belt means 22N could be cleaned of any of the material 23N that remains on the same by a suitable scraper 146, rotating brush means 147 and liquid dispensing nozzle means 148 as illustrated in being utilized in the manner previously described.

Therefore, it can be seen that the apparatus 20N of FIG. 27 operates in the same manner as the apparatus 20M previously described whereby a further discussion of the operation of the apparatus and method 20N is deemed unnecessary except to state that it can be seen that the apparatus 20N has means for cleaning the respective surfaces 24N and 25N of the electrode belt means 21N and 22N after the material 23N has reached the outlet means 106N as illustrated as the projection units 112N have the projections 38N thereof fully retracted so that the scraper 140 and brushes 142 can act on the surface means 24N of the electrode means 21N.

While the apparatus 20M and 20N previously described have the electrode means 21M and 21N thereof respectively arranged so that the same voltage differential is provided with its cooperating electrode means 22M and 22N from the respective inlet means 105 to the respective outlet means 106 thereof, it is to be understood that the electrode belts 21M and 21N could be so constructed and arranged that the same would permit parts thereof to provide an increasing voltage differential with its adjacent portion of the lower electrode belt means 22M and 22N as that part of the upper electrode belt 21M and 21N moves from the inlet means 105 to the outlet means 106 so that the resulting intensity of the electrostatic field being created by the particular voltage gradient will be increased to provide a greater dewatering action as that part of the electrode means 21M or 21N moves toward the outlet means 106 of the apparatus than at the inlet means 105 thereof for the reasons previously set forth in connection with the apparatus and method 20 previously described.

In particular, such an apparatus and method of this invention is generally indicated by the reference numeral 20P in FIG. 28 and parts thereof similar to the apparatus and methods 20–20N previously described are indicated by like reference numerals followed by the reference letter "P".

As illustrated in FIG. 28, the apparatus and method 20P is substantially the same as the method and apparatus 20M and 20N previously set forth except that the electrode belt means 21P is formed from a plurality of conductive sections 150 that are electrically insulated from each other by suitable insulating means 151 so that the sections 150 are each adapted to move in a serial manner from the inlet means 105P to the outlet means 106P and cooperate with an adjacent portion of the lower electrode belt 22P to define its electrostatic field means 28P therewith for acting on its respective portion of the liquid bearing material 23P disposed therebetween whereby the intensity of such electrostatic field means 28P can be different than the intensity of an adjacent electrostatic field means 28P as the adjacent section 150 can have the voltage differential that is created between that section 150 and its adjacent portion of the lower electrode means 22P of a greater value than the voltage differential between the next left hand section 150 and its adjacent portion of the lower electrode 22P.

This can be accomplished by also forming the inner belt means 107P from a plurality of like conductive sections 152 being electrically insulated from each other by suitable insulating means 153 and imposing a charge thereon by a particular roller 111P having such charge imposed thereon by a charge means or wiper means 154 receiving its charge from a lead means 155 so that the particular section 152 transfers its charge value to the particular heads 122P of the particular projection means or units 112P disposed in electrical contact therewith and in electrical contact with its respective section 150 of the electrode belt 21P so that the respective section 150 is given such charge.

In this manner, a suitable computerized charging means (not shown) that is interconnected to the lead means 155 for the rollers 111P could be so programmed that the same will provide a certain voltage differential between the section 150′ and the adjacent portion of the lower electrode means 22P of, say, 100 volts (even though the section 150′ and the electrode belt 22P are disposed in electrical contact with the material 23P disposed therebetween for the reasons previously set forth) and then when that particular section 150′ has moved to the right in FIG. 28 so as to be under the influence of the next adjacent upper roller means 111P″, the next roller means 111P″ will create a voltage differential with the lower electrode belt means 22P that is, say, 150 volts with each roller 111P thereafter from left to right in FIG. 28 increasing the voltage on that section 150′ as the same moves further to the right so that by the time the section 150′ reaches the outlet means 106P, the section 150′ might create a voltage differential with the lower electrode means 22P of several hundred volts or even several thousand volts as the case may be. Similarly, the projections 38P of each section 150 likewise will have the voltage being created between the projection means 38P thereof and the electrode means 22P increased by the particular roller means 111P being effective to charge the same.

Thus, it is believed that by having the computer means sensing, with suitable sensors (not shown), the amount of dewatering that is taking place on each part of the material 23P as the same progresses from the inlet means 105P to the outlet means 106P, the computer means can control the amount of voltage gradient being applied thereto as the same progresses from the inlet means 105P to the outlet means 106P and thereby control the intensity of the electrostatic field means acting thereon as the particular section of the material 23P moves from the inlet means 105P to the outlet means 106P and such voltage gradient can be increased in uniform steps or varying steps as desired.

Likewise, while the upper rollers 111P and lower rollers 110P can be sonically and ultrasonically vibrated to impart vibration to the material 23P disposed therebetween for the reasons previously set forth, the intensity of the vibrations can vary by having the sonic or ultrasonic energy being applied to the particular rollers 111P and/or 110P varied from the inlet means 105P to the outlet means 106P in the same manner that the wipers 154 are providing a different charge intensity to the various rollers 111P for the reasons previously set forth.

Should the housings 113P of the units 112P each electrically insulate its particular projection means 38P from its respective section 150 of the electrode belt means 22P in the manner illustrated in FIG. 29, the section 150 thereof can be given a charge by a charging roller means 156 through its lead means 157 that will be different than the charge that will be given to the projection 38P thereof for all of the reasons previously set forth in having the projections electrically insulated from the electrode carrying the same so that a potential differential can be given between the projection 38P and its respective section 150 as illustrated in FIG. 29.

And while the sections 150 of the electrode means 21P have been illustrated as having at least one projection unit 112P carried thereby, it is to be understood that the electrode belt 21P could be provided without any of the projection units 112P so that the rollers 111P would directly engage against the sections 150 in the manner illustrated in FIG. 30 wherein another method and apparatus of this invention is generally indicated by the reference numeral 20Q and parts thereof similar to the method and apparatus previously described are indicated by like reference numerals followed by the reference letter "Q".

As illustrated in FIG. 30, it can be seen that the upper electrode belt 21Q is formed of a plurality of sections 150Q electrically insulated from each other by the insulating means 151Q and respectively have the rollers 111Q disposed in electrical contact therewith so that the particular roller 111Q having the charge applied thereto by its wiper means 154Q through the lead means 155Q thereof will create a voltage differential between that respective section 150Q and the adjacent portion of the lower electrode belt means 22Q to have its electrostatic field act on the material 23Q disposed therebetween with a certain intensity that will be different than the intensity of the electrostatic field between another section 150Q for the reasons previously set forth in connection with the method and apparatus of FIG. 28.

Therefore, it can be seen that the apparatus and methods 20P and 20Q of this invention each can vary the voltage between a particular section 150 or 150Q of its respective upper electrode belt 21P or 21Q and the lower belt means 22P or 22Q as that particular section 150 or 150Q moves from the inlet means to the outlet means of the apparatus and that varying voltage could be in steps of any desired magnitude of voltage charge or in substantially an infinitely variable manner such as by having the particular roller 111P infinitely increasing its charge from a starting value to an ending value to a particular section 150 from the time its leading edge 158 makes contact with the roller 111P to the time its trailing edge 159 is engaging that particular roller 111P with the roller 111P then dropping its charge back to its starting value when it is engaged by the leading edge 158 of the next section 150 being moved thereto.

Of course, it is to be understood that instead of increasing the voltage as a particular section 150 or 150Q moves from the inlet means to the outlet means, the same can actually have the voltage therein decreased or any combination of increasing or decreasing manner as the same could all be computer controlled with the computer itself applying the particular charge on the particular roller means 111P or 111Q as determined by many parameters being sensed by the computer or having been preprogrammed all in a manner well known in the computer art.

Also, it is believed that such computer means can be arranged to reduce the high charge value of each section 150 (or 150Q) as it leaves the outlet means 106 to a lower value that is sufficient for the charge value of the section 150 when it is returned to its beginning dewatering position at the inlet means 105, the charge taken from such section 150 at the outlet means 106 being used by the computer means to add to the charge on the sections 150 intermediate the inlet means 105 and the outlet means 106 so that no charge is wasted by the method and apparatus of this invention. Thus, the charge being provided on each section 150 as it starts at the inlet means 105 can cause a voltage differential with the cooperating portion of the electrode means 22P of any desired starting voltage, such as 50 volts, and by the time that section 150 reaches the outlet means 106 the charge being provided thereon can cause a voltage differential with the cooperating portion of the electrode means 22P of any desired ending voltage, such as 1,000 volts, such indicated values being given merely for example purpose and not to be a limitation on this invention as each different type and degree of dryness of the liquid bearing material 23P being acted upon will have different voltage requirements, as desired.

Also, it is believed that as a section 150 or 150Q of the respective belt means 21P or 21Q moves from the inlet to the outlet of the respective apparatus 20P or 20Q, the initial charge thereon can be changed to an increasing charge, a decreasing charge, a pulsing charge or an oscillating charge and then be again changed to any of such charges as desired so that by the time that particular section 150 or 150Q reaches the outlet the charge thereon could have been changed one or more times, such as first having a steady charge, then an oscillating charge for dielectrically heating the material adjacent thereto, then to a pulsing charge, then to a higher steady charge, etc. And all of this changing of the charge on that section 150 or 150Q could be computer controlled as previously set forth.

Thus, by merely grounding the lower belt means 22P or 22Q and changing the charge on the sections 150 and 150Q of the upper belt means 21P and 21Q any desired combinations of electrostatic actions for acting on the material 23P or 23Q can be provided for the apparatus 20P and 20Q.

Further, it is believed that since an electrical current tends to flow through a path that has the least resistance between two members then it may be found that in an apparatus of the type where the upper electrode portion at the inlet means of the apparatus is electrically interconnected to the upper electrode portion at the outlet of the apparatus, such as provided by the belt means 21M, more electrical current flows between the upper and lower electrode portions at the inlet means than at the outlet means because the resistance to the current flow through the liquid bearing material disposed therebetween increases as the liquid in such material is removed from the material as it moves from the inlet to the outlet. However, it is believed that by providing the sections 150 and 150Q which are each electrically insulated from the other sections 150 and 150Q, the current flow through the material at each section 150 and 150Q as it moves from the inlet means to the outlet means of the apparatus can be accurately controlled or maintained by merely increasing or changing the voltage differential between that section 150 or 150Q and the lower electrode means 22P or 22Q in the manner previously set forth.

While the apparatus and methods 20M, 20N, 20P and 20Q each comprise endless belt means, it is to be understood that at least one of the belt means thereof could comprise the outer periphery of a roll or drum, such as the roll or drum of the aforementioned Candor U.S. Pat. No. 3,931,682, and have the individual conductive sections, similar to sections 150 and 150Q of the apparatus and methods 20P and 20Q, for the purpose previously set forth whereby the endless electrode means of this invention are not to be limited to just the belt means previously illustrated and described. For example, see FIGS. 31 and 32 wherein such structure is provided and will hereinafter be described.

Further, while the sections 150 and 150Q of the apparatus 20P and 20Q are illustrated as being in direct electrical contact with the material 23P and 23Q so that an electrical current can flow through the material 23P and 23Q, it is to be understood that the sections 150 and 150Q can be electrically insulated from the material 22P and 22Q, if desired, while the cooperating electrode means 22P and 22Q remains uninsulated and in electrical contact with the liquid bearing material 23P and 23Q or are also electrically insulated from the material 23P and 23Q, as desired.

Also, it is to be understood that the electrode means 21P and 22P, as well as the electrode means 21Q and 22Q, can be moved in the same direction but at different speeds, if desired.

While no means have been illustrated in the drawings of the apparatus 20M, 20N, 20P and 20Q for receiving the liquid that is forced through the openings in the lower belt means 22M, 22N, 22P and 22Q thereof, it is to be understood that suitable liquid collecting means can be provided within the confines of the lower looped belt means 22M, 22N, 22P and 22Q for collecting such liquid, such as is set forth in the aforementioned Muralidhara et al U.S. Pat. No. 4,802,964, and such liquid collecting means can apply a suction to aid in such liquid removal as previously set forth in connection with the device 34 of FIG. 1.

While the various apparatus and methods of this invention have been previously described as stating that as the projection thereof, such as projection 38, is moved closer toward the other electrode means, such as electrode 22 for the projection 38, the voltage between such projection and such electrode can be increased to enhance the dewatering electro-osmotic action as the intensity of the electrostatic field created thereby is increased, it is to be realized that as a particular projection, such as projection 38, is moved toward its cooperating electrode means, such as electrode means 22, and merely maintaining the same voltage between such projection and such electrode causes the electrostatic field created therebetween to intensify because the closer the projection comes to the cooperating electrode, the stronger the electrostatic field is therebetween even though the voltage differential remains steady therebetween.

Thus, when the main electrodes of each apparatus of this invention, such as electrodes 21 and 22, are respectively moved closer toward each other through the dewatering and/or compressing action previously set forth, the strength of the electrostatic field therebetween acting on the remaining liquid in the liquid bearing material disposed therebetween intensifies. Likewise, the projecting of the projection of such upper electrode into such remaining liquid bearing material causes the field that it creates with the lower electrode to intensify the closer that projection gets to the lower electrode even if the voltage between that projection and that lower electrode remains the same. Therefore, increasing the voltage under either or both such circumstances further intensifies the created electrostatic field means for enhancing the dewatering action thereof.

While the liquid bearing material 23P or 23Q is being moved through the apparatus 20P or 20Q by the movement of the upper electrode 21P or 21Q and lower electrode 22P or 22Q, it is to be understood that the liquid bearing material 23P or 23Q can be moved by other means, such as belt means disposed between the electrode means with the electrode means either being movable therewith or being stationary as desired. Also, the liquid bearing material can be moved by a screw, such as in a screw press, while the outer cylindrical electrode means that is stationary could be in sections that are electrically insulated from each other so as to have the charges thereon different from the outer sections thereof for the reasons previously set forth in connection with the apparatus 20P and 20Q, the screw having the screw thread thereof formed of electrically insulating material while the shaft thereof is formed of electrically conductive material and is grounded or oppositely charged from the section of the cylindrical member. For example, see FIG. 33 wherein such structure of this invention is illustrated and will be hereinafter described.

Figure 31:
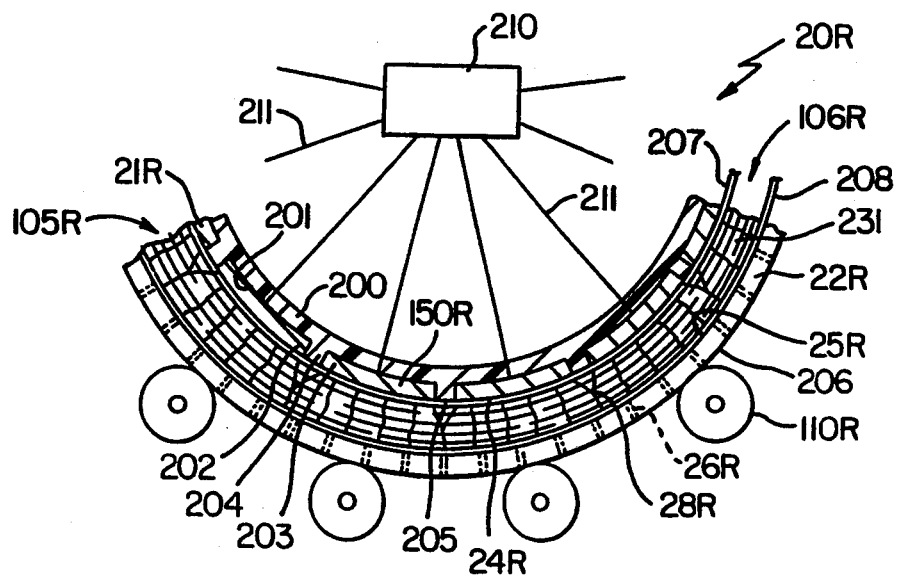
FIG. 31 is a fragmentary view similar to FIG. 28 and illustrates another apparatus and method of this invention.

Another method and apparatus of this invention is generally indicated by the reference numeral 20R in FIG. 31 and parts thereof similar to the methods and apparatus 20P or 20Q previously described are indicated by like reference numerals followed by the reference letter "R", the apparatus 20R being similar to the apparatus set forth in the aforementioned European patent application No. 0,286,714.

As illustrated in FIG. 31, the apparatus 20R comprises a rotatable drum 200 formed of any suitable electrically insulating material, such as ceramic material, and carrying a first electrode means 21R on the outer periphery 201 thereof, the first electrode means 21R comprising a plurality of conductive arcuate sections or plates 150R that are fastened thereto in any suitable manner and are electrically insulated from each other by being spaced from each other at adjacent end edge means 202 and 203 thereof. In addition, electrical insulation means 204 are respectively disposed between the adjacent end edge means 202 and 203 of adjacent sections 150R and have outer peripheral means 205 that are arcuate and disposed substantially flush with the arcuate peripheral surface means 24R of the adjacent sections 150R as illustrated. However, it is to be understood that the insulation means 204 can project beyond the peripheral means 24R in the manner illustrated in FIG. 32 for a purpose hereinafter described.

The apparatus 20R comprises a second electrode means 22R that is adapted to have its peripheral surface means 25R spaced outwardly in a generally concentric manner from the facing peripheral surface means 24R of the electrode means 21R by the liquid bearing material 23R that is fed into the inlet means 105R in any suitable manner, the electrode means 22R comprising a flexible endless belt means having suitable openings 26R therethrough for permitting the liquid of the liquid bearing material 23R to pass therethrough during the electrodewatering thereof caused by the electrostatic fields 28R in the manner previously described.

The apparatus 20R comprises a plurality of rollers 110R that engage the outer peripheral surface means 206 of the electrode means 22R to not only tend to compress the electrode means 22R toward the electrode means 21R to compress the liquid bearing material 23R therebetween, but to also vibrate the electrode means 22R and, thus, the material 23R for the reasons previously set forth by having the rollers 110 vibrated sonically or ultrasonically as previously set forth.

If desired, porous belts 207 and 208 of any suitable nonconductive material can be disposed respectively against the peripheral surface means 24R and 25R of the electrode means 21R and 22R so as to confine the liquid bearing material 23R therebetween while still effectively having the liquid bearing material 23R disposed in electrical contact with the electrode means 21R and 22R, the belts 207 and 208 respectively moving in unison with the electrode means 21R and 22R from the inlet means 105R to the outlet means 106R of the apparatus 20R.

A computer controlled means 210 is electrically connected to each section 150R by suitable lead means 211 so that the computer controlled means 210 can vary the voltage differential between a particular section 150R and its cooperating part of the grounded electrode means 22R as that particular section 150R moves from the inlet means 105R to the outlet means 106R for the same purpose as the sections 150 and 150Q of the apparatus 20P and 20Q.

Thus, it can be seen that the resulting electrostatic fields 28R of the apparatus 20R can have the intensities thereof changed as each field 28R moves from the inlet means 105R to the outlet means 106R with its respective section of the liquid bearing material 23R.

Of course, as previously stated or as hereinafter stated, each roller 110R could provide its vibrational energy at an energy level different than another adjacent roller 110R in the same manner that a different voltage potential is being provided by each section 150R relative to the next adjacent section 150R all for the reasons previously set forth.

In addition, each roller 110R could compress the electrode belt 22R toward the drum 200 with a force different than the compressive force being provided by the next adjacent roller 110R so that each section of material 23R will be subjected to different compressive forces in a serial manner as that section of material 23R moves from the inlet 105R to the outlet 106R of the apparatus 20R. For example, each roller 110R can have its own ram means for moving the roller 110R toward or away from the drum 200 so as to provide a changing or changed compressive force on the liquid bearing material 23R therebetween and such individual ram means can be computer controlled for optimum results.

Therefore, it is to be understood that in any appropriate embodiment of this invention, whether previously illustrated and described or hereinafter illustrated and described, one or more or all of the forces, such as the electrostatic force, the vibratory force and the compressive force, that act on each section of liquid bearing material as that section of material passes from the inlet to the outlet of the particular apparatus can be different at different locations between the inlet and the outlet of the apparatus in the same manner as previously set forth for the apparatus and method 20R of this invention so that each section of liquid bearing material will have different forces being serially applied thereto to enhance the dewatering thereof as that section of liquid bearing material passes through that particular apparatus of this invention.

While the apparatus 20R illustrated in FIG. 31 does not have projection means carried by the sections 150R thereof as in the apparatus 20P, it is to be understood that the apparatus 20R could have such projection means, if desired.

Figure 32:
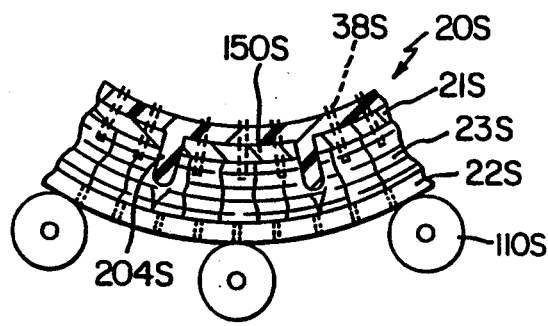
FIG. 32 is a fragmentary view similar to FIG. 31 and illustrates another apparatus and method of this invention.

For example, see the method and apparatus 20S illustrated in FIG. 32 wherein the parts thereof that are similar to the parts of the apparatus 20P, 20Q and 20R previously described are indicated by like reference numerals followed by the reference letter "S".

As illustrated in FIG. 32, the apparatus 20S does not have the belt means 207 of the apparatus 20R and each section 150S of the apparatus 20S has at least one projection 38S that is movable relative thereto and is adapted to be projected into the material 23S disposed between the electrode means 21S and 22S for the reasons previously set forth. In order to prevent the projections 38S from reaching the electrode means 22S, the insulation 204S between the adjacent sections 150S can project beyond the sections 150S so as to contact the electrode means 22S before the adjacent projections 38S can reach the same. Of course, the belt means 208 of the apparatus 20R could be used with the apparatus 20S, if desired.

Therefore, it can be seen that in the operation of the apparatus 20P, 20Q, 20R and 20S, the charge being maintained on each section 150, 150Q, 150R and 150S thereof even though a current flow is being provided through the adjacent section of the liquid bearing material 23P, 23Q, 23R and 23S between such section 150, 150Q, 150R and 150S and the cooperating part of the electrode means 22P, 22Q, 22R and 22S to cause liquid to leave the material 23P, 23Q, 23R and 23S by electroosmosis, can be changed as that section 150, 150Q, 150R and 150S moves from the inlet means to the outlet means of the apparatus and such electrostatic field action can be augmented or enhanced by vibratory action and/or the projections 38P and 38S for the reasons previously set forth. And such changing of the charge on each section 150, 150Q, 150R and 150S can result in an increasing voltage, a decreasing voltage, a pulsed voltage, an oscillated voltage or any combination thereof, as desired.

While the apparatus 20M–20S previously set forth each comprises a belt press apparatus, it is to be understood that other types of press apparatus can utilize the changing voltage feature of this invention, with or without the changing vibratory field action, that has been described in connection with the apparatus and methods 20P–20S previously set forth.

Figure 33:
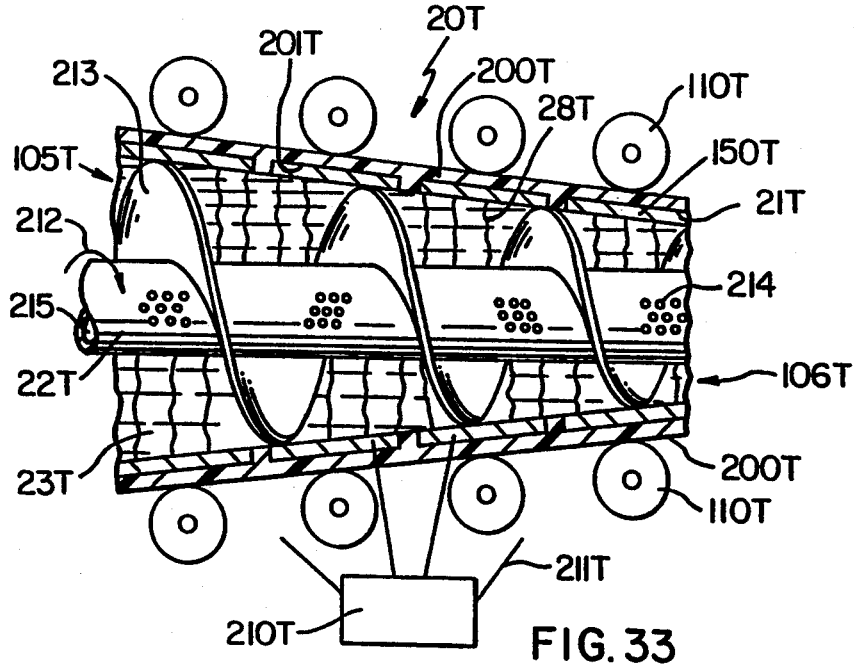
FIG. 33 is a fragmentary view similar to FIG. 28 and illustrates another apparatus and method of this invention.

In particular, such feature is provided by the method and apparatus of this invention that is generally indicated by the reference numeral 20T in FIG. 33 wherein parts thereof similar to the method and apparatus of this invention previously described are indicated by like reference numerals followed by the reference letter "T".

As illustrated in FIG. 33, it can be seen that the method and apparatus 20T comprises a screw press apparatus and method and has an outer conical housing 200T provided with a larger diameter at the inlet means 105T thereof than the diameter at the outlet means 106T thereof in the manner of a conventional screw press, the housing member 200T being formed of any suitable electrically insulating material, such as ceramic material, and carrying on the inner periphery 201T thereof a plurality of annular conductive plates 150T that form a first electrode means 21T that cooperates with an axially disposed grounded shaft or inner electrode means 22T that is adapted to be rotated in the direction of the arrow 212 and that is carrying an electrically insulating screw thread 213 thereon that cooperates with the conically shaped outer electrode means 21T to move the liquid bearing material 23T from the inlet 105T to the outlet 106T while compressing the same between the outer electrode means 21T and the inner electrode means 22T in a manner well known for a screw press so that the liquid being expressed from the liquid bearing material 23T by the compressing action will exit through suitable openings 214 in the shaft 22T to be removed therefrom out through an inner passage 215 of the shaft 22T in a manner well known in the art.

The previously described computer 210T can be interconnected to the annular sections 150T of the outer electrode means 21T by the lead means 211T so as to provide a different voltage potential between each section 150T and the inner electrode 21T so that as the material 23T moves from the inlet 105T to the outlet 106T, the voltage intensity acting through the same will be increased as the computer 210T provides an increased voltage from one section 150T to the next section 150T for the reasons previously set forth. In addition, it can be seen that as the sections 150T are getting closer to the shaft 22T the closer the sections 150T are to the outlet 106T whereby such an arrangement also provides for a greater serial intensity of the electrostatic fields 28T for the reasons previously set forth.

If desired, a plurality of vibrating rollers 110T can be disposed against the conical housing 200T to impart vibrating action thereto so as to provide vibrating action on the moisture bearing material 23T as the same moves from the inlet means 105T to the outlet means 106T. Of course, as previously stated, each roller 110T could provide its vibrational energy at an energy level different than another adjacent roller 110T in the same manner that a different voltage potential is being provided by each section 150T relative to the next adjacent section 150T all for the reasons previously set forth.

Thus, it can be seen that the method and apparatus 20T of FIG. 33 applies the principles of this invention to a screw press arrangement in a manner believed to enhance the dewatering rate of the screw press for the reasons previously set forth.

Figure 34:
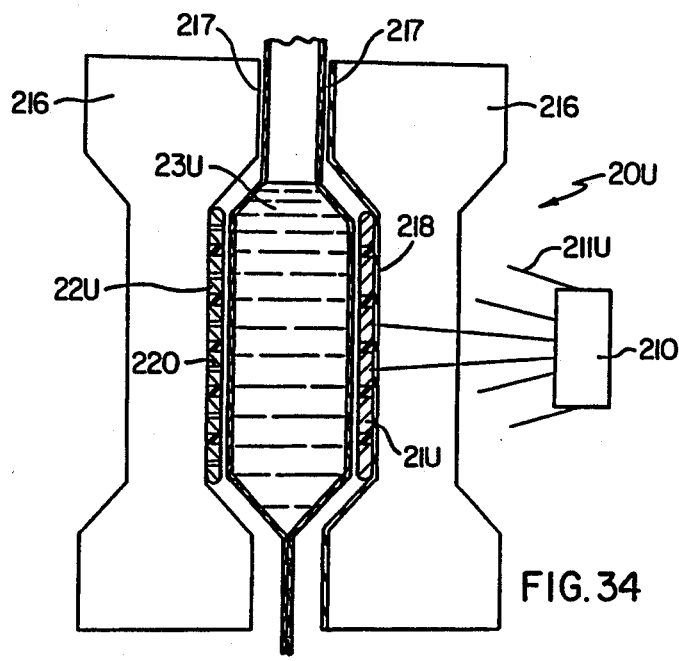
FIG. 34 is a fragmentary view similar to FIG. 28 and illustrates another apparatus and method of this invention, the apparatus of FIG. 34 being in one condition thereof.
Figure 35:
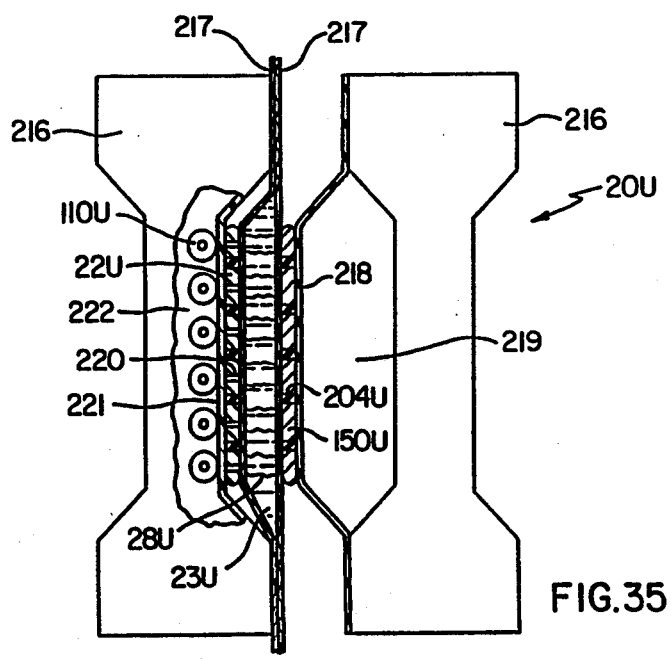
FIG. 35 is a view of the apparatus of FIG. 34 in another condition thereof.

Similarly, the unique features of this invention are being utilized in FIGS. 34 and 35 to enhance a frame plate filter press method and apparatus that is generally indicated by the reference numeral 20U and the parts thereof similar to the other methods and apparatus of this invention are generally indicated by like reference numerals followed by the reference letter "U".

As illustrated in FIGS. 34 and 35, the apparatus and method 20U comprises a plurality of adjacent pairs of stationary frame plates 216 (only one pair being illustrated in FIGS. 34 and 35) that are disposed in spaced apart relation and are formed from electrically insulating material, such as a polymeric material, all in a manner well known in the art. For example, see the aforementioned article "Electrodes give dewatering a boost" set forth in the No. 2, 1990, issue of *Water Quality International* whereby this article is being incorporated into this disclosure by this reference thereto.

Such article shows that it is known to provide a pair of filter cloths 217 between the pair of adjacent plates 216 so as to have the liquid bearing material 23U disposed therebetween and then being placed under compression by having a flexible membrane 218 of one of the plates 216 be expanded toward the other plate 216 by fluid pressure being directed into a chamber 219 between the membrane 218 and its plate 216 in the manner illustrated in FIG. 35 whereby the liquid in the liquid bearing material 23U is forced to the left out through the left-hand filter cloth 217 and through suitable openings 220 in an electrode means 22U carried by a wall 221 of the left-hand filter plate 216 as illustrated in FIGS. 34 and 35, the water passing through the openings 220 in the electrode means 22U being directed downwardly by gravity through suitable grooves (not shown) formed in the wall 221 in a manner well known in the art.

As also set forth in such article, the membrane 218 carries an electrode means 21U therewith and a potential differential is created between the electrodes 21U and 22U to enhance the dewatering operation at the same time that the material 23U is being placed under compression by the outwardly expanding membrane 218.

However, it is believed according to the teachings of this invention that if the electrode 21U is formed of a plurality of individual conductive sections 150U and being separated from each other by insulating material 204U, such sections 150U can be provided with different charges by the computer 210U through the interconnecting leads 211U so that the upper sections 150U can provide a different voltage gradient through the material 23U in its cooperation with the other electrode 22U than the sections 150U toward the bottom of the apparatus 20U. For example, it may be found that the upper sections 150U should provide a greater potential differential at the same time that the lower sections 150U are providing a lower potential differential as it is believed that the upper parts of the material 23U will become dryer faster than the lower parts thereof because of gravity tending to move the liquid downwardly through the material 23U.

If desired, the other electrode 22U could be formed from a plurality of sections 150U and having insulating material 204U therebetween so that the sections 150U of the other electrode 22U can have different charges imposed thereon opposite to the charges of the sections 150U of the electrode means 21U or the section 22U could merely be a single grounded electrode plate as desired.

In addition, suitable rollers 110U can be provided in an internal chamber 222 of the left-hand filter plate 216 so as to engage against the wall 221 and thereby impart vibrational energy into the material 23U through the electrode 22U all in the manner previously set forth to further enhance the dewatering operation as desired.

It is believed that it might be advantageous to first operate the apparatus 20U with all of the sections 150U of the electrode means 21U creating the same voltage with the cooperating parts of the electrode means 22U and then increasing the voltage differential provided by the upper sections 150U so that a greater amount of dewatering will take place in the same time period if all of the sections 150U provided the same voltage differential for that same time period. For example, all of the sections 150U can create a voltage of say 50 volts for a certain initial time period when acting on the liquid bearing material 23U to dewater the same and then the lowest section 150U can remain with that 50 volts whereas the next adjacent section 150U is caused to provide 60 volts, the next upper adjacent section 150U is caused to provide 70 volts, etc., for another certain time period. The voltage provided by each section 150U could thereafter be further changed, as desired.

Therefore, it can be seen that the method and apparatus 20U of FIGS. 34 and 35 provide a frame plate filter press that has the unique means of this invention for enhancing the dewatering operation thereof.

As previously stated, in all of the embodiments of this invention, not only can the electrostatic field arrangement being created between the two electrode means have different voltages for different sections of the material being dewatered thereby, but also different sections of the material can have different intensities of the ultrasonic or sonic energy being applied thereto as desired and it may be found that such different intensities of the vibrational energy should be in combination with the different intensities of the electrostatic field for the most advantageous dewatering operation. For example, it may be found that as the voltage or electrostatic field intensity is increased on a particular section of liquid bearing material, the vibrational energy or field intensity should also be increased for optimum liquid removal from that section of material. Also, it may be found that the compression on that section of liquid bearing material should likewise be increased at the same time.

While the method and apparatus 20R of FIG. 31 has the sonically or ultrasonically vibrating rollers 110R engaging against the electrode means 22R so as to impart vibrational energy to the material 23R, it is to be understood that the electrode plates 150R could also be sonically or ultrasonically vibarated in combination with the vibrating electrode means 22R or in lieu thereof to also impart vibrational energy into the material 23R to enhance the electrodewatering thereof for the reasons previously set forth, if desired. And the intensity of the vibrations of each such electrode plates 150R can be changed in the same manner that the voltage is being changed as each plate 150R moves from the inlet means 105R to the outlet means 106R.

Figure 36:
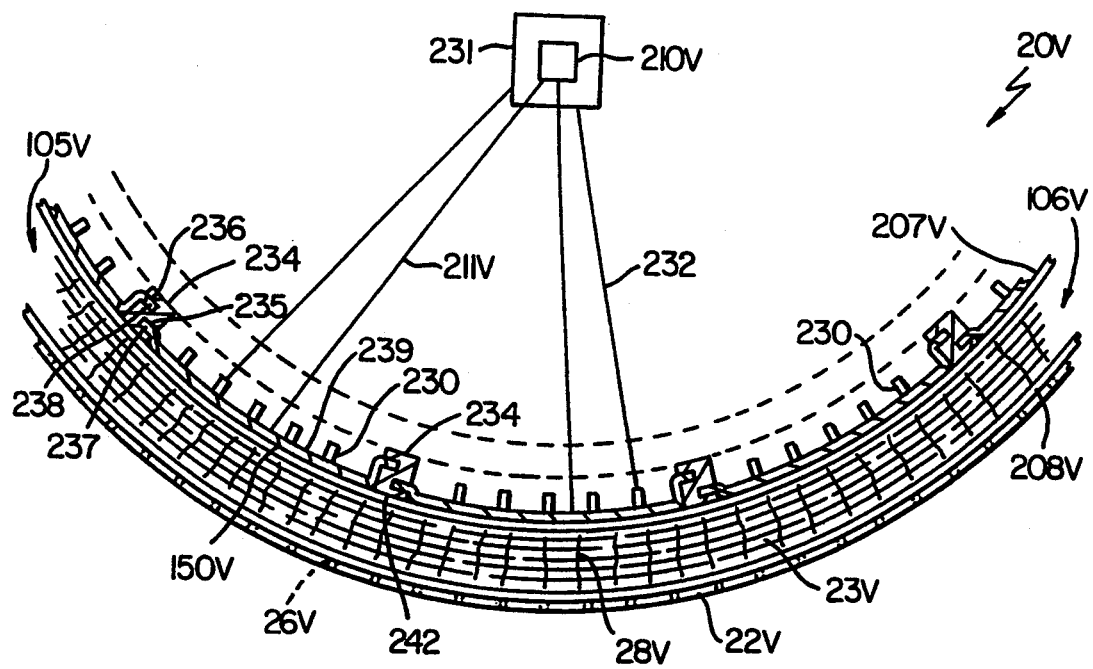
FIG. 36 is a fragmentary view similar to FIG. 31 and illustrates another apparatus and method of this invention.
Figure 37:
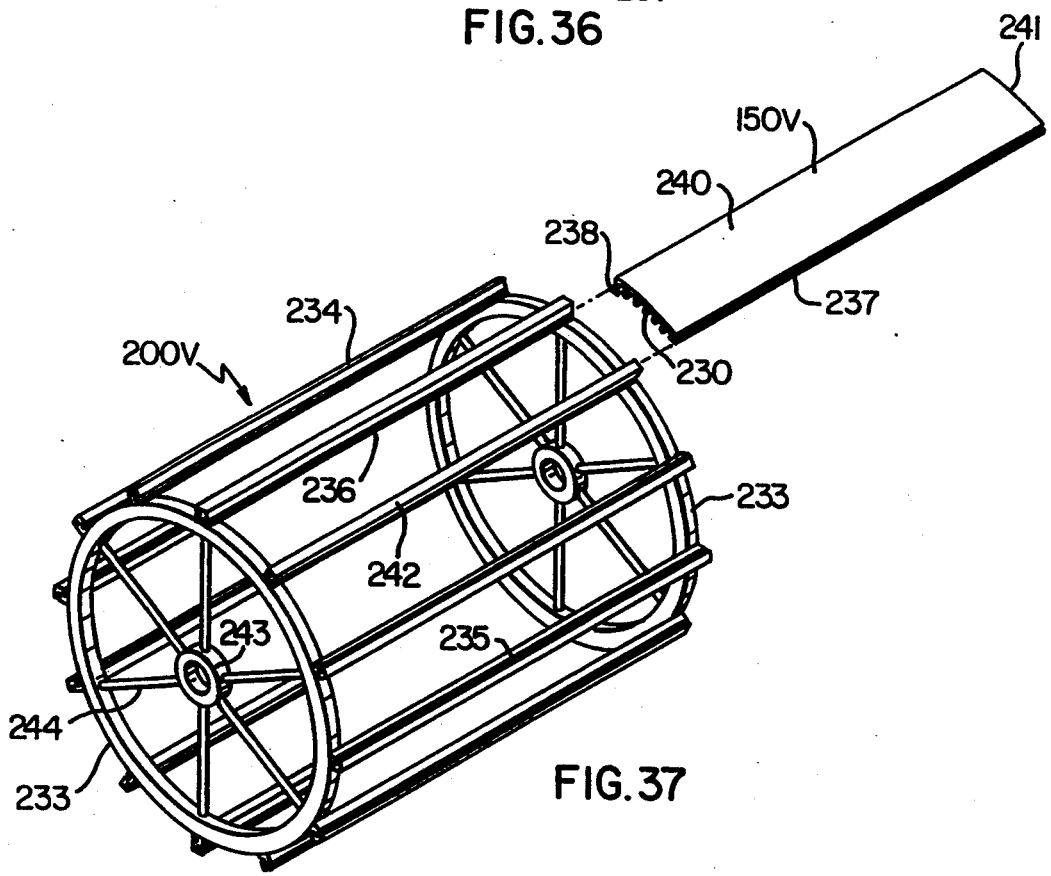
FIG. 37 is an exploded perspective view of a part of the apparatus of FIG. 36.

For example, one such method and apparatus of this invention is generally indicated by the reference numeral 20V in FIGS. 36 and 37 and the parts thereof that are similar to the parts of the methods and apparatus 20-20N and 20P-20U previously described will be indicated by like reference numerals followed by the reference letter "V".

As illustrated in FIG. 36, the method and apparatus 20V is similar to the method and apparatus 20R previously described except that the electrode plates 150V each has a plurality of sonic or ultrasonic transducers 230 secured thereto in rows thereof from one side thereof to the other side thereof in substantially the same manner that a plurality of sonic or ultrasonic transducers are secured to one side of a curved plate in the aforementioned PCT patent application No. WO 91/03309 whereby this published PCT patent application is being incorporated into this disclosure by this reference thereto.

Of course, the devices 230 could be arranged in any desired pattern on each electrode plate 150V, as desired.

The method and apparatus 20V has the previously described means 210V for creating the respective electrostatic field 28V for each electrode plate 150V and the cooperating portion of the electrode belt or means 22V and for changing the intensity of that electrostatic field 28V as that electrode plate 150V moves from the inlet means 105V to the outlet means 106V for the reasons previously set forth.

In addition, the method and apparatus 20V of this invention has means 231 interconnected to the devices 230 of each electrode plate 150V by means 232 so as to control the vibrational energy of each plate 150V independently of the plates 150V adjacent thereto so that the vibrational energy being imparted by each electrode plate 150V to the section of the liquid bearing material 23V adjacent thereto can be changed as that electrode plate 150V moves from the inlet means 105V to the outlet means 106V at the same time that the voltage between that electrode plate 150V and the cooperating portion of the electrode means 22V is being changed by the computer means 210V.

And it is to be understood that various areas of each electrode plate 150V can be vibrated at different frequencies and/or intensities than other portions thereof as each means 231 can have means that can control each device 230 on a particular electrode plate 150V independently of the control it has over all of the other devices 230 on that particular electrode plate 150V.

In any event, it can be seen that the intensity of the vibrational energy being applied to each section of the liquid bearing 23V can be changed in steps or infinitely as that section of material 23V moves from the inlet means 105V to the outlet means 106V with its adjacent electrode plate means 150V. For example, it may be found that by increasing the vibrational energy as well as simultaneously increasing the voltage on a particular section of material 23V as it moves from the inlet means 105V to the outlet means 106V will produce the greatest dewatering rate therefrom.

The method and apparatus 20V comprises a rotatable drum 200V formed of any suitable relatively rigid electrical insulating material, such as ceramic material, and comprises a pair of annular end frame members 233 held in axially aligned relation by elongated frame members 234 disposed in parallel spaced apart relation about the annular members 233 while being secured thereto in any suitable manner as illustrated in FIG. 37.

The frame members 234 have opposed slots 235 and 236 along the sides thereof to respectively receive bent side edge means 237 and 238 of the electrode plates 150V disposed on each side thereof whereby each plate 150V can be slipped into place to be carried by the drum 200V. Of course, suitable means (not shown) can be provided to hold the plates 150V in place once the plates 150V have been assembled to the drum 200V.

Thus, it can be seen that each electrode plate 150V is held by its side edge means 237 and 238 to permit the same to be readily vibrated by the devices 230 attached to the side 239 thereof and thereby impart vibrational energy by conduction into the material 23V adjacent thereto. However, if the belts 207V and 208V are used in the apparatus 20V in the same manner as the apparatus 20R, the belt 207V likewise will transfer the vibrational energy from the plates 150V to the material 23V adjacent thereto by conduction in a manner well known in the art.

Suitable liquid receiving means (not shown) can be utilized with the drum 200V to receive and then remove the liquid being removed from the liquid bearing material 23V and passing out of the openings 26V of the electrode belt 22V. For example, the liquid removing means of the aforementioned PCT patent application No. WO 91/03309, can be used and such structure can also be used to additionally apply vibrational energy by conduction through the belts 22V and 208V into the material 23V in combination with the electrode plates 150V of this invention.

Each electrode plate 150V of this invention has the side edge means 237 and 238 thereof bent in the L-shape thereof so that the outer surface 240 of the intermediate portion 241 thereof will be substantially flush with the top surfaces 242 of the adjacent frame members 234 that receive the side edge means 237 and 238 thereof, the intermediate portion 241 either being arcuate or curved, such as in the same manner that the vibratory plate in the aforementioned PCT patent application No. WO 91/03309, is bent into a curved shape, or being flat between the side edge means 237 and 238, as desired, so that the transducers 230 can be effectively secured to the side 239 thereof. Of course, the top surfaces 242 of the frame members 234 can be likewise flat or curved, as desired.

In any event, it can be seen that the resulting outer peripheral surface of the drum 200V is generally circular in cross section and the areas between the frame members 234 and the electrode plates 150V will be covered by the porous belt 107V.

As illustrated in FIG. 37, the drum can be rotatably mounted, such as by having coaxial central hub portions 243 held in the center of the annular frame members 233 by spoke means 244.

In order to minimize the number of rotary electrical connection means needed for the drum 200V of this invention, the units 210V and 231 and their respective interconnection means 211V and 232 can be carried inside the drum 200V so that only the source of electrical power need be electrically interconnected to the units 210V and 231 by any suitable rotary connection means in a manner well known in the art, such as by having a rotary means at one of the hubs 243. Of course, the annular ends 233 of the drum 200V and the adjacent end spacings between the adjacent ends of the frame members 234 can be suitably covered to enclose the units 210V and 231 in the drum 200V and seal the same from any liquid external thereto.

Also, in order to insure the necessary flexure of each plate 150V by the operation of the devices 230, the end edge means 237 and 238 thereof can be bent or fluted in an accordion manner in the legs thereof adjacent to the main body surface 240 thereof. And each electrode plate 150V can be formed of any suitable electrical conductive material, such as metallic material. For example, the electrode plates 150V can be formed of the metallic material as set forth in the aforementioned PCT patent application WO 91/03309 or as set forth in the aforementioned. European patent application, No. 0,286,714.

Because the plates 150V are carried by the drum 200V, vibrational energy can be imparted into the liquid bearing material 23V from the point on the drum 200V where the liquid bearing material is first introduced between the electrode belt means 22V and the drum 200V all the way to the point where the liquid bearing material 23V leaves the drum 200V. Thus, it can be seen that if the belts 22V, 207 and 208V, in effect, wrap 270° or a greater degree of the outer periphery of the drum 200V in a manner similar to such an arrangement in the aforementioned PCT patent application No. WO 91/03309, the vibrational energy can be imparted by the plates 150V into the liquid bearing material 23V throughout the entire 270° or a greater degree of wrap of the drum 200V. Also, during the time each plate 150V moves from the outlet means 106V to the inlet means 105V of the apparatus 20V, the devices 230 being carried thereby do not need to be operated by the means 231, if desired, nor have to have a charge imparted thereto by the means 210V, if desired.

While only two interconnection means 211V and 232 are respectively illustrated in FIG. 36 for each device 210V and 231, it is to be understood that there are more interconnection means 211V in the apparatus 20V so as to respectively lead from the device 210V to all of the plates 150V and, similarly, that there are more interconnection means 232 in the apparatus 20V so as to respectively lead from the device 231 to all of the devices 230 that are carried by all of the plates 150V.

In addition, it can be seen that the vibration of one of the electrode plates 150V by its device means 230 will not influence the vibrations of any of the other plates 150V because each plate 150V is vibrationally insulated from the other plates 150V by the frame members in the same manner that the frame members 234 electrically insulate each plate 150V from the other plates 150V.

Should it be desired to have projections carried by the plates 150V as provided by the projections 38S of FIG. 32, such projections can be disposed between the devices 230 and the belt 207V can be eliminated.

Since the operation of the method and apparatus 20V of this invention is substantially the same as the method and apparatus 20R previously described, a further description of the operation of the apparatus 20V is deemed unnecessary except to state that the electrode plates 150V each are adapted to serially or simultaneously change the voltage and vibratory effects produced thereby as that plate 150V moves from the inlet means 105V to the outlet means 106V and thereby enhance the liquid removed from the section of liquid bearing material 23V disposed adjacent thereto and moving therewith from the inlet means 105V to the outlet means 106V for the reasons previously set forth.

Also, the electrostatic field that is being produced by each electrode plate 150V could be pulsed at a desired rate at each particular voltage gradient thereof with its cooperating portion of the electrode means 22V so that the pulsing rate at each different voltage gradient produced by the electrode plate 150V as it moves from the inlet means 105V to the outlet means 106V would be the same or different as desired. Likewise or in lieu thereof, the vibrational action being provided by each electrode plate 150V on the section of liquid bearing material 23V adjacent thereto could be pulsed at any desired rate or changing rate so that for different vibrational intensities, different pulse rates for those different vibrational intensities could be provided.

It may also be found that when applying vibrational fields to a liquid bearing material that it would be desirable to provide a different vibrational intensity to the upper portion or to one side of a particular section of liquid bearing material than the vibrational intensity being applied to the lower part or to the other side of that particular section of liquid bearing material and that as that particular section of liquid bearing material is passing from the inlet to the outlet of the apparatus, that different vibrational intensity being applied to the top portion thereof and/or bottom portion thereof should be changed.

This feature can be accomplished by having the vibration imparting unit on one side of the liquid bearing material be operated differently than the vibrational field imparting unit on the other side of the liquid bearing material with such units being adapted to respectively change the vibrational intensity being imparted thereby to a particular section of liquid bearing material as that section of liquid bearing material moves from the inlet of the apparatus to the outlet thereof.

This feature permits the area where the two vibratory fields would initially and theoretically join with each other before overlapping each other in the cake of liquid bearing material at any one time to be changed so that such joining area could be moved to be more adjacent one electrode means than the other by merely changing the operation of one or both vibration producing units that are on opposite sides of the section of cake at that particular location in the dewatering apparatus. And such theoretical joining area of the two vibratory fields could be moved toward and away from each electrode means at an infinitely variable rate or at a stepped rate as desired whereby the total vibratory energy being utilized could be the same but the distribution of the energy would be changing from more on one side of the cake to more on the other side of the cake. Of course, the total vibratory energy could be increased as the particular section of the cake moves from the inlet to the outlet of the apparatus while the distribution of that energy on the particular section of cake is changed as that section of the cake moves from the inlet to the outlet.

For example, reference is again made to FIG. 28 and while it has been previously stated that the upper rollers 111P and/or the lower rollers 110P can have the vibrational energy imparted thereto be different than the rollers 111P and 110P adjacent thereto so that the vibrational field provided thereby to each section of the liquid bearing material 23P changes as that section of liquid bearing material 23P moves from the inlet means 105P to the outlet means 106P, the lower rollers 110P can each provide a different vibrational intensity to the liquid bearing material 23P than the vibrational intensity provided to the liquid bearing material 23P by the upper roller 111P opposite thereto so that optimum combined upper and lower vibratory actions will be provided on the particular section of liquid bearing material 23P passing therebetween. Thus, it may be found that at each location in the apparatus 20P between the inlet means 105P and 106P thereof, the upper part of the particular section of the liquid bearing material 23P should be vibrated at a different rate or intensity than the lower portion thereof. Therefore, by controlling the vibratory action of each roller 111P and 110P independently of the vibratory action of the other rollers 111P and 110P with suitable computer means (not shown), it is believed that a more enhanced liquid removal rate will be provided by the apparatus 20P than if all of the upper rollers 111P and all of the lower rollers 110P were vibrated at the same rate. Of course, it is to be understood that all of the upper rollers 111P could be vibrated at the same rate while all of the lower rollers 110P could be vibrated at the same rate that is different than the rate of vibration of the upper rollers 111P or that only certain ones of the upper rollers 111P and/or lower rollers 110P could be vibrated at a different rate than the rate of vibration of all of the other rollers 111P and 110P. It is also to be understood that the lower rollers 110P could be located so as to be between the upper rollers 111P in much the same manner that the rollers set forth in FIGS. 7 and 8 of the Candor U.S. Pat. No. 3,999,302 are arranged whereby this U.S. patent to Candor is being incorporated into this disclosure by this reference thereto.

And it is to be understood that the different rates of vibratory action of the upper rollers 111P and/or the lower rollers 110P could be pulsed and such pulsing could be at different rates between the inlet means 105P and the outlet means 106P of the apparatus 20P.

While a cooperating means for applying vibratory action to the cathode or electrode belt 22V of the apparatus 20V of FIG. 36 is not illustrated, it is to be understood that vibration imparting rollers could be disposed against the underside of the electrode belt 22V to cooperate with the electrode plates 150V to provide the aforementioned different arrangement of vibratory energy being imparted to the top portion and bottom portion of a particular section of liquid bearing material 23V passing from the inlet means 105V to the outlet means 106V in the same manner as previously described for the apparatus 20P.

It is believed that by applying such vibrational field action to both sides of the liquid bearing material as it passes from the inlet of the apparatus to the outlet thereof a thicker cake is permitted to be acted upon and/or a faster movement of the liquid bearing material through the apparatus is permitted than when the vibrational field is applied from only one side of the liquid bearing material. Also, less energy may be required as the vibrational field does not have to penetrate as far as when the vibrational field must go through the entire thickness of the cake.

Of course, the feature of applying vibrational fields to both sides of a liquid bearing material is well known in the art. For example, see the aforementioned Candor U.S. Pat. Nos. 3,931,682; 3,999,302 and 4,236,317. However, these patents do not provide for the unique feature of having different rates of vibratory action being applied to opposite points on the cake of liquid bearing material nor changing such different rates as the liquid bearing cake proceeds to move through the apparatus as provided by this invention.

While the apparatus and method 20V of FIGS. 36 and 37 have the vibration imparting devices 230 secured to the anode plates 150V so as to be carried in unison thereby, it is to be understood that vibration imparting devices can be utilized that impart their vibrational energy to the anode sections without being attached thereto and thereby without being movable in unison with the anode sections. In addition, while vibration imparting rollers, such as rollers 110R, are utilized to impart vibrational energy into the liquid bearing material by conduction through the engaged cathode belt 22R, it is to be understood that the vibrational energy being imparted by conduction through the cathode belt could be coupled thereto with liquid by utilizing the ultrasonic plate means of the aforementioned Senapati U.S. Pat. No. 5,114,560. In addition, it is believed that an ultrasonic plate means of this invention can comprise a vibratable unit having a plurality of vibratable sections thereof disposed in a serial manner respectively adjacent at least some of the sections of the liquid bearing material between the inlet means and the outlet means of the apparatus and have means generally vibrationally isolating the vibratable sections from each other so that each vibratable section can provide its own different vibratory field action to its respective adjacent section of the liquid bearing material in much the same manner that each anode section 150V of the apparatus and method 20V imparts its own vibratory field action that can be different from the vibratory field actions of the anode sections 150V disposed adjacent thereto for the reasons previously set forth.

Figure 38:
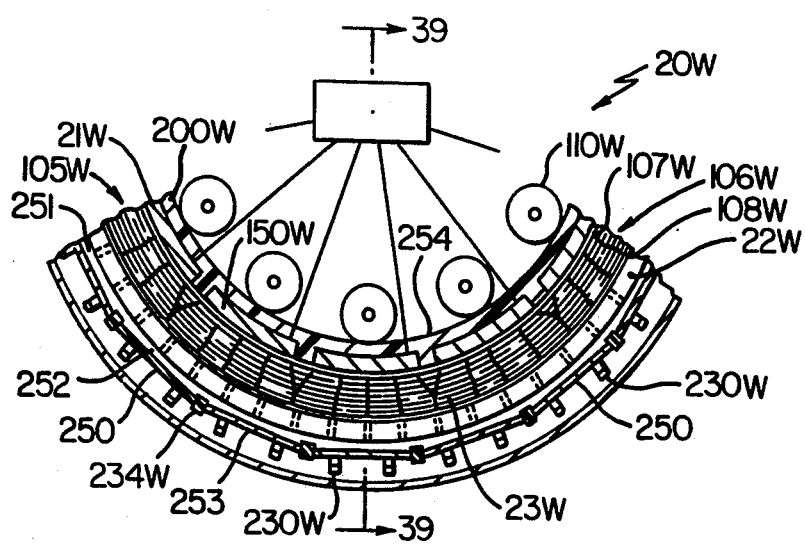
FIG. 38 is a fragmentary view similar to FIG. 31 and illustrates another apparatus and method of this invention.
Figure 39:
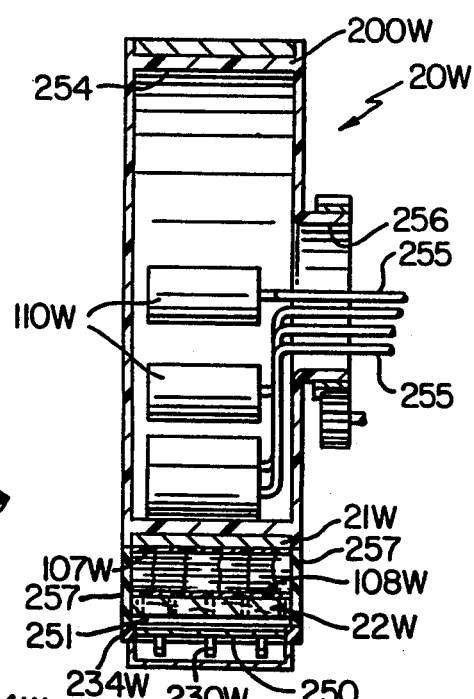
FIG. 39 is a fragmentary reduced cross-sectional view taken on line 39—39 of FIG. 38.
Figure 40:
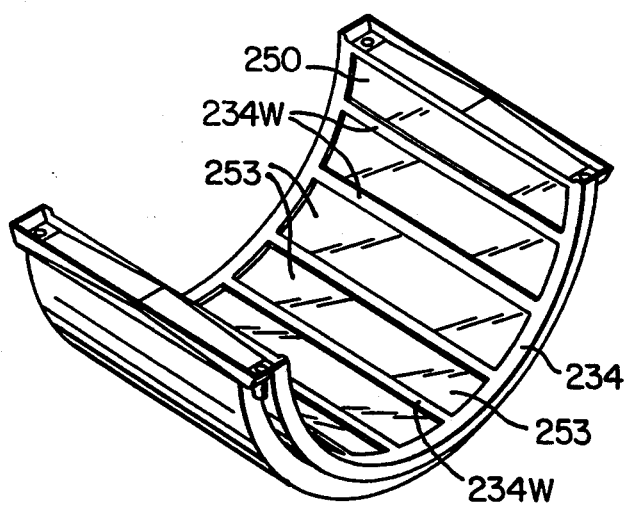
FIG. 40 is a perspective view of a vibratable unit of the apparatus and method of FIGS. 38 and 39.

For example, another apparatus and method of this invention is generally indicated by the reference numeral 20W in FIGS. 38–40 and parts thereof similar to the parts of the other apparatus and methods 20–20N and 20P–20V previously described are indicated by like reference numerals followed by the reference letter "W".

As illustrated in FIGS. 38–40, the apparatus and method 20W comprises an electrode means 21W that comprises a plurality of conductive anode sections 150W carried by the insulating drum means 200W in the same manner as the insulating drum means 200 of the apparatus and method 20R of FIG. 31 so that each section 150W is electrically insulated and vibrationally insulated from each other, the apparatus and method 20W including nonconductive and liquid permeable belt means 207W and 208W for carrying the liquid bearing material 23W therebetween and having a flexible conductive cathode belt 22W for moving in unison therewith as the drum member 200W is rotated in unison with the moving belts 207W, 208W and 22W as previously described for the apparatus and method 20R of FIG. 31.

However, instead of having the vibration imparting rollers 110R of the method and apparatus 20R of FIG. 31, a stationary plate means or unit 250 is disposed adjacent the cathode belt 22W but is spaced therefrom so as to define a chamber 251 therebetween that is filled with a liquid 252, such as the liquid that is being removed from the material 23W in a manner that is fully disclosed in the aforementioned Senapati et al U.S. Pat. No. 5,114,560 whereby this U.S. patent is also being incorporated into this disclosure by this reference thereto and appears to fully correspond to the aforementioned and previously incorporated PCT international application WO 91/03309.

However, the vibrational plate means or unit 250 of this invention is formed from a plurality of vibratable metallic sections 253 disposed in a serial manner from the inlet means 105W to the outlet means 106W of the apparatus 20W and being electrically and vibrationally isolated from each other by members 234W that can be constructed in a manner similar to the parts 234 of the apparatus 20V so as to permit ready assembly and disassembly of the plates 250 thereto and therefrom and also permit the plates 250 to vibrate relative to the stationary members 234W that can be fixed to any suitable stationary support means so as to hold the vibrational unit or plate means 250 in position relative to the drum means 200W as illustrated. In addition, each section 253 can carry one or more vibration imparting devices 230W in substantially the same manner and for the same reasons as the devices 230 for the plates 150V of the apparatus 20V previously described.

In this manner, each plate means or section 253 of the unit 250 can impart its vibrational energy into the section of the material 23W that is adjacent thereto at any one time through the coupling of the liquid 252 with the cathode belt 22W and, thus, through conduction through the belt 208W into the adjacent section of material 23W as set forth in the aforementioned Senapati et al U.S. Pat. No. 5,114,560 except that the unit 250 of this invention permits each section 253 of the unit 250 to provide a different vibratory field action to its respective adjacent section of the liquid bearing material 23W for the reasons previously set forth for the sections 150V of the drum 200V, each plate 253 being flat or arcuate as desired.

If it is desired to also provide vibrational energy to the plates 150W of the anode drum means 200W, a plurality of vibration imparting rollers 110W could be mounted in cantilevered fashion within the anode drum 200W so as to engage against an interior surface 254 of the drum member 200W so as to impart vibrational energy through the member 200W and the particular plate 150W being disposed adjacent that particular roller 110W at any particular time in the operation of the apparatus 20W and, thus, into the particular section of the liquid bearing material 23W that is disposed adjacent the section 150W at that time, FIG. 39 schematically illustrating how the rollers 110W can be cantilevered mounted by members 255 projecting through a central opening 256 in one side of the drum 200W so as to permit the rollers 110W to respectively rotate relative to the members 150W while the drum 200W rotates relative thereto.

Thus, it can be seen that the plates 150W of the anode electrode means 21W can be utilized not only for providing different electrostatic field actions to the adjacent sections of the liquid bearing material 23W for the reasons previously set forth in regard to the apparatus 20R, but also the rollers 110W can provide the same or different vibratory field actions imparted by those sections 150W into the moisture bearing material 23W for the same reasons as previously described for the sections 150V of the apparatus 20V.

Similarly, the plates or sections 253 of the vibratory unit 250 each can provide the same or different vibratory field actions being imposed upon the respective adjacent sections of the liquid bearing material 23W depending upon the operation of the particular devices 230W interconnected thereto for the reasons previously set forth in regards to the sections 150V of the apparatus 20V except that the sections 253 are disposed adjacent the cathode electrode means 22W and are coupled thereto by the liquid 252 as previously described.

If desired, the cathode belt 22W of the apparatus and method 20W of this invention can be eliminated and the vibratory unit 250 itself could act as the cathode as the individual plates or sections 253 thereof each could have the same or a different negative charge imposed thereon than the plates 253 adjacent thereto so as to cooperate with the plates 150W of the anode electrode 21W to provide the different electrostatic fields being created therebetween at any one time in the operation of the apparatus 20W for the reasons previously set forth as the members 253 are formed of conductive material, such as metallic material as desired. Of course, the sections 253 could merely be grounded and still cooperate with the plates 150W to provide the different electrostatic field actions, as desired. Also, the grounded or differently charged sections 253 could be used in combination with the cathode belt 22W that could be charged, grounded or even be electrically isolated so as to "float".

While FIG. 39 schematically illustrates stationary side sealing means 257 being carried by the vibratory unit 250 not only to seal the chamber 251, but to also seal the right and left sides of the liquid bearing material 23W to the anode drum 200W, it is to be understood that the two belts 107W and 108W would provide such right and left sealing by extending beyond the liquid bearing material 23W and engage together in stacked relation against the anode drum 200W at the right and left sides thereof and the vibratory unit 250 would have stationary sealing means engaging against the anode drum 200W all in the same manner as fully disclosed in FIG. 3 of the aforementioned Senapati et al U.S. Pat. No. 5,114,560. Also, it is to be understood that the anode drum 200W would be much wider than as schematically illustrated in FIG. 39.

As previously stated, the various apparatus and methods of this invention previously described can be utilized to merely reduce the liquid content of a liquid bearing material with the resulting dewatered product still being considered as being relatively liquid rather than relatively solid.

Thus, it can be seen that the various features of this invention are readily adaptable to be utilized singly or in various combinations thereof to uniquely modify crossflow filter apparatus and methods, such as the crossflow filter apparatus and methods set forth in the aforementioned Muralidhara U.S. Pat. Nos. 5,043,048 and 5,064,515, whereby these two patents are being incorporated into this disclosure by this reference thereto.

Figure 41:
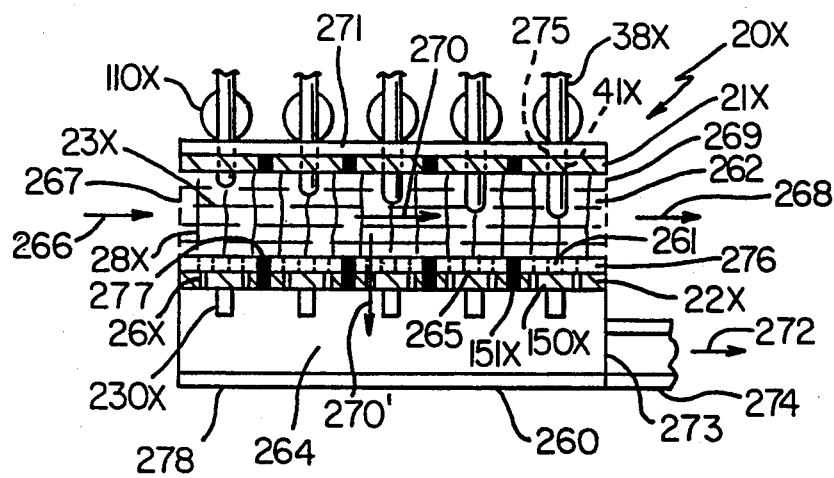
FIG. 41 is a schematic cross-sectional view of a new crossflow filter apparatus and method of this invention.
Figure 42:
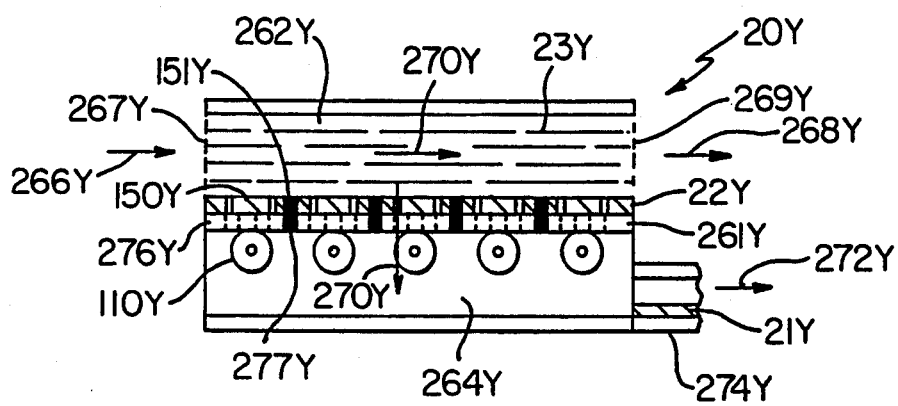
FIG. 42 is a view similar to FIG. 41 and illustrates another new crossflow filter apparatus and method of this invention.
Figure 43:
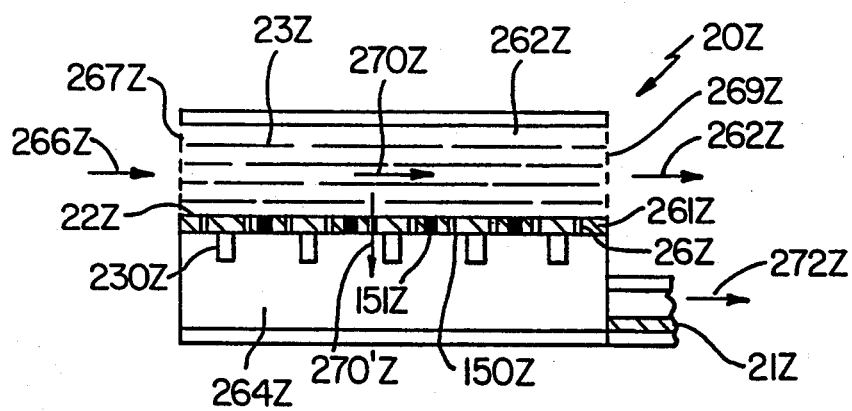
FIG. 43 is a view similar to FIG. 41 and illustrates another new crossflow filter apparatus and method of this invention.

Referring now to FIGS. 41, 42 and 43, such new crossflow filter apparatus and methods of this invention are respectively and generally indicated by reference numerals 20X, 20Y and 20Z.

The crossflow filter apparatus 20X of FIG. 41 has the parts thereof that are similar to the apparatus and methods 20–20N and 20P–20W previously described indicated by like reference numerals followed by the reference letter "X".

As illustrated in FIG. 41, the crossflow filter apparatus 20X of this invention comprises a housing means 260 having a filter 261 disposed therein and defining a crossflow chamber 262 on the side 263 of the filter 261 and a filtrate chamber 264 on the side 265 thereof. An electrode means 22X is disposed in the filtrate chamber 264 against the side 265 of the filter 261 for creating an electrostatic field arrangement 28X across the crossflow chamber 262 that enhances the flow of liquid from liquid bearing material 23X disposed in the crossflow chamber 262 through the filter 261 into the filtrate chamber 264 all generally in a manner well known in the art.

The apparatus 20X has means 266 for supplying the liquid bearing material 23X under pressure through one end 267 of the crossflow chamber 262 and means 268 at the other end 269 of the crossflow chamber 262 for removing the liquid bearing material 23X from the crossflow chamber 262 that has been depleted of at least some of the liquid thereof as the liquid bearing material 23X passes through the crossflow chamber 262 as represented by the arrow 270 in FIG. 41 while the arrow 270' thereof represents the flow of removed liquid passing through the filter 261 and electrode means 22X into the filtrate chamber 264.

Another or counter electrode means 21X is disposed in the crossflow chamber 262 of the apparatus 20X against an external or boundary wall 271 of the housing means 260 to cooperate with the electrode means 22X in forming the electrostatic field arrangement 28X in a manner hereinafter set forth.

The filtrate chamber 264 has means 272 for removing filtrate from the filtrate chamber 264 out of an end 273 thereof and into a conduit means 274 for conveying the filtrate away from the apparatus 20X for any desired purpose.

While normally the filter 261 is one continuous flat piece or sheet between the ends 267 and 269 of the crossflow chamber 262, the electrode means 22X of this invention comprises a plurality of conductive sections 150X electrically and vibrationally separated from each other by insulating means 151X in the manner previously described so as to permit each section 150X to be given a different charge that produces a different intensity than the charge of each section 150X adjacent thereto all for the reasons previously set forth whereby it can be seen that as each section of the liquid bearing material 23X moves from the end 267 to the end 269 of the crossflow chamber 262 that section of liquid bearing material 23X serially has electrostatic fields act thereon that are different from each other and such electrostatic fields can increase in intensity as that section of liquid bearing material 23X moves from the inlet end 267 to the outlet end 269 of the crossflow chamber 262 so as to increase the amount of influence thereof that acts on the charged particles in the liquid bearing material 23X to move the same toward the electrode means 21X and thereby prevent those particles from fouling of the filter 261 so that a greater amount of liquid can move through the filter 261 into the filtrate chamber 264. Of course, the conductive sections 150X of the electrode 22X are provided with a plurality of passages 26X therethrough for such passage of the liquid into the filtrate chamber 264.

While the electrode 21X can be a continuous conductive structure between the ends 267 and 269 of the crossflow chamber 262, the same can also be formed of a plurality of conductive sections 150X separated from each other by electrically insulating and vibrationally insulating material 151X as illustrated. In this manner, each conductive section 150X of the electrode 21X can be given a charge with a different intensity than the charge of each section 150X adjacent thereto so that the cooperating pair of electrode sections 150X of the electrode means 21X and 22X can have charges thereon of opposite potential to form a portion of the electrostatic field 28X therebetween which has an intensity different than the portion of the electrostatic field 28X that is adjacent thereto and being provided by the next adjacent pair of conductive sections 150X of the electrode means 21X and 22X all in the manner previously described.

Should it be desired to utilize projections through the electrode means 21X, in the manner previously described, for the crossflow filter apparatus 20X of this invention, such projections 38X can project through suitable openings 41X formed through the electrode sections 150X as well as through suitably aligned openings 275 formed through the wall 271 of the housing means 260 and such projections 38X can be disposed so as to project further into the crossflow chamber 262 the closer the projections 38X are to the end 269 thereof as illustrated in FIG. 41, such projections 38X being conductive and having charges respectively imposed thereon all for the reasons previously set forth and need not be further described. Of course, such projections 38X can be moved or adjusted in the degree of projection thereof into the crossflow chamber 262 during the liquid removal operation, as desired.

In addition, should it be desired to provide vibrational energy into the crossflow chamber 262 of the crossflow filter apparatus 20X of this invention, vibration imparting rollers 110X can be disposed against the wall 271 of the housing means 260 and be in aligned relation with the conductive sections 150X of the electrode means 21X to impart vibrational energy through the wall 271 to the conductive sections 150X which will, in turn, transmit such vibrational energy by conduction into the liquid bearing material 23X in the crossflow chamber 262. Of course, such rollers 110X can each impart vibrational energy of a different intensity than a roller 110X adjacent thereto so that each section of liquid bearing material 23X that passes from the end 267 to the end 269 of the crossflow chamber 262 will serially have a different vibrational energy being imposed thereon all for the reasons previously set forth.

If desired, the sections 150X of the electrode 22X can also be vibrated so as to impart vibrational energy into the liquid bearing material 23X disposed in the crossflow chamber 26X and such vibrational energy can be provided by transducers 230X secured to the conductive sections 150X on the side thereof that faces the filtrate chamber 264 as illustrated. If the material of the filter 261 is relatively flexible then the filter 261 can be a continuous member between the ends 267 and 269 of the housing means 260 but if the same is formed of a more rigid material, such as ceramic material, the same can be provided with individual sections 276 that correspond in width to the conductive sections 150X of the electrode 22X and be separated from an adjacent section 276 by vibrationally insulating material 277 so that each conductive section 150X of the electrode means 22X can impart a vibrational energy that has a different intensity into the liquid bearing material 23X than the intensity of the vibrational field being imparted thereto by the next adjacent section 150X of the electrode means 22X all for the reasons previously set forth.

Therefore, it is believed that during the operation of the crossflow filter apparatus 20X previously described, liquid from the liquid bearing material 23X will be forced to move through the filter 261 into the filtrate chamber 264 as each section of liquid bearing material 23X moves from the end 267 of the crossflow chamber 262 to the end 269 thereof all for the reasons fully set forth in the last two aforementioned U.S. patents to Muralidhara and that the liquid removal will be further enchanced by forming the electrode means 22X of conductive sections 150X electrically insulated from each other by the electrically insulating material 151X so that the electrostatic field arrangement 28X being provided between the electrode means 22X and 21X can comprise a series of electrostatic fields that are different in intensity between the ends 267 and 269 of the crossflow chamber 262 all for the reasons previously set forth in regards to the teachings of this invention. In addition, it is also believed that providing vibrational energy into the crossflow chamber 262 will enhance such liquid removing operation all for the reasons previously set forth. Likewise, it is believed that by introducing the projections 38X into the crossflow chamber 262 a further enhancement in the liquid removal operation will take place all for the reasons previously set forth concerning the projections of this invention.

While the crossflow filter apparatus 20X previously described for FIG. 41 has the electrode means 22X disposed against the filter 261, it is to be understood that the electrode means 22X can be disposed anywhere in the filtrate chamber 264 and the same could be disposed against an outer wall means 278 of the housing means 260, if desired.

In any event, the crossflow filter apparatus 20X illustrated in FIG. 41 is of the conventional arrangement wherein one electrode means is disposed in the filtrate chamber and another electrode is disposed in the crossflow chamber and is spaced from the filter thereof.

In such conventional crossflow filter apparatus, the electrode that is disposed in the filtrate chamber is given a charge of a potential that is the same as the potential of the charge on the solid particles of the liquid bearing material that is to pass through the crossflow chamber while the electrode that is disposed in the crossflow chamber is given a charge that has a potential that is opposite to the potential of the charge on the solid particles in the crossflow chamber so that such particles will tend to move away from the filter by the electrostatic forces of attraction and repelling and thereby prevent fouling thereof.

However, as set forth in the aforementioned last two patents to Muralidhara, an electrode can be disposed in the crossflow chamber and be given a charge that is the same potential as the potential of the charge on the solid particles in the crossflow chamber if that electrode is disposed against the filter. And it is a feature of this invention to incorporate one or more of the unique features of this invention in such a crossflow filter apparatus.

For example, reference is now made to FIG. 42 wherein the crossflow filter apparatus and method 20Y of this invention is illustrated and the parts thereof that are similar to the parts of the methods and apparatus 20–20N and 20P–20X previously set forth are given like reference numerals followed by the reference letter "Y".

As illustrated in FIG. 42, an electrode means 22Y, similar to the electrode 22X, is disposed against the side of the filter 261Y that faces the crossflow chamber 262Y and the counterelectrode 21Y can be disposed anywhere in the filtrate chamber 264Y or be completely remote from the filtrate chamber 264Y as represented by the electrode 21Y in FIG. 42 which is disposed in the outlet conduit 274Y.

The filter 261Y can be a continuous filter if the same is formed of relatively flexible material but if the same is formed of relatively hard or rigid material, the filter 261Y can comprise a plurality of sections 276Y separated from each other by vibrational energy isolating material 277Y with each section 276Y corresponding to a conductive section 150Y of the electrode 22Y that is separated from adjacent sections by electrically insulating and vibrationally insulating material 151Y all for the reasons previously set forth.

In this manner, suitable vibrational imparting rollers 110Y can be disposed against the sections 276Y of the filter 261Y to impart vibrational energy into the crossflow chamber 262Y to act on the liquid bearing material 23Y passing through the crossflow chamber 262Y from the end 267Y thereof to the end 269Y thereof all for the reasons previously set forth whereby not only does the electrode means 22Y which is given a charge that has a potential that is the same potential as the charge on the solid particles in the liquid bearing material 23Y provide an electrostatic field arrangement 28Y throughout the crossflow chamber 262Y that has a series of electrostatic fields of different intensities for the reasons previously set forth, but also the rollers 110Y can provide vibrational energy into the crossflow chamber 262Y of different intensities for the reasons previously set forth.

Of course, as set forth in the aforementioned last two patents to Muralidhara, the filter in a crossflow filter apparatus can be conductive itself and thereby be given a charge which has a potential that is the same as the potential of the charge of the solid particles in the liquid bearing material that flows through the crossflow chamber while the counterelectrode can be disposed in the filtrate chamber or be disposed completely remote therefrom if desired.

Accordingly, it is another feature of this invention to modify such a crossflow filter apparatus and reference is now made to FIG. 43 wherein such a crossflow filter apparatus and method 20Z has the parts thereof that are similar to the parts of the method and apparatus 20–20N and 20P–20Y previously described given like reference numerals followed by the reference letter "Z".

As illustrated in FIG. 43, it can be seen that the filter 261Z is formed of relatively rigid conductive material and is formed in a plurality of sections 150Z separated from each other by electrically and vibrationally energy insulating material 151Z so as to provide not only electrostatic fields across the crossflow chamber 262Z of different intensities but also to provide vibrational fields across the crossflow chamber 262Z of different intensities as transducers 230Z can be secured to the sections 150Z of the filter 261Z as illustrated.

Therefore, it can be seen that the crossflow filter apparatus and method 20Z of this invention functions in the same manner as the crossflow filter apparatus and method 20Y previously described except that the filter 261Z and electrode means 22Z are the same part.

While the crossflow filter apparatus 20X, 20Y and 20Z of this invention are each illustrated as being of a particular type, it is to be understood that the various features of this invention can be utilized to form other types of crossflow apparatus, such as in cylinder form as provided in the aforementioned last two patents to Muralidhara.

It may be found that when utilizing the projections of this invention, such as the projections 38, as previously described, the projections might actually enhance the electro-osmotic flow of liquid that is being created in the capillaries or passages of the liquid bearing material 23 between the main electrodes 21 and 22 for the reasons advanced in the Herrick et al U.S. Pat. No. 5,282,942, and the Blanchard et al U.S. Pat. No. 5,151,164, whereby these two U.S. patents are being incorporated into this disclosure by this reference thereto.

In particular, the Herrick et al U.S. Pat. No. 5,282,942 discloses that if a conductive member is disposed along a capillary and outside of the liquid column in the capillary with an electrical charge being applied to that conductive member, an external electric field will be created across the capillary to modify the electro-osmosis flow of liquid in the capillary and that the electro-osmosis flow of liquid in the capillary can be substantially reduced or suppressed or caused to flow in either direction at varying speed along the capillary depending on the influence (magnitude and polarity) of the external electric field. The Herrick et al U.S. Pat. No. 5,282,942 further discloses that the conductive member that is adjacent the liquid column in the capillary can be out of electrical contact with that liquid and can be various distances relative thereto. In addition, the Herrick et al U.S. Pat. No. 5,282,942 discloses that the conductive member can be provided with a static charge or can have an electrical current continuously passed therethrough and in either situation, the resulting electric field produced by the conductive member will influence the electro-osmotic flow of liquid in the capillary that is adjacent thereto.

Accordingly, it is believed that such features to improve the electro-osmotic flow of the liquid in the capillaries of the liquid bearing material of this invention can be enhanced for the reasons fully set forth in the aforementioned Herrick et al U.S. Pat. No. 5,282,942 because it can be seen, for example, that the projections 38 of this invention will be disposed adjacent the capillaries or columns of liquid between the main electrodes 21 and 22 and can have the charge imposed thereon of the proper magnitude and polarity to enhance the electro-osmotic flow of liquid through the capillaries or columns of liquid adjacent thereto that is created by the main electrostatic field or electric field between the main electrodes 21 and 22.

As previously stated, it may be found that it is desirable to completely electrically insulate the projections of this invention from the liquid bearing material and in the embodiments illustrated in FIGS. 7, 8, 14, 15, 16 and 20, the projections are insulated from the main electrodes. Thus, it should be understood that, if desired, each projection of this invention could not only be insulated from the liquid bearing material but could also be insulated from the main electrodes.

For example, another apparatus and method of this invention is generally indicated by the reference numeral 20AA in FIG. 44 and parts thereof that are similar to the parts of the other apparatus and methods of this invention are indicated by like reference numerals followed by the reference letters "AA".

As illustrated in FIG. 44, it can be seen that the liquid bearing material 23AA is disposed between the main electrodes 21AA and 22AA in the manner previously described while the conductive member 280 of each projection 38AA has electrical insulating material 59AA completely covering the same so that when the projection 38AA is pushed into the liquid bearing material 23AA the conductive member 280 of the projection 38AA is electrically insulated therefrom and can be given a charge of the desired magnitude and polarity by a suitable charging means 43AA interconnected to the conductive member 280 of the projection 38AA by lead means 44AA in any of the manners previously set forth, such as for providing a steady, varying, pulsing or intermittent charge on the conductive member 280 of the projection 38AA as desired.

However, should it be desired to have an electrical current flowing through a conductive member of a projection of this invention, the apparatus and method of this invention that is generally indicated by the reference numeral 20BB of FIG. 45 can be utilized, the parts of the apparatus and method 20BB of FIG. 45 that are similar to the parts of the other apparatus and methods of this invention being indicated by like reference numerals followed by the reference letters "BB".

Referring now to FIG. 45, it can be seen that each projection 38BB of this invention is adapted to be disposed through respective openings 41BB in the electrodes 21BB and 22BB so as to completely span the liquid bearing material 23BB disposed therebetween, each projection 38BB having the conductive member 280BB thereof completely covered by the insulating material 59BB and extending throughout the entire length thereof that spans the space between electrodes 21BB and 22BB while having opposed ends 283 and 284 respectively electrically interconnected to leads 285 and 286 which are respectively interconnected to opposite sides of an electrical power source 27BB so as to provide a flow of electrical current through the conductor 280BB when an electrical switch means 287 in the lead 286 is closed or to merely provide a static charge on the conductor 280BB when the switch means 287 is open as illustrated by dotted lines in FIG. 45.

Therefore, it can be seen that the electric field produced by the conductive member 280BB of the projection 38BB can be an electric field that is created by current flowing through the conductor 280BB or that is created by having a static charge on the conductor 280BB, depending on whether the switch means 287 is closed or open, the particular electric field enhancing the electro-osmotic flow of fluid through the capillaries of the material 23BB that is created by the main electric field 28BB created between the electrodes 21BB and 22BB for the reasons previously set forth and for the reasons set forth in the aforementioned Herrick et al U.S. Pat. No. 5,282,942.

While the conductor 280BB of the projection 38BB of the apparatus 20BB extends completely between the electrodes 21BB and 22BB, it is to be understood that the conductor could be a short conductor while the remainder of the projection is formed of electrically insulating material so that the short conductor can be positioned anywhere between the main electrodes 21BB and 22BB as desired or can be moved therebetween during the dewatering operation as desired.

For example, another method and apparatus of this invention is generally indicated by the reference numeral 20CC in FIG. 46 and parts thereof similar to the parts of the other apparatus and methods of this invention are indicated by like reference numerals followed by the reference letters "CC".

As illustrated in FIG. 46, the projection 38CC that extends through the openings 41CC of the electrodes 21CC and 22CC is formed of the electrical insulating material 59CC and has a short conductive member 280CC completely embedded therein with its opposed ends 283CC and 284CC respectively electrically interconnected to the leads 285CC and 286CC that are interconnected to opposite sides of the electrical power source 27CC.

In this manner, the projection 38CC can be moved relative to the electrodes 21CC and 22CC to position the conductor 280CC in any desired location or to continuously or intermittently move the same between the electrodes 21CC and 22CC as desired, the conductor 280CC having electrical current flowing therethrough if the switch means 287CC is closed or merely having a static charge imposed thereon by the power source 27CC if the electrical switch 287CC is open as illustrated by dotted lines in FIG. 46.

Therefore, it can be seen that the apparatus and methods 20AA, 20BB and 20CC maintain the conductive member of the particular projection 38AA, 38BB or 38CC out of electrical contact with the liquid bearing material 23AA, 23BB or 23CC and are being utilized to enhance the electro-osmotic flow of liquid between the main electrodes 21BB, 22BB; 21AA, 22AA and 21CC, 22CC for the reasons fully set forth in the aforementioned Herrick et al U.S. Pat. No. 5,282,942.

However, it is to be understood that the projections 38AA, 38BB and 38CC can be utilized to also retard or suppress the electro-osmotic flow of liquid or to maintain the same at zero or perhaps even reverse the electro-osmotic flow of liquid as desired also for the reasons fully set forth in the aforementioned Herrick et al U.S. Pat. No. 5,282,942.

While the openings 41BB and 41CC in FIGS. 45 and 46 have insulated linings 42BB and 42CC therein, it is to be understood that the openings 41BB and 41CC could be unlined in the same manner as the openings 41AA of FIG. 44 if desired.

As previously stated, while the various embodiments of the apparatus and method of this invention previously described are each acting on liquid bearing material that is brought to the apparatus and method, it is to be understood that the apparatus and method of this invention could be brought to the liquid bearing material, such as to the site of the liquid bearing material.

For example, it is well known that electrodes have been inserted into the ground or soil so as to act on a portion of that ground or soil that is disposed between the electrodes. For example, see the aforementioned Kim U.S. Pat. No. 5,098,538 whereby this U.S. patent is being incorporated into this disclosure by this reference thereto.

While there are many U.S. patents that disclose the use of electro-osmosis for moving at least some of the liquid in the liquid bearing material which comprises ground or soil, three such U.S. patents comprise the Probstein et al U.S. Pat. No. 5,074,986; the Acar et al U.S. Pat. No. 5,137,608 and the Bibler U.S. Pat. No. 5,190,628 whereby these three U.S. patents are also being incorporated into this disclosure by this reference thereto.

Thus, another method and apparatus of this invention is generally indicated by the reference numeral 20DD in FIGS. 47 and 48 and parts thereof that are similar to the parts of the apparatus and methods of this invention previously described are indicated by like reference numerals followed by the reference letters "DD".

As illustrated in FIGS. 47 and 48, the method and apparatus 20DD of this invention is brought to the site of the liquid bearing material 23DD which in the embodiment illustrated in FIGS. 47 and 48 comprises an existing location of soil or ground 290 which has a top surface means 291.

The apparatus and method 20DD comprises a pair of electrode means 21DD and 22DD having at least portions 292 thereof inserted into the ground 290 below the top surface 291 thereof so as to have a portion or section 293 of the ground or soil 290 disposed therebetween and on which an electrostatic field 28DD acts when the electrodes 21DD and 22DD are interconnected to opposite poles of a means 27DD for creating the electrostatic field or electric field 28DD between the electrodes 21DD and 22DD as the means 27DD is respectively electrically interconnected to the electrodes 21DD and 22DD by lead means 285DD and 286DD.

Thus, if there is any liquid contained in the soil or ground 290, the same will tend to move toward one of the electrode means 21DD or 22DD by electro-osmosis in a direction dependent upon the main ionic charge carried by the soil or ground 290 as is well known in the art, FIGS. 47 and 48 typically illustrating that the electro-osmotic flow of liquid is in the direction of the arrows 294 which are toward the cathode 22DD.

If desired, the electrode means 21DD and 22DD of the apparatus and method 20DD of this invention can have movable projections 38DD carried thereby with the projections 38DD being movable through opening means 41DD in any of the manners previously described as well as for any of the reasons previously described.

The apparatus and method 20DD of this invention includes means for vibrating the section 293 of the ground or soil 290 disposed between the portions 292 of the electrode means 21DD and 22DD and such means comprise members 295 having portions 296' thereof inserted into the ground 290 below the top surface 291 and being disposed so as to act on the section 293 of the soil or ground 290 when the members 295 are sonically or ultrasonically vibrated in a manner well known in the art. For example, see the aforementioned Kim et al U.S. Pat. No. 5,098,538 which discloses a plurality of vibratable members inserted into the soil or ground to act at the same time that an electrostatic field is acting on the liquid in the liquid bearing ground or soil.

However, it can be seen that the members 295 of this invention are arranged in four rows 296, 297, 298 and 299 with the rows 296-299 being spaced apart and in series between the electrode means 21DD and 22DD while the members 295 in each row 296-299 are disposed spaced from the members 295 of that particular row.

It is believed according to the teachings of this invention that by vibrating the members 295 at different intensities and/or frequencies, different vibratory fields will be applied to different parts of the section 293 as the liquid thereof is moving from one electrode means toward the other electrode means by the electrostatic field 28DD so as to enhance the movement of such liquid.

Thus, by computer controlling the vibratory intensity and/or frequency of the individual members 295, a plurality of different vibratory field actions can be simultaneously imposed on the section 293 of ground 290 in series between the portions 293 of the electrode means 21DD and 22DD as at least some of the liquid of the section 293 is being moved between the portions 293 of the electrode means 21DD and 22DD by the electrostatic field 28DD all for the reasons previously set forth.

In addition, it may be found that it is desirable to operate the members 295 in a certain sequence between the electrode means 21DD and 22DD as the liquid is being moved so that, in effect, vibratory fields are pushing the moving liquid toward the attracting electrode means.

If desired, the members 295 of the rows 296-299 can be arranged so as to provide a plurality of rows 300, 301, 302, 303 and 304 between the electrode means 21DD and 22DD as illustrated in FIG. 48, the rows 300-304 being transverse to the rows 296-299.

Also, if desired, the electrode means 21DD and 22DD can be sonically or ultrasonically vibrated by means 305 engaged thereagainst to likewise impose a vibratory field into the section 293 of the soil 290 at the same time that the electrostatic field 28DD is creating an electro-osmotic flow of liquid between the electrodes 21DD and 22DD.

Referring again to FIGS. 34 and 35 wherein a frame plate filter press method and apparatus of this invention is generally indicated by the reference numeral 20U, it may be found that it is desired to have the lower sections 150U of the electrode means 21U and 22U provide an increased voltage therebetween over the voltage provided between the top sections 150U of the electrodes 21U and 22U and such increased voltage provided by the lower sections 150U of the electrodes 21U and 22U could be for the same time period that the upper sections 150U have a voltage or potential differential being created across the same. In fact, it may be found that the potential differential between the upper sections 150U of the electrodes 21U and 22U should be reduced to zero after a certain time period while the voltage differential is still being applied between the lower sections 150U of the electrodes 21U and 22U.

It is also believed that the flexible diaphragm 218 that is expanded toward the electrode means 22U as illustrated in FIG. 35 can itself provide the insulation means 204U between the electrode sections 150U of the electrode means 21U of the frame plate apparatus and method 20U of this invention.

Figure 49:
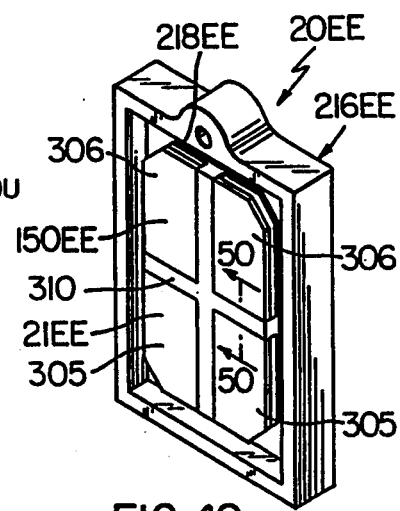
FIG. 49 is a reduced perspective view of a new frame plate of a new frame plate press apparatus and method of this invention that is similar to the method and apparatus of FIGS. 34 and 35.
Figure 50:
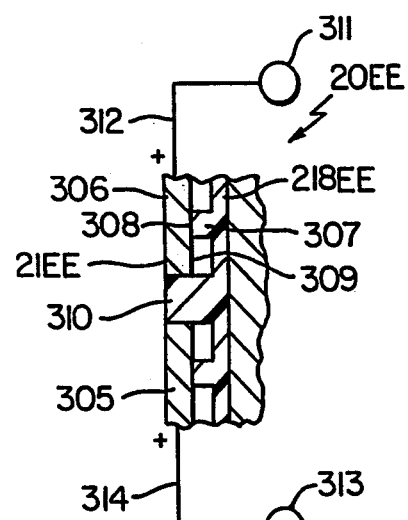
FIG. 50 is an enlarged fragmentary cross-sectional view taken on line 50—50 of FIG. 49.

In particular, reference is now made to FIGS. 49 and 50 wherein another apparatus and method of this invention is generally indicated by the reference numeral 20EE and parts thereof similar to the parts of other apparatus and methods of this invention are indicated by like reference numerals followed by the reference letters "EE".

As illustrated in FIGS. 49 and 50, only one frame plate 216EE of the frame plate apparatus and method 20EE of this invention is illustrated and such frame plate 216EE has the flexible diaphragm 218EE that is to be expanded outwardly relative to the frame plate 216EE in the manner previously described for the frame plate 216 that is disclosed in the right-hand portion of FIGS. 34 and 35.

In addition, the frame plate 216EE of this invention is generally similar to the active frame plates disclosed in the Kondo et al U.S. Pat. Nos. 5,034,111 and 5,092,974, whereby these two U.S. patents are being incorporated into this disclosure by this reference thereto.

The diaphragm 218EE of the frame plate 216EE carries a plurality of electrode sections 150EE that form the electrode means 21EE that is to cooperate with electrode means on an adjacent frame plate in the same manner as the left-hand frame plate 216 illustrated in FIGS. 34 and 35 and therefore need not be disclosed.

However, the frame plate sections 150EE of the electrode means 21EE comprise two spaced apart lower sections 305 and two spaced apart upper sections 306 so that the upper sections 306 not only are separated from each other but also are separated from the lower sections 305 which are separated from each other as illustrated.

The flexible diaphragm 21BEE is formed of electrically insulating material and has a plurality of projections 307 thereon which have substantially flat external sides 308 against which the cooperating sides 309 of the electrode sections 150EE engage in the manner illustrated in FIG. 15 and as set forth in the two aforementioned U.S. patents to Kondo et al.

However, in accordance with the teachings of this invention, the flexible diaphragm 218EE has an integral projection 310 that extends throughout the width thereof to separate the upper electrode sections 306 from the bottom electrode sections 305 as illustrated in FIGS. 49 and 50 for the same reasons that the insulation means 204U separates the electrode sections 150U of the frame plate apparatus 20U previously described.

In this manner, the upper electrode sections 306 can be given a charge that is different than the charge of the electrode sections 305 at any one time, such as by the means 311 of FIG. 50 being electrically interconnected to the upper sections 306 by the lead means 312 and a different charging means 313 being electrically interconnected to the lower sections 305 by the lead means 314 whereby the frame plate apparatus 20EE can be operated with the upper and lower sections 306 and 305 either having the same charge thereon or having different charges at any one time during the operation of the frame plate apparatus 20EE for the same reasons as set forth in regards to the apparatus 20U previously described.

While not illustrated, it is to be understood that the frame plate apparatus and method 20EE can have the plates vibrated and/or can have movable projections also for the reasons previously set forth.

Also, it is to be understood that the flexible diaphragm 218EE can have an integral projection similar to the projection 310 disposed between the upper pair of electrode plates 306 to insulate adjacent edges thereof from each other and can have an integral projection similar to the projection 310 disposed between the lower pair of electrode plates 305 for the same reason. In fact, it may be found that it is desired to have the flexible diaphragm 218EE provide a projection completely around the entire peripheral side edge means of each electrode plate 305 and 306 whereby, in effect, each electrode section 305 or 306 would be received in a similarly shaped pocket or recess in the flexible diaphragm 218EE. And while the projection 310 has been illustrated and described as having the outer surface thereof flush with the outer surfaces of the electrode sections 305 and 306, it is to be understood that the projection 310 can extend outwardly from the outer surfaces of the electrode sections 305 and 306 any desired distances for the same reasons the projections 204S extended beyond the electrode sections 150S of FIG. 32.

Thus, it can be seen that the electrically insulating material 204U of FIGS. 34 and 35 can be integral and one-piece with the flexible diaphragm 218 and be flush with the outer surfaces of the electrode sections 150U or extend beyond the same, as desired.

Since the projection 310, whether extended or flush, has the outer surface thereof providing some of the compressing action on the liquid bearing material, it may be found that such projection, as well as any of the other insulating parts similar thereto, will need to be reinforced and such reinforcing can take place in any suitable manner, such as by embedding a non-conductive (or conductive) member or members in the projection for this purpose.

In addition, it is to be understood that while each embodiment of this invention as represented respectively by the reference numerals 20–20N, 20P–20Z and 20AA–20EE has been illustrated and described as having certain structure and operating in a certain manner, each embodiment of this invention can be modified by including or substituting one or more structural and/or operational features of any one or more of the other embodiments of this invention therein even though such modification has not been actually described.

It is also to be understood that while the terms "dewater", etc., have been previously used throughout this description, it is intended that the "liquid" of the liquid bearing material to be removed by the various apparatus and methods of this invention can be any suitable aqueous or nonaqueous liquid or even mixtures or combinations thereof, if desired. For example, see the various types of liquid bearing material that can be utilized in the apparatus and methods of this invention and are set forth in the various publications that have been previously incorporated by reference into this disclosure.

It is also to be understood that the term "pulsing" a field action, whether that field is an electrostatic field or a vibrating field, is intended to cover a situation where that field is turned completely off and then reapplied in a repeating manner as well as where that field is merely reduced in intensity and then increased in intensity in a repeating manner, or any combination of such repeating manners.

Therefore, it can be seen that this invention not only provides a new apparatus for removing liquid from liquid bearing material and the like or merely moving liquid relative to the liquid bearing material, but also this invention provides a new method for removing liquid from liquid bearing material or the like or merely moving liquid relative to the liquid bearing material as well as a new method of making such an apparatus.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In an apparatus for moving at least some of the liquid in liquid bearing soil or ground having a top surface means, said apparatus comprising first electrode means and second electrode means disposed in said ground so as to have at least portions thereof disposed beneath said top surface means and so as to have a section of said ground disposed between said portions of said electrode means, means for creating an electrostatic field between said portions of said electrode means to tend to move at least some of said liquid in said section of said ground toward one of said portions of said electrode means, and means for imposing a vibratory field arrangement on said section of said ground to enhance the movement of said liquid in said section of said ground toward said one of said portions of said electrode means, the improvement wherein said means for imposing said vibratory field arrangement on said section of said ground comprises means for simultaneously imposing a plurality of different vibratory field actions on said section of said ground so that a plurality of different intensities and/or frequencies of said vibratory field arrangement act on said section of said ground in series between said portions of said electrode means as at least some of said liquid thereof is being moved between said portions of said electrode means.

2. An apparatus as set forth in claim 1 wherein said means for imposing said vibrating field arrangement comprises a plurality of vibratable elements disposed in said ground in spaced apart relation so as to have at least portions thereof disposed beneath said top surface means and each being adapted to provide one of said different vibratory field actions on said section of said ground.

3. An apparatus as set forth in claim 2 wherein at least some of said vibratable elements are disposed in a generally aligned row thereof that extends from adjacent said first electrode means to adjacent said second electrode means.

4. An apparatus as set forth in claim 3 wherein said row is disposed along one side of said section of said ground.

5. An apparatus as set forth in claim 3 wherein said row is disposed in said section of said ground.

6. An apparatus as set forth in claim 2 wherein said vibratable elements are disposed in a plurality of rows thereof that extend from adjacent said first electrode means to adjacent said second electrode means.

7. An apparatus as set forth in claim 6 wherein two of said rows are respectively disposed along opposite sides of said section of said ground.

8. An apparatus as set forth in claim 6 wherein at least one of said rows is disposed in said section of said ground.

9. An apparatus as set forth in claim 1 and comprising means for vibrating at least one of said electrode means so that that electrode means can impose a vibrating field action on said section of said ground.

10. An apparatus as set forth in claim 1 wherein at least one of said electrode means has at least one projection that projects into said section of said ground.

11. In a method for moving at least some of the liquid in liquid bearing soil or ground having a top surface means and comprising the steps of disposing first electrode means and second electrode means in said ground so as to have at least portions thereof disposed beneath said top surface means and so as to have a section of said ground disposed between said portions of said electrode means, creating an electrostatic field between said portions of said electrode means to tend to move at least some of said liquid in said section of said ground toward one of said portions of said electrode means, and imposing a vibratory field arrangement on said section of said ground to enhance the movement of said liquid in said section of said ground toward said one of said portions of said electrode means, the improvement wherein the step of imposing said vibratory field arrangement on said section of said ground comprises the step of simultaneously imposing a plurality of different vibratory field actions on said section of said ground so that a plurality of different intensities and/or frequencies of said vibratory field arrangement act on said section of said ground in series between said portions of said electrode means as at least some of said liquid thereof is being moved between said portions of said electrode means.

12. A method as set forth in claim 11 and comprising the step of forming said means for imposing said vibratory field arrangement to comprise a plurality of vibratable elements disposed in said ground in spaced apart relation so as to have at least portions thereof disposed beneath said top surface means and each being adapted to provide one of said different vibratory field actions on said section of said ground.

13. In a method as set forth in claim 12 and comprising the step of disposing at least some of said vibratable elements in a generally aligned row thereof that extends from adjacent said first electrode means to adjacent said second electrode means.

14. A method as set forth in claim 13 and comprising the step of disposing said row along one side of said section of said ground.

15. A method as set forth in claim 13 and comprising the step of disposing said row in said section of said ground.

16. A method as set forth in claim 12 and comprising the step of disposing said vibratable elements in a plurality of rows thereof that extend from adjacent said first electrode means to adjacent said second electrode means.

17. A method as set forth in claim 16 and comprising the step of disposing two of said rows respectively along opposite sides of said section of said ground.

18. A method as set forth in claim 11 and comprising the step of vibrating at least one of said electrode means so that that electrode means can impose a vibratory field action on said section of said ground.

19. A method as set forth in claim 11 and comprising the step of forming at least one of said electrode means to have at least one projection that projects into said section of said ground.

* * * * *